US010455414B2

(12) United States Patent
Lee et al.

(10) Patent No.: US 10,455,414 B2
(45) Date of Patent: Oct. 22, 2019

(54) USER-PLANE SECURITY FOR NEXT GENERATION CELLULAR NETWORKS

(71) Applicant: QUALCOMM Incorporated, San Diego, CA (US)

(72) Inventors: Soo Bum Lee, San Diego, CA (US); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 14/923,223

(22) Filed: Oct. 26, 2015

(65) Prior Publication Data
US 2016/0127897 A1    May 5, 2016

Related U.S. Application Data

(60) Provisional application No. 62/072,388, filed on Oct. 29, 2014.

(51) Int. Cl.
*H04W 12/04* (2009.01)
*H04L 9/32* (2006.01)
(Continued)

(52) U.S. Cl.
CPC ........... *H04W 12/04* (2013.01); *H04L 9/3247* (2013.01); *H04L 63/0435* (2013.01);
(Continued)

(58) Field of Classification Search
CPC ..... H04W 12/04; H04W 12/02; H04W 12/06; H04W 12/08; H04L 9/3247;
(Continued)

(56) References Cited

U.S. PATENT DOCUMENTS 8,117,454 B2    2/2012  Forsberg
8,452,957 B2    5/2013  Pourzandi et al.
(Continued)

FOREIGN PATENT DOCUMENTS

CN    101075865 B    2/2011
EP    2034658 A1    3/2009
(Continued)

OTHER PUBLICATIONS

Siwar B. H. Said et al, Toward Adaptive Security mechanisms in 3GPP EPS/LTE Networks, IEEE (Year: 2013).*
(Continued)

*Primary Examiner* — Shanto Abedin
(74) *Attorney, Agent, or Firm* — Loza & Loza, LLP

(57) ABSTRACT

Securing user-plane data traffic between a device and a packet data network gateway (P-GW) may be accomplished at the device (e.g., chip component, client device) by obtaining, at the device, a first shared key, and obtaining, at the device, a second shared key based on the first shared key. The second shared key may be for securing user-plane data traffic during transit between the device and the P-GW. The second shared key is shared by the device and the P-GW. The data traffic may be secured based on the second shared key to produce first secured data traffic. The first secured data traffic may be sent to the P-GW via an access node. The P-GW and the access node are distinct network entities. The second shared key is unknown to the access node. The P-GW obtains the second shared key from a network entity that is distinct from the device.

26 Claims, 28 Drawing Sheets

(51) Int. Cl.
*H04L 29/06* (2006.01)
*H04W 12/06* (2009.01)
*H04W 12/00* (2009.01)
*H04W 88/02* (2009.01)

(52) U.S. Cl.
CPC ............ *H04L 63/06* (2013.01); *H04L 63/164* (2013.01); *H04W 12/001* (2019.01); *H04W 12/06* (2013.01); *H04L 63/0428* (2013.01); *H04W 88/02* (2013.01)

(58) Field of Classification Search
CPC ... H04L 63/0435; H04L 63/06; H04L 63/164; H04L 63/0428
USPC .................................. 713/168, 176; 380/270
See application file for complete search history.

(56) References Cited

U.S. PATENT DOCUMENTS

| | | | |
|---|---|---|---|
| 2003/0039234 A1* | 2/2003 | Sharma | H04L 63/06 370/338 |
| 2004/0139201 A1* | 7/2004 | Chaudhary | H04L 63/08 709/229 |
| 2007/0041382 A1* | 2/2007 | Vayanos | H04L 63/0428 370/394 |
| 2008/0273704 A1* | 11/2008 | Norrman | H04L 63/062 380/278 |
| 2008/0298595 A1* | 12/2008 | Narayanan | H04L 63/06 380/278 |
| 2010/0322189 A1* | 12/2010 | Qiang | H04L 63/029 370/331 |
| 2011/0113250 A1* | 5/2011 | Li | H04L 47/2491 713/171 |
| 2011/0261787 A1* | 10/2011 | Bachmann | H04L 63/029 370/331 |
| 2011/0305339 A1* | 12/2011 | Norrman | H04W 12/04 380/270 |
| 2011/0311053 A1* | 12/2011 | Escott | H04L 63/06 380/272 |
| 2011/0314287 A1 | 12/2011 | Escott et al. | |
| 2011/0314522 A1* | 12/2011 | Palanigounder | H04B 7/155 726/4 |
| 2012/0064901 A1* | 3/2012 | Zhu | H04W 24/02 455/450 |
| 2012/0224564 A1* | 9/2012 | Paisal | H04N 7/148 370/331 |
| 2012/0297474 A1* | 11/2012 | Zhang | H04L 63/0823 726/10 |
| 2013/0097418 A1 | 4/2013 | Bhatt et al. | |
| 2013/0297937 A1 | 11/2013 | Fransen | |
| 2013/0297987 A1* | 11/2013 | Gupta | G06F 11/1064 714/773 |
| 2013/0322347 A1 | 12/2013 | Alex et al. | |
| 2014/0086177 A1 | 3/2014 | Adjakple et al. | |
| 2014/0112474 A1 | 4/2014 | Escott et al. | |
| 2014/0112475 A1 | 4/2014 | Escott et al. | |
| 2014/0227997 A1* | 8/2014 | Kim | H04W 76/023 455/410 |
| 2014/0307872 A1* | 10/2014 | Heo | H04W 52/0251 380/270 |
| 2015/0052580 A1* | 2/2015 | Delsol | H04L 63/062 726/3 |
| 2015/0092942 A1* | 4/2015 | Wager | H04L 63/061 380/270 |
| 2016/0007193 A1* | 1/2016 | Zhang | H04W 4/70 380/270 |
| 2016/0044487 A1* | 2/2016 | Li | H04W 8/04 370/328 |
| 2016/0065362 A1* | 3/2016 | Choyi | H04L 63/065 380/279 |
| 2016/0164875 A1* | 6/2016 | Zhang | H04L 63/101 726/4 |
| 2016/0182477 A1* | 6/2016 | Zhang | H04L 63/062 726/7 |

FOREIGN PATENT DOCUMENTS

| | | |
|---|---|---|
| EP | 2421292 A1 | 2/2012 |
| EP | 2854329 A1 | 4/2015 |
| EP | 2955897 A1 | 12/2015 |
| WO | WO-2010025280 A2 | 3/2010 |
| WO | WO-2012084484 A1 | 6/2012 |
| WO | WO-2013174267 A1 | 11/2013 |
| WO | 2014002351 A1 | 1/2014 |
| WO | WO-2014059657 A1 | 4/2014 |
| WO | 2014088120 A1 | 6/2014 |
| WO | WO-2014134786 A1 | 9/2014 |
| WO | WO-2015113197 A1 | 8/2015 |

OTHER PUBLICATIONS

Chan-Kyu Han et al, Security Analysis of Handover Key Management in 4G LTE/SAE Networks, IEEE (Year: 2014).*
International Search Report and Written Opinion—PCT/US2015/057640—ISA/EPO—dated May 2, 2016.
Zumerie D., "3GPP LTE Security Aspects", 3GPP Workshop, Bangalore, May 30, 2011, May 30, 2011 (May 30, 2011), pp. 1-27, XP055089219, Retrieved from the Internet: URL: http://www.3g4g.co.uk/Lte/LTE_Security_Pres_1105_3GPP.pdf [retrieved on Nov. 19, 2013].
Gurjar S, "Lte-security-presentation/lte-security.md at master . sgurjar/lte-security-presentation . GitHub", May 4, 2013 (May 4, 2013), XP055267223, Retrieved from the Internet: URL:https://github.com/sgurjar/lte-security-presentation/blob/master/lte-security.md [retrieved on Apr. 20, 2016] pp. 5-10.
European Search Report—EP19155646—Search Authority—Munich—dated Mar. 11, 2019.
Taiwan Search Report—TW104135269—TIPO—dated Feb. 21, 2019.

* cited by examiner

USER-PLANE SECURITY FOR NEXT GENERATION CELLULAR NETWORKS

This application claims priority to U.S. Provisional Application No. 62/072,388, filed Oct. 29, 2014, titled User-Plane Security For Next Generation Cellular Networks, the contents of which is incorporated by reference herein.

TECHNICAL FIELD

The present disclosure relates generally to communication systems, and more particularly, to a system for protecting user-plane messaging in a wireless communications system.

BACKGROUND

FIG. 1 is an illustration of elements of a fourth generation (4G) cellular network 100 according to prior art. The 4G cellular network 100 may comprise an access part (e.g., a radio access network (RAN)), which may be referred to herein as an evolved universal terrestrial radio access network (E-UTRAN) 102 and a core part (e.g., a core network), which may be referred to herein as an evolved packet core (EPC) 104. The E-UTRAN 102 and EPC 104 together form an evolved packet system (EPS).

The EPS may communicate with a client device 106 (e.g., mobile device, mobile terminal, user equipment (UE), terminal). The client device 106 may include a universal subscriber identity module (USIM) 108 (commonly referred to as a SIM card). The USIM 108 may be an integrated circuit chip that securely stores, for example, an international mobile subscriber identity (IMSI) number and its related key, K. The key, K, may be a root key.

Communication in the EPS is divided into planes, namely a user-plane (UP) and a control-plane (CP). In FIG. 1, one particular control-plane signaling path is identified by a dashed line 110 between an access node 112 (e.g., eNodeB) and a mobility management entity (MME) 114, while one particular user-plane data traffic path is identified by a solid line 116 between the access node 112 and a serving gateway (S-GW) 118. Those of skill in the art know additional and alternative paths for control-plane signaling and user-plane data traffic. The illustration of FIG. 1 is exemplary and not meant to be limiting.

The E-UTRAN 102 includes an access node 112, which includes hardware that wirelessly communicates with the client device 106. In Long Term Evolution (LTE) networks, the access node 112 may be referred to as an evolved Node B (eNodeB). By way of example, a single LTE access node may serve one or more E-UTRAN 102 cells.

The EPC 104 includes a packet data network (PDN) gateway (P-GW) 120. The P-GW 120 serves as a gateway to a packet data network 122 such as the Internet and/or private corporate networks. A P-GW 120 may be considered as a passageway to the packet data network 122; it is a point of network policy enforcement. An access node 112 may be considered as a passageway for over-the-air access of a client device 106 to a core network (e.g., EPC 104). An access node 112 may be collocated with a P-GW 120 but the function of the access node 112 is different from that of the P-GW 120. In other words, even if they are collocated, an access node 112 and a P-GW 120 are separate entities with separate functions.

The EPC 104 further includes a home subscriber server (HSS) 124. The HSS 124 stores the unique identities of each client device 106. An authentication center (AuC) 126 may be coupled to the HSS 124. The AuC 126 may serve to authenticate the USIM 108 when the client device 106 attempts to connect to the EPC 104. The AuC 126 may store the same key (e.g., root key K) as that stored in the USIM 108. In other words, the AuC 126 may store a second instance of the root key K that is stored in the USIM 108. The root key is not transmitted over the air. Authentication of the USIM 108 by the AuC 126 may typically occur when the client device 106 is powered on.

The EPC 104 also includes an S-GW 118. The S-GW 118 executes functions related to the transportation of user-plane IP messages to and from a client device 106. It is generally understood that a message may include one or more packets. Packets and messages may have different formats and be encapsulated by different headers. For ease of reference herein, the term message is used throughout.

The EPC 104 also includes an MME 114. The MME 114 executes functions related to setting up, maintaining, and releasing various physical channels. The MME 114 may prepare bearers for message communication. The MME 114 is involved in the control-plane, while the client device 106, access node 112, S-GW 118, P-GW 120, and HSS 124 are involved in both the control and user-planes.

When a client device 106 communicates with a network (e.g., EPC 104), it is identified using a Temporary Mobile Subscriber Identity (TMSI) that is allocated by the MME 114 during an attach procedure. The client device 106 is also identified by an IP address, which is allocated by the P-GW 120 as soon as the client device 106 is powered on.

Control-Plane

In the control-plane, when a client device 106 seeks to attach to a network, it will contact an access node 112. The access node 112 will select an MME 114 for the client device 106. The MME 114 will select the S-GW 118 and P-GW 120. The P-GW 120 may be selected according to an Access Point Name (APN), which is typically provided by the user or the user's operator. The client device 106 is allocated an IP address from the selected P-GW 120 and is thus attached to the cellular network 100.

User-Plane

Once attached, the client device 106 can send and receive messages (e.g., data traffic for voice and data) over the user-plane, via the access node 112, to and from the P-GW 120. In order to secure the user-plane link between the client device 106 and the access node 112, these two nodes presently derive an encryption key known as a $K_{UPenc}$ key. An explanation of the derivation of the $K_{UPenc}$ key is provided in connection with the $K_{UPenc}$ key 316 presented in the key hierarchy described in FIG. 3. In order to secure the user-plane backhaul link between the access node 112 and the P-GW 120, these two nodes rely on Internet Protocol Security (IPSEC). IPSEC is a protocol suite to secure Internet Protocol (IP) communications by authenticating and encrypting each IP packet of a communication session. It is noted that backhaul security is not defined in a bearer basis, but defined by Network Domain Security (NDS).

The cellular network 100 provides security for user-plane data traffic flowing to and from the access node 112 in both the downlink and uplink directions. In a downlink direction, when an IP message carrying user data traffic reaches the P-GW 120 (e.g., from a packet data network 122, such as the Internet), the message may be encrypted and securely transferred to the access node 112 using IPSEC. The message may be decrypted at the access node 112. Unencrypted message data may therefore exist on the access node 112. The message may then again be encrypted and securely transferred from the access node 112 to the client device 106 using the $K_{UPenc}$ key. In an uplink direction, when an IP message carrying user data is set to be sent over-the-air, from the client device 106 to the access node 112, the message may be encrypted and securely transferred to the access node 112 using the $K_{UPenc}$ key. The message may be decrypted at the access node 112. Again, unencrypted message data may therefore exist on the access node 112. The message may then again be encrypted and securely transferred from the access node 112 to the P-GW 120 using IPSEC.

The security provided by the encryption should preferably keep messages safe from attacks by third parties or even access nodes compromised or deployed in an untrusted location. As will be described later, the client device 106 and the access node 112 both derive the $K_{UPenc}$ key used to secure data traffic traveling over the air in the uplink and downlink directions between the client device 106 and the access node 112. User-plane security terminates at the access node 112. User-plane security is dependent upon the correct behavior of the access node 112, which, as described, holds unencrypted message data as that data awaits its turn to be transferred from the access node 112 on its way to either the P-GW 120 or the client device 106.

It is noted that security is defined separately as between the Non-Access Stratum (NAS) and the Access Stratum (AS). The NAS provides for processing of communications between a core network node, such as the MME 114, and a client device 106. The AS provides for communication between the access node 112 and a client device 106. Additionally, security on the control-plane is defined separately from security on the user-plane.

Several examples illustrate the importance of maintaining security on the user-plane. For example, if a third party compromises the security of an access node 112, the third party may be able to capture unencrypted data directly from the access node 112. By way of a second example, an attacker could replace a user's data with its own data. The receiving party would not be able to tell that the data was not from the user. By way of a third example, the attacker might flip bits in a user's messages, which would result in the transmission of messages that could not be properly decrypted, therefore wasting valuable resources.

The access node 112 may be a target for attack because the access node 112 may be located in a public place (e.g., untrusted or insecure location), making it more vulnerable to an adversarial attack. Additionally, many access nodes (e.g., similar to access node 112) are shared by multiple mobile network operators (MNOs). The mobile network operators may not each operate according to the same levels of security and oversight, making it possible for one malicious entity to gain access to an access node 112 via a mobile network operator with lax security practices.

In 4G networks, user-plane security terminates at the access node 112, which is where client device 106 messages are sent and received. Consequently, client device 106 privacy of user-plane data is dependent upon the integrity (or security status) of the access node 112. If the access node 112 is compromised or is deployed in an untrusted location, the security of the user-plane data traffic of the client device 106 is in danger of being compromised.

This reliance on the access node 112 for user-plane security may be in tension with the design philosophy of 4G security architecture, which sought to place less trust, and therefore less reliance, on the access node 112. In proposed next generation cellular networks (such as 5G), the access node 112 may be even less trusted than in 4G networks due to the need for network densification to support higher capacity and/or bandwidth, mesh nodes, or relay nodes which encompass access node or access node functionality.

Accordingly, it would be beneficial to remove the access node 112 as a trusted entity for purposes of secure communication between the P-GW 120 and the client device 106.

SUMMARY

According to one aspect, a method, operational at a device, may include obtaining, at the device, a first shared key, and obtaining, at the device, a second shared key based on the first shared key. The second shared key may be for securing data traffic during transit between the device and a packet data network gateway (P-GW). The device and the P-GW may share the second shared key; however, they obtain the second shared key independently of each other. The device may secure data traffic based on the second shared key to produce first secured data traffic. The device may then send the first secured data traffic to the P-GW via an access node, wherein the P-GW and the access node are distinct network entities.

The first shared key may be unknown to the P-GW. The first shared key and the second shared key may be derived locally at the device and are not transmitted to the device. The second shared key may secure at least some layers of user-plane communications while a different key secures control-plane communications.

According to some aspects, the device may obtain a third shared key based on the first shared key, for securing control messaging sent between the device and a mobility management entity (MME), wherein the third shared key is shared by the device and the MME, and the P-GW, the MME, and the access node are distinct network entities. The device may obtain a fourth shared key based on the third shared key, for securing data traffic between the device and the access node and control messaging between the device and the MME, wherein the fourth shared key is shared by the device and the access node. The device may then secure the first secured data traffic based on the fourth shared key to produce a second secured data traffic, wherein the first secured data traffic is encapsulated within the second secured data traffic. The device may then send the second secured data traffic, instead of the first secured data traffic, to the P-GW via the access node, wherein the P-GW, the MME, and the access node are distinct network entities.

According to some aspects, the second shared key protects the second secured data traffic in an Internet Protocol (IP) layer of a user-plane while the fourth shared key protects the second secured data traffic in a Packet Data Convergence Protocol (PDCP) layer of a user-plane. According to some aspects, the fourth shared key protects certain transmissions of traffic over certain layers of a user-plane while the second shared key is used to protect other transmissions of traffic over other layers of the user-plane.

The first shared key may be shared between the device and a network entity. The network entity may obtain the first shared key from a home subscription server (HSS). The device may obtain the second shared key independently from the P-GW. Obtaining the second shared key further includes deriving the second shared key at the device as a function of the first shared key and a packet data network gateway identifier (GW ID).

In aspects described herein, data traffic is distinct from control messaging. The data traffic may be transmitted over a user-plane and the control messaging may be transmitted over a control plane, wherein the user-plane and the control plane are distinct transmission paths.

In some aspects, securing the data traffic comprises encrypting the data traffic based on the second shared key. Securing the data traffic may include including an authentication signature based on the second shared key.

According to some aspects, the method described herein may further include receiving third secured data traffic from the P-GW via the access node, wherein the third secured data traffic was secured based on the second shared key. The method may still further include decrypting and/or authenticating the third secured data traffic based on the second shared key to produce unsecured data traffic.

A device to perform the methods exemplified above is described herein. Additionally, a non-transitory machine-readable storage medium having one or more instructions stored thereon, which when executed by at least one processor causes the at least one processor to perform the steps of the methods exemplified above is also described herein.

According to another aspect, a method, operational at a packet data network gateway (P-GW), may include receiving, at the P-GW, data traffic from a packet data network. The P-GW may obtain a secret shared key from a network entity, for securing the data traffic during transit between the P-GW and a device, wherein the secret shared key is shared by the P-GW and the device. The P-GW may then secure the data traffic based on the secret shared key to produce first secured data traffic. The P-GW may then send the first secured data traffic to the device via an access node, wherein the P-GW the access node, and the network entity are distinct network entities.

According to some aspects, the secret shared key is unknown to the access node. The secret shared key may be provisioned to the P-GW over a control-plane interface from the network entity. According to some aspects, the secret shared key secures at least some layers of user-plane communications while a different shared key secures control-plane communications. For example, the secret shared key may protect the data traffic in an Internet Protocol (IP) layer of a user-plane. The P-GW may obtain the secret shared key independently from the device. The secret shared key may be a function of a P-GW identifier (GW ID). Obtaining the secret shared key may further include obtaining the secret shared key from a network entity located between a home subscriber server (HSS) and a mobility management entity (MME). The secret shared key is preferably obtained from the network entity in a same domain as the P-GW. That is, the P-GW and the network entity are in one domain.

The method operational at the P-GW may further include receiving, at the P-GW, secured uplink data traffic, secured by the secret shared key, from the device via the access node. The P-GW may decrypt and/or authenticate the secured uplink data traffic with the secret shared key to obtain uplink data traffic. The P-GW may then send the uplink data traffic to the packet data network.

A device to perform the methods implemented at the P-GW and exemplified above is described herein.

A method, operational at a network entity (e.g., a Session Key Management Entity) may include obtaining, at the network entity, a first shared key. A second shared key, based on the first shared key, may also be obtained at the network entity. The second shared key may be for securing data traffic during transit between a device and a packet data network gateway (P-GW). The device and the P-GW may share the second shared key; however, they obtain the second shared key independently of each other. The method may further include sending the second shared key to the P-GW. The method may still further include obtaining, at the network entity, a third shared key based on the first shared key, for securing control messaging sent between the device and a mobility management entity (MME). The third shared key is shared by the device and the MME. The third shared key may be sent to the MME. The network entity, the P-GW, and the MME may be distinct network entities.

According to some aspects, obtaining the second shared key may include deriving the second shared key as a function of the first shared key and a packet data network gateway identifier (GW ID).

According to aspects described herein, data traffic is distinct from control messaging. For example, data traffic may be transmitted over a user-plane and control messaging may be transmitted over a control plane, wherein the user-plane and the control plane are distinct transmission paths.

According to some aspects, the network entity is located between a home subscriber server (HSS) and the MME, and the network entity is distinct from the HSS and the MME.

A device to perform the methods exemplified above is described herein. Additionally, a non-transitory machine-readable storage medium having one or more instructions stored thereon, which when executed by at least one processor causes the at least one processor to perform the steps of the methods exemplified above is also described herein.

DETAILED DESCRIPTION

Figure 1:
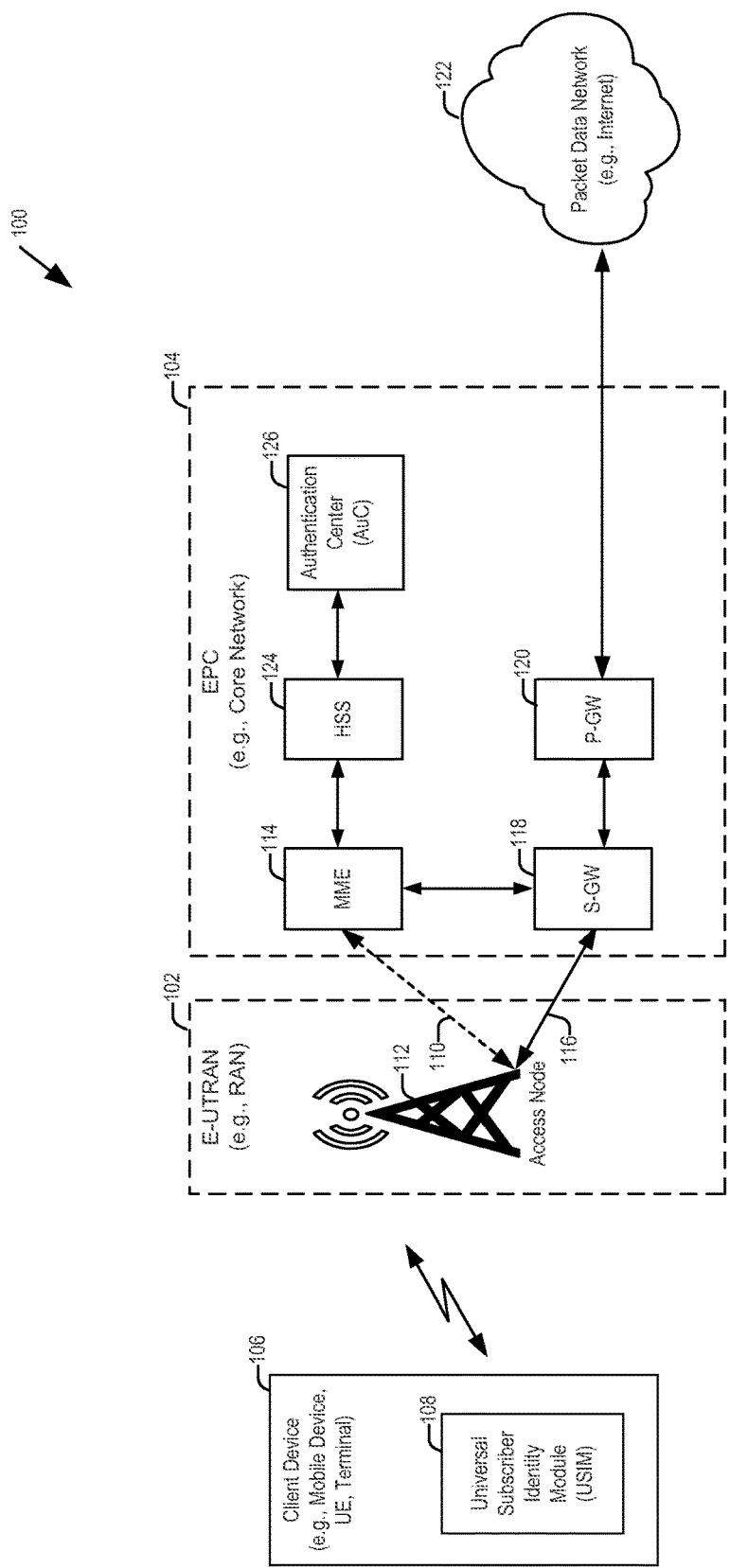
FIG. 1 is an illustration of elements of a fourth generation (4G) cellular network according to prior art.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and elements are shown in block diagram form in order to avoid obscuring such concepts.

As used herein, the term "obtaining" may mean deriving locally or acquiring from another entity. As used herein, the term "device" may describe a chip component and/or a user device such as a client device (e.g., mobile device, user equipment, user device, terminal, mobile phone, mobile communication device, mobile computing device, digital tablets, smart phone, wearable smart device, among other devices). As used herein, a construct of "deriving A based on B" and similar constructions may be used to mean deriving/ generating A directly or indirectly from B. As used herein, the term "securing" may mean to encrypt/decrypt and/or perform some action in connection with authenticating a packet or message in user-plane data traffic.

In order to overcome the problems and deficiencies present in known systems, presented herein are aspects that reduce reliance on the integrity (or security status) of an access node 112 for purposes of secure communication between the client device 106 and the P-GW 120.

Overview

In order to provide increased security in next generation cellular networks (e.g., relative to 4G networks), a first shared key is known, obtained, and/or derived by a client device and a cellular network gateway to a packet data network (hereinafter referred to as a packet data network (PDN) gateway (P-GW)). The client device communicates with the P-GW via an access node for the cellular network. The client device and the P-GW independently know, obtain, generate, and/or derive the first shared key. That is, there is no negotiation between the two entities with respect to the knowledge, obtaining, generating, and/or derivation of the first shared key. There is no exchange of key-related information between the two entities. In other words, independently knowing, obtaining, generating, and/or deriving means that the two entities separately know, obtain, generate, and/or derive two instances of the same key without any interchange between themselves. The first shared key may serve to encrypt and/or authenticate messages transmitted between the client device and the P-GW. Because the first shared key is not known to the access node, the messages sent between the client device and the P-GW via the access node are secured against tampering and/or inaccessible to the access node.

A second shared key may be known, obtained, generated, and/or derived by the client device and the access node, where the second shared key is different from the first shared key. The second shared key may serve to encrypt and/or authenticate over-the-air messages transmitted between the client device and the access node.

In one example, a first message sent between the client device and the P-GW via the access node may first be encrypted and/or authenticated using the first shared key and then encapsulated within a second message that is encrypted and/or authenticated using the second shared key.

4G Cellular Network User-Plane Security

Figure 2:
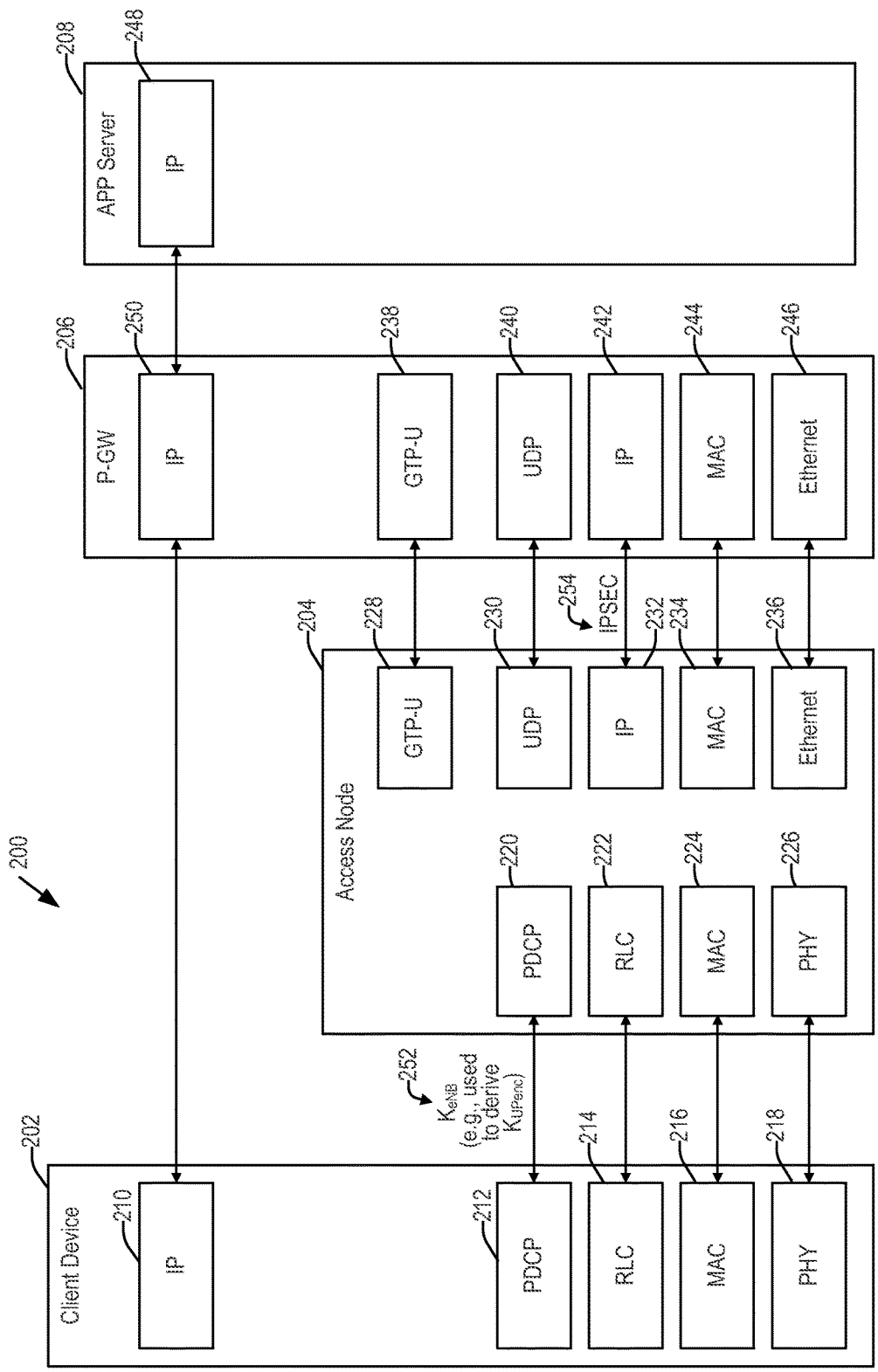
FIG. 2 is a block diagram of various protocol stacks implemented in a user-plane of the 4G cellular network of FIG. 1.

FIG. 2 is a block diagram of various protocol stacks 200 implemented in a user-plane of a 4G cellular network of FIG. 1. The various protocol stacks 200 are illustrated as being implemented in a client device 202, an access node 204, a P-GW 206, and an application server (APP Server) 208. In accordance with the standard Operational Support System (OSS) model, the protocol stack implemented in a client device 202 may include an Internet Protocol layer (IP layer) 210, a Packet Data Convergence Protocol (PDCP) layer 212, a Radio Link Control (RLC) layer 214, a Medium Access Control (MAC) layer 216, and a Physical (PHY) layer 218. The protocol stack implemented in an access node 204 may include layers that correspond to those of the client device 106. For example, access node 204 layers may include a PDCP layer 220, an RLC layer 222, a MAC layer 224, and a PHY layer 226. In addition, a General Packet Radio Service (GPRS) Tunneling Protocol for User-plane (GTP-U) layer 228, a User Datagram Protocol (UDP) layer 230, an Internet Protocol layer (IP layer) 232, a MAC layer 234, and an Ethernet layer 236 are included for communication with a packet data network gateway (P-GW) 206. The protocol stack implemented in the P-GW 206 may include a corresponding (GTP-U) layer 238, a User Datagram Protocol (UDP) layer 240, an IP layer 242, a MAC layer 244, and an Ethernet layer 246 for communication with the access node 204. The protocol stack implemented in the APP Server 208 may include an IP layer 248. The IP layer 248 of the APP Server 208 may be for communication with an IP layer 250 of the P-GW 206. The IP layer 250 of the P-GW 206 may communicate with the IP layer 210 of the client device 202. The just-identified layers are known in the art. Detailed explanations of these layers are available to those of skill in the art and will not be described herein for purposes of conciseness.

FIG. 2 indicates that communication between PDCP layer 212 of the client device 202 and PDCP layer 220 of the access node 204 are encrypted/decrypted based on a shared key, the $K_{eNB}$ key 252 (where the $K_{eNB}$ key 252 may be used to derive the shared user-plane encryption key, $K_{UPenc}$. In other words, communication between PDCP layer 212 of the client device 202 and PDCP layer 220 of the access node 204 may be secured based on the shared key, the $K_{eNB}$ key 252. In addition, FIG. 2 provides an indication that the communication between IP layer 232 of the access node 204 and IP layer 242 of the P-GW 206 is secured using Internet Protocol Security (IPSEC) 254.

With reference to FIG. 1 and FIG. 2, in 4G, if a client device 106 sends a user-plane message to a packet data network 122 (e.g., the Internet), the client device 106 must first send the user-plane message to the access node 112. In order to protect the user-plane message, the client device 106 may encrypt the message based on the $K_{eNB}$ key 252 (i.e., using the $K_{eNB}$ key 252 to derive the $K_{UPenc}$ key). Once encrypted, the client device 106 may send the message to the access node 112. The access node 112 may decrypt the user-plane message based on the $K_{eNB}$ key 252 (i.e., using the $K_{eNB}$ key 252 to derive the $K_{UPenc}$ key). Accordingly, the unencrypted contents of the user-plane message are available to the access node 112. Thus, great reliance is placed on the access node 112 to protect the security of communications passing through the access node 112. As stated above, despite security concerns, the access node 112 may be considered as a trusted entity for 4G communications.

After decryption, the access node 112 may forward the user-plane message to the P-GW 120. The access node 112 may make use of IPSEC 254 to secure each IP message being transferred from the IP layer of the access node 112 to the corresponding IP layer of the P-GW 120. Once secured, the access node 112 may send each IP message to the P-GW 120 in accordance with the IPSEC protocol. The IPSEC protocol is known in the art. Detailed explanations of the IPSEC protocol are available to those of skill in the art and will not be described herein for purposes of conciseness.

Figure 3:
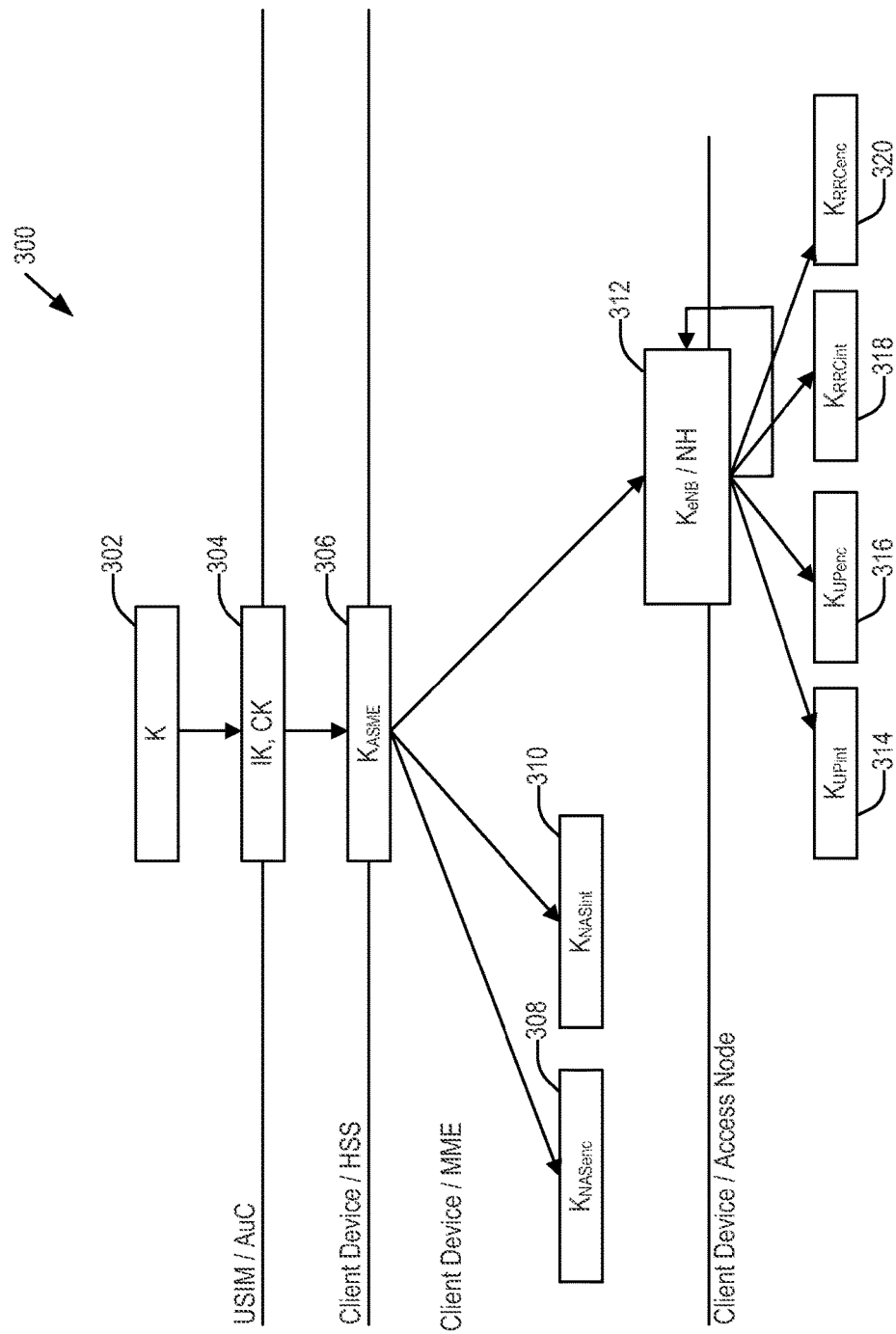
FIG. 3 is a key hierarchy implemented in the 4G cellular network of FIG. 1.

FIG. 3 is key hierarchy 300 implemented in the 4G cellular network of FIG. 1. A root key, identified herein as a K 302 key, may be stored on a Universal Subscriber Identity Module (USIM) of a client device and may also be stored at an Authentication Center (AuC) of a core network. During an authorization session between the client device and the core network, the USIM and the AuC may each independently derive an Integrity Key (IK) and a Cypher Key (CK), referred to herein collectively as the IK, CK 304 key, based on the K 302 key. The IK, CK 304 key may be referred to as a session key.

During an Authentication and Key Agreement (AKA) procedure, the IK, CK 304 key may be sent to the HSS from the AuC. In other words, the HSS may obtain the IK, CK 304 key from the AuC. The client device already has the IK, CK 304 key (by virtue of the IK and CK keys being derived by the USIM at the client device).

The client device and HSS may each independently derive an Access Security Management Entity (ASME) key ($K_{ASME}$ key) 306 based on the IK, CK 304 key. The $K_{ASME}$ key 306 may be sent to an MME from the HSS. In other words, the MME may obtain the $K_{ASME}$ key 306 from the HSS. The client device already has the $K_{ASME}$ key 306 (by virtue of deriving the $K_{ASME}$ key 306 based on the IK, CK 304 key at the client device). The MME may be considered a trusted key entity.

The client device and the MME may each independently derive a non-access stratum encryption key ($K_{NASenc}$ key) 308 and a non-access stratum integrity key ($K_{NASint}$ key) 310, based on the $K_{ASME}$ key 306. The $K_{NASenc}$ key 308 and the $K_{NASint}$ key 310 are intended to protect control-plane messages between the client device and the MME. Such protection prevents other elements from decrypting or modifying the messages in the control-plane.

The client device and the MME may also each independently derive an access node key, referred to herein as a $K_{eNB}$ key 312, based on the $K_{ASME}$ key 306. The $K_{eNB}$ key 312 may be sent to the access node from the MME. In other words, the access node may obtain the $K_{eNB}$ key 312 from the MME. At this point the client device and access node each possess a key identified as the $K_{eNB}$ key 312. In other words, the client device and access node share the $K_{eNB}$ key 312.

Reference is made, within the block including the $K_{eNB}$ key 312, to the Next Hop (NH) counter. The MME derives a first $K_{eNB}$ key for the access node. Whenever the client device moves "forward" from a first access node to a second access node, the MME derives a new $K_{eNB}$ key to replace the first $K_{eNB}$ key. The MME then sends the new $K_{eNB}$ key to the second access node in order to protect the connection from the previous access node. Thus, the NH counter provides a way for intermediate $K_{eNB}$ keys to be derived in the MME and client device. This is known as the forward security procedure. Because of the forward security procedure, when the first key is changed to the new key in connection with the handover of the client device from the first to the second access node, the first access node cannot use the first $K_{eNB}$ key to decrypt or modify a message sent via the second access node.

Using the $K_{eNB}$ key 312 that was derived based on the $K_{ASME}$ key 306, the client device and the access node may independently derive four different keys; however, in practice, usually three keys are derived. The four possible keys include a user-plane integrity key, which is denoted as a $K_{UPint}$ key 314, a user-plane encryption key, which is denoted as a $K_{UPenc}$ key 316, a control-plane (radio resource control) integrity key, which is denoted as a $K_{RRCint}$ key 318, and a control-plane (radio resource control) encryption key, which is denoted as a $K_{RRCenc}$ key 320. Keys with the subscript "enc" are used for encryption. Keys with the subscript "int" are used for integrity. In 4G, user-plane integrity is not considered; accordingly, the $K_{UPint}$ key 314 key is typically not derived.

Returning to FIG. 2, the user-plane protocol stacks of a 4G cellular network, messages transferred between PDCP layer 212 of a client device 202 and PDCP layer 220 of an access node 204 may be encrypted based on the $K_{eNB}$ key 252 (i.e., using the $K_{eNB}$ key 252 to derive the $K_{UPenc}$ key). Encryption using the $K_{UPenc}$ key (similar to $K_{UPenc}$ key 316 of FIG. 3) may be performed on the messages transferred between PDCP layer 212 of the client device 202 and the PDCP layer 220 of the access node 204 without regard to the direction of the message. Integrity is not controlled between the client device 202 and the access node 204 in 4G user-plane messages.

As illustrated in FIG. 2, a user-plane message encryption step will be described. Consider a scenario in which the client device 202 seeks to send a message to the APP Server 208. The client device 202 and the APP Server 208 may communicate using Transmission Control Protocol/Internet Protocol (TCP/IP) or User Datagram Protocol/Internet Protocol (UDP/IP) protocols. To send the message in the user-plane, the client device 202, according to the protocol stack, may utilize the PDCP layer 212. A standard setting body known as the Third Generation Partnership Project (3GPP) may define the PDCP layer 212. The PDCP layer 212 may be responsible for encrypting (e.g., ciphering) and authenticating (e.g., integrity protecting) the message sent from the client device 202 to the access node 204. To encrypt the message, the client device 202 may use a $K_{UPenc}$ key, which was derived by the client device 202 based on the $K_{eNB}$ key 252. The access node 204 independently derived the same $K_{UPenc}$ key based on a shared copy of the $K_{eNB}$ key 252. It is a shared key, in that both the client device 202 and the access node 204 possess the same key. The $K_{UPenc}$ key is only valuable between the client device 202 and access node 204. The $K_{UPenc}$ key cannot be used to encrypt or decrypt messages between the client device 202 and any other access node.

The PDCP layer 212 of the client device 202 encrypts the user-plane message using the $K_{UPenc}$ key (where the $K_{UPenc}$ key was derived based on the $K_{eNB}$ key 252) and sends it to the lower layers (RLC layer 214, MAC layer 216, PHY layer 218) so that lower layer headers can be added to the message, and so that the message can be sent to the access node 204. After receiving the message from higher layers, the lower layers process the message according to standards established by the 3GPP and send it to the access node 204.

Upon receipt, the PDCP layer 220 of the access node 204 can decrypt the message using the $K_{UPenc}$ key, which was derived by the access node 204 based on the shared key, the $K_{eNB}$ key 252. The access node 204 can then determine (from the decrypted data) the IP address of the P-GW (e.g., P-GW 206) to which the message is to be forwarded. Then the message is encapsulated using IPSEC 254. An IPSEC tunnel is established between the access node 204 and the P-GW 206. Then, based on the interconnection established by the IPSEC tunnel, the access node 204 encapsulates the entire IP message after adding additional headers, and sends it to the P-GW 206. The IPSEC 254 protects the connection between the access node 204 and the P-GW 120, so it may be assumed to be secure. Once the P-GW 206 receives the message, protected by the IPSEC 254, it may verify the message. Once verification is successful, the P-GW 206 may remove all the headers added by the access node 204 and finally transmit the message received from the client device 202 to the APP Server 208.

It would appear that the message is protected from the client device through to the P-GW. However, from a perspective of the client device 202, 4G user-plane security may terminate at the access node 204. In 4G, the client device 202 relies on the access node 204 for user-plane security because the client device 202 cannot determine if the access node 204 has a secure connection to the P-GW 206. The access node 204 must trust that if the message securely reaches the access node 204, then the access node 204 will securely send the message to the P-GW 206. The access node 204 must also trust that if a message does reach the P-GW 206 successfully, then an Internet Service Provider (ISP) will securely transmit the message from the P-GW 206 to the APP Server 208. Therefore in a 4G cellular network, the client device 202 may only be concerned with encrypting the message to provide security of the message between itself and the access node 204, so that, for example, an over-the-air eavesdropper cannot decrypt the message.

Figure 4:
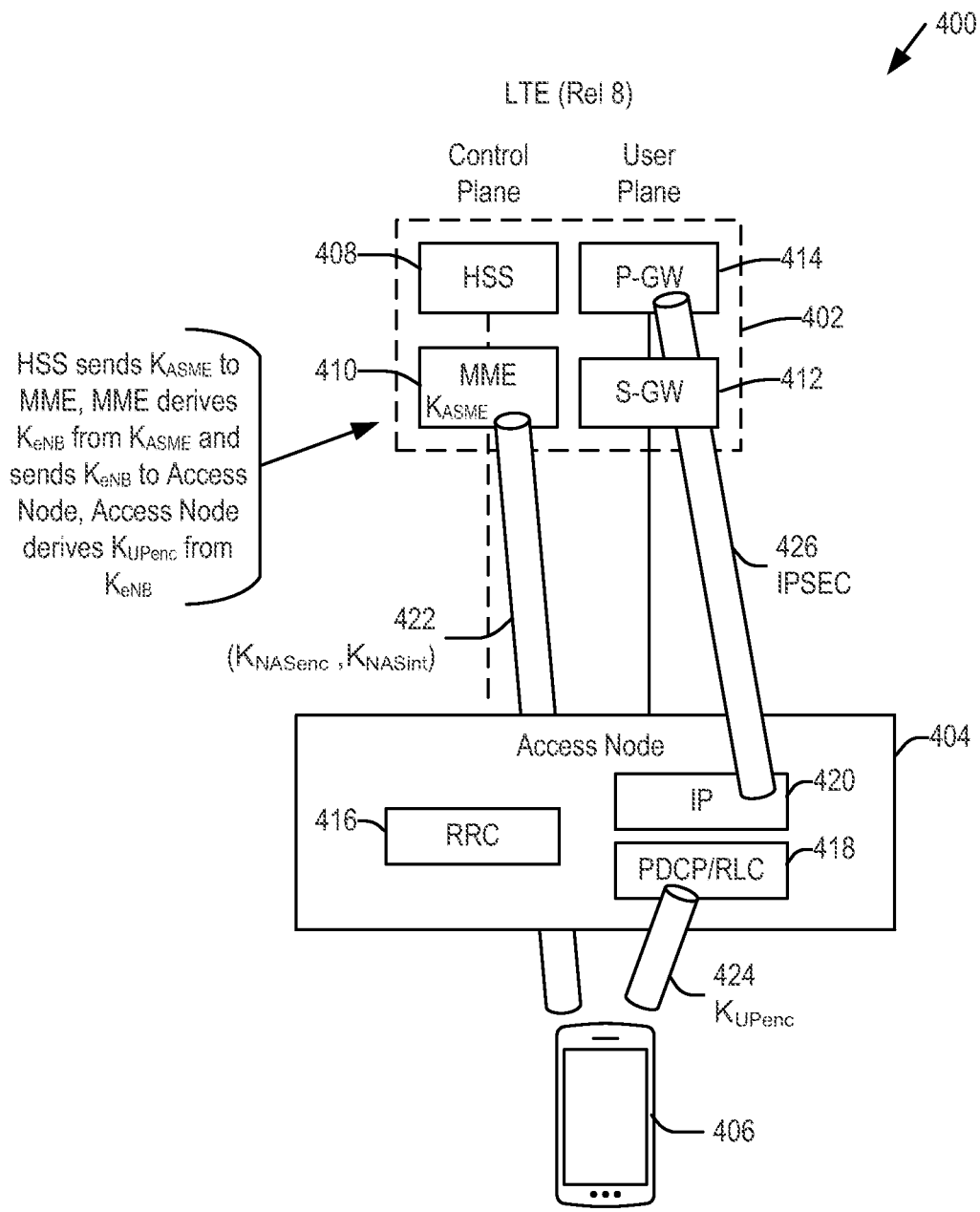
FIG. 4 illustrates elements of a 4G (e.g., LTE (Rel. 8)) cellular network, grouping the elements according to the control-plane and the user-plane, according to prior art.

FIG. 4 illustrates elements of a 4G (e.g., LTE (Rel. 8)) cellular network 400, grouping the elements according to the control-plane and the user-plane, according to prior art. In FIG. 4, graphic depictions of tunnels or pipelines are used to represent secure signal paths. FIG. 4 illustrates elements of a core network 402. FIG. 4 also illustrates an access node 404, which may be in wireless communication with the client device 406. The core network 402 includes an HSS 408, an MME 410, an S-GW 412, and a P-GW 414. The access node 404 includes an RRC 416 entity (an entity found in the control-plane), a PDCP/RLC entity 418, and an IP entity 420 (where the PDCP/RLC and IP entities are found in the user-plane).

Accordingly, as explained above, user-plane security in the 4G cellular network is dependent on the correct behavior of the access node 404 (e.g., eNodeB). Because the access node 404 is a less trusted entity than the MME 410 in 4G, the MME 410 is considered a local trust anchor or local key anchor. Whenever necessary, the MME 410 can deliver a $K_{eNB}$ key to the access node 404. A Ku p, key may be derived based on the $K_{eNB}$ key.

FIG. 4 visually illustrates the use of certain derived encryption keys and the use of the IPSEC tunnel 426. According to the aspect of FIG. 4, the MME 410 is a local trust anchor or local key anchor for a $K_{ASME}$ key. The pipeline 422 between the MME 410 and client device 406 depicts that control-plane messages between the MME 410 and the client device 406 are sent with the security of the $K_{NASenc}$ and $K_{NASint}$ keys. As described above in connection with FIG. 3, the client device 406 and the MME 410 may each independently derive the non-access stratum encryption $K_{NASenc}$ key and a non-access stratum integrity $K_{NASint}$ key based on a $K_{ASME}$ key. The pipeline 424 between the PDCP/RLC entity 418 of the access node 404 and the client device 406 depicts that user-plane messages between the PDCP/RLC entity 418 and the client device 406 are sent with the security of the $K_{UPenc}$ key. As described above in connection with FIG. 3, the client device 406 and the access node 404 may independently derive the $K_{UPenc}$ key (i.e., the user-plane encryption key). The IPSEC tunnel 426 between the IP entity 420 of the access node 404 and P-GW 414 of the core network 402 depicts that user-plane messages between the IP entity 420 and the P-GW 414 are sent with the security of IPSEC.

Next Generation Cellular Network User-Plane Security

The above-described 4G scenario exemplifies a problematic design philosophy of the 4G cellular security architecture. The problem, that user-plane security or privacy is dependent upon the integrity (or security status) of an access node, may be cured in next generation (e.g., 5G) cellular networks. In the next generation cellular networks embodied herein, a direct security relationship between a client device and a P-GW may be established to reduce reliance on the integrity (or security status) of the access node. As used herein, a direct security relationship may mean that a secure connection (e.g., for exchange of communications/messages/packets) between the client device and the P-GW may be provided without any need to trust any intermediate entity or node. The direct security relationship may be established by use of a key that is shared by the client device and the P-GW, yet the key is not a result of any negotiation or interchange between the client device and the P-GW. In other words, the client device obtains the shared key independently from the P-GW and, likewise, the P-GW obtains the shared key independently from the client device.

Figure 5:
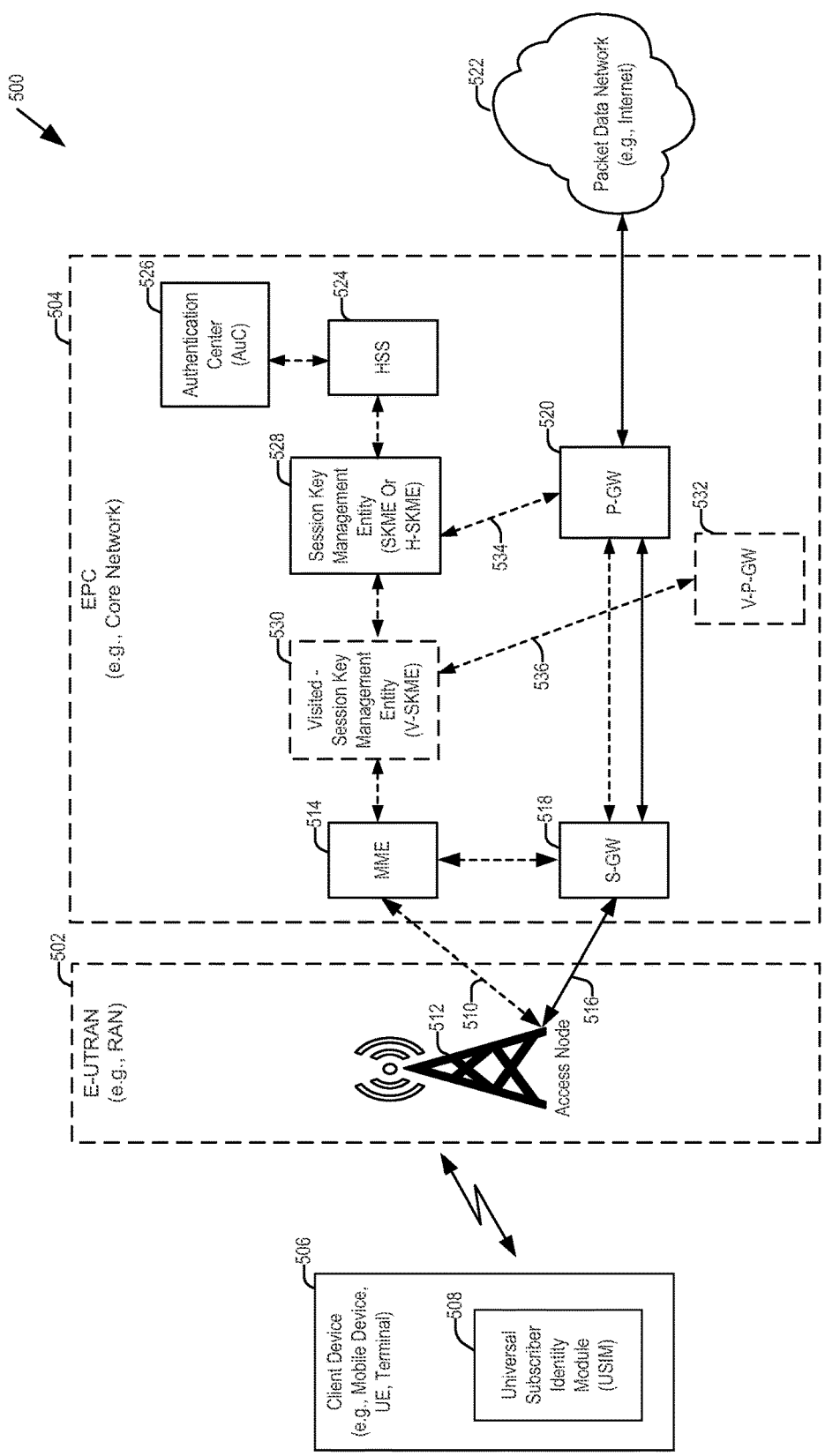
FIG. 5 is an illustration of elements of an exemplary next generation (e.g., 5G) cellular network in accordance with aspects of the disclosure.

FIG. 5 is an illustration of elements of an exemplary next generation (e.g., 5G) cellular network 500 in accordance with aspects of the disclosure. The cellular network 500 may comprise an access part (e.g., a radio access network (RAN)), which may be described as an evolved universal terrestrial radio access network (E-UTRAN) 502 and a core part (e.g., a core network) which may be referred to herein as an evolved packet core (EPC) 504. The E-UTRAN 502 and EPC 504 together form an evolved packet system (EPS).

The EPS may communicate with a client device 506 (e.g., mobile device, mobile terminal, user equipment (UE), terminal). The client device 506 may include a universal subscriber identity module (USIM) 508 (commonly referred to as a SIM card). The USIM 508 may be an integrated circuit chip that securely stores, for example, an international mobile subscriber identity (IMSI) number and its related key, K. The key, K, may be a root key. The root key, K, may be securely stored at the client device 506 in any number of ways, including but not limited to secure storage on a USIM 508, without departing from any aspects described herein.

Communication in the EPS is divided into planes, namely a user-plane (UP) and a control-plane (CP). In FIG. 5, one particular control-plane signaling path is identified by a dashed line 510 between an access node 512 (e.g., eNodeB) and a mobility management entity (MME) 514, while one particular user-plane data path is identified by a solid line 516 between the access node 512 and a serving gateway (S-GW) 518. Additional and alternative paths for control-plane signaling and user-plane data are known to those of skill in the art. The illustration of FIG. 5 is exemplary and not meant to be limiting.

The E-UTRAN 502 includes an access node 512, which includes hardware that wirelessly communicates with a client device 506. In Long Term Evolution (LTE) networks, for example, the access node 512 may be referred to as an evolved Node B (eNodeB). By way of example, a single LTE access node may serve one or more E-UTRAN 502 cells.

The EPC 504 includes various network entities such as a packet data network (PDN) gateway (P-GW) 520. The P-GW 520 serves as a gateway to packet data network 522 such as the Internet and/or private corporate networks. A P-GW 520 may be considered as a passageway and a point of network policy enforcement to the packet data network 522; whereas an access node 512 may be considered as a passageway for over-the-air access of a client device 506 to a core network (e.g., EPC 504) through which a packet data network 522 is connected. An access node 512 may be collocated with a P-GW 520, but the function of the access node 512 is different from that of the P-GW 520. In other words, even if they are collocated, the access node 512 and the P-GW 520 are separate entities with separate functions.

The EPC 504 further includes network entities such as a home subscriber server (HSS) 524. The HSS 524 stores the unique identities of each client device 506. An authentication center (AuC) 526 may be coupled to the HSS 524. The AuC 526 may serve to authenticate the USIM 508 when the client device 506 attempts to connect to the EPC 504 (e.g., core network). The AuC 526 may store the same key as that stored in the USIM 508. Authentication of the USIM 508 card may typically occur when the client device 506 is powered on.

The EPC 504 also includes network entities such as an S-GW 518. The S-GW 518 executes functions related to the transportation of user-plane IP messages to and from a client device 506. It is generally understood that a message may include one or more packets. Packets and messages may have different formats and be encapsulated by different headers. For ease of reference herein, the term message is used throughout. The EPC 504 also includes the MME 514. The MME 514 is involved in the control-plane, while the client device 506, access node 512, S-GW 518, P-GW 520, and HSS 524 are involved in both the control and user-planes. The MME 514 executes functions related to setting up, maintaining, and releasing various physical channels.

The EPC 504 may further include a network entity, which may be referred to herein as a Session Key Management Entity (SKME) 528. Alternative names for the SKME 528 are acceptable, such as a local key anchor, a local trust anchor, a key derivation and maintenance store, etc. One or more SKME may be located in a given domain/network/serving network. For example, in the aspects described herein, one SKME may be referred to as a Home Session Key Management Entity (H-SKME) 528 when it is being considered as residing in a home network of a client device. By way of further example, in the aspects described herein, one SKME may be referred to as a Visited Session Key Management Entity (V-SKME) 530 when it is being considered as residing in a visited network of a client device. The H-SKME 528 and/or V-SKME 530 may be located between the HSS 524 and the MME 514. In some aspects, the H-SKME 528 and/or V-SKME 530 may be described as being logical entities; their functions may be implemented in hardware specially configured to perform the tasks of the H-SKME 528 and/or V-SKME 530. Although the V-SKME 530 is shown as being connected in series to the HSS 524 via the H-SKME 528, the V-SKME 530 may directly communicate with the HSS 524. In some aspects, one SKME may perform the functions of both the H-SKME 528 and the V-SKME 530. The EPC 504 of the next generation cellular network may further include a visited P-GW (also referred to as a V-P-GW 532). In a next generation cellular network as disclosed herein, the H-SKME 528 and/or V-SKME 530 may serve as local trust anchors or local key anchors. A dashed line between the H-SKME 528 and P-GW 520 identifies a first control-plane signaling path 534. A dashed line between the V-SKME 530 and V-P-GW 532 identifies a second control-plane signaling path 536. The first control-plane signaling path 534 and/or second control-plane signaling path 536 may be used to deliver a first shared key (e.g., $K_{P-GW}$ key 724, FIG. 7) from the local trust anchors or local key anchors, H-SKME 528, V-SKME 530 to the P-GW 520, V-P-GW 532 as needed.

To provide user-plane security in a next generation cellular network, from the client device 506 through to the P-GW 520, the H-SKME 528 and/or V-SKME 530 are introduced between the HSS 524 and the MME 514. The H-SKME 528 and/or V-SKME 530 may be responsible for deriving, maintaining, and/or storing a shared key. The client device 506 and the P-GW 520 (and/or V-P-GW 532) may share the shared key. The H-SKME 528 may provision the shared key to the P-GW 520 in its home network. The V-SKME 530 may provision the shared key to the V-P-GW 532 of the visited network. The shared key may be used to protect the user-plane data in a next generation cellular network. The shared key may be referred to as a $K_{P-GW}$ key (e.g., $K_{P-GW}$ key 724, FIG. 7). The client device and the P-GW 520 and/or V-P-GW 532 independently know, obtain, and/or derive the first shared key. That is, there is no negotiation between the client device 506 and the P-GW 520 and/or V-P-GW 532 with respect to the knowledge, obtaining, and/or derivation of the first shared key. There is no exchange of key-related information between the client device 506 and the P-GW 520 and/or V-P-GW 532.

In case of a home network, the functionality of the H-SKME 528 could possibly be implemented in the HSS 524.

According to some aspects described herein, the role of a local trust anchor or local key anchor (a role played by an MME in a 4G cellular network) may be assigned to the H-SKME 528 and/or V-SKME 530 in the next generation cellular network.

Figure 6:
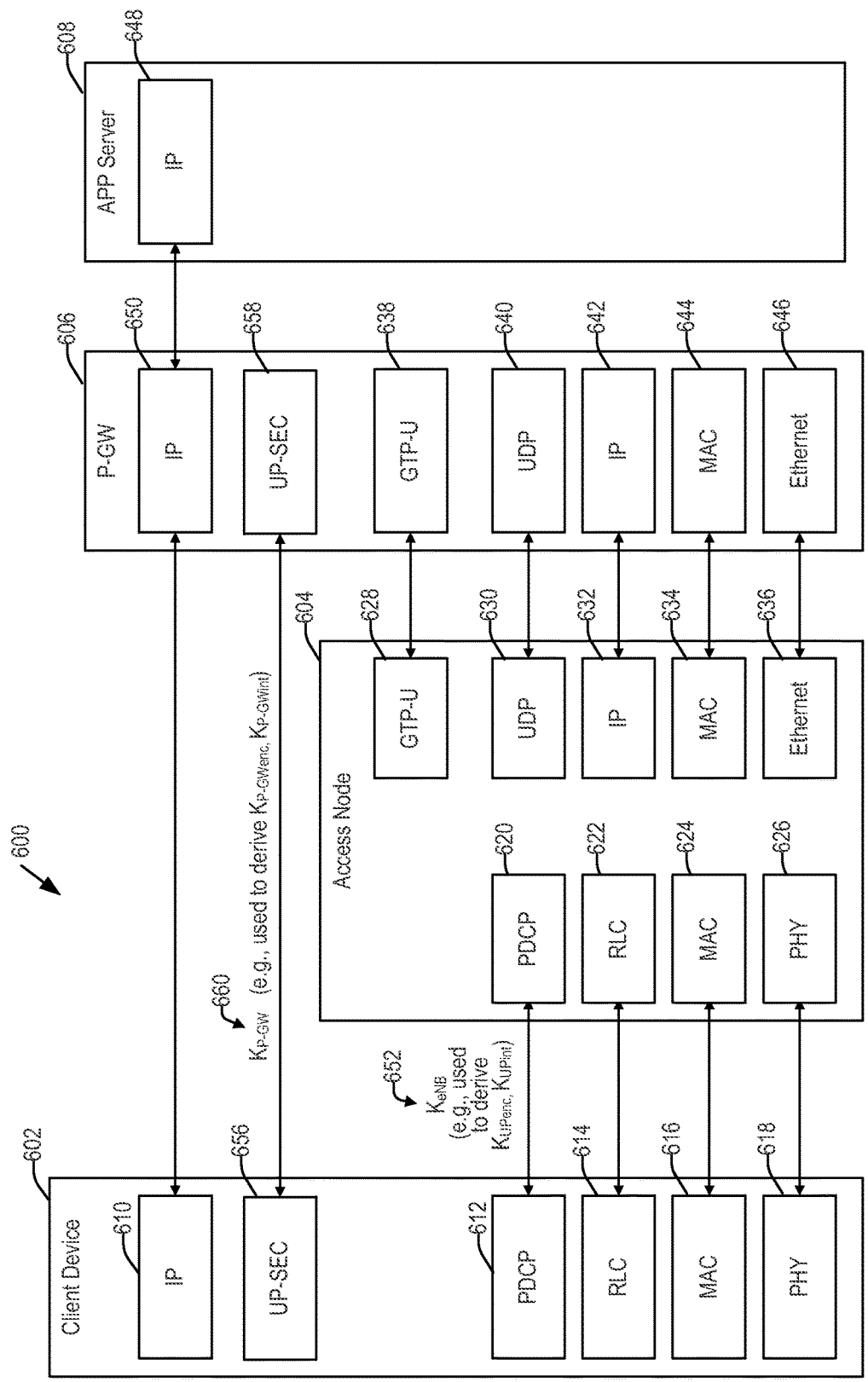
FIG. 6 is a block diagram of various protocol stacks implemented in a user-plane of the next generation cellular network of FIG. 5.

FIG. 6 is a block diagram of various protocol stacks 600 implemented in a user-plane of the next generation cellular network of FIG. 5. The various protocol stacks 600 are illustrated as being implemented in a client device 602, an access node 604, a packet data network gateway (P-GW) 606, and an application server (App Server) 608. In accordance with the standard OSS model, the protocol stack implemented in a client device 602 may include an Internet Protocol layer (IP layer) 610, a Packet Data Convergence Protocol (PDCP) layer 612, a Radio Link Control (RLC) layer 614, a Medium Access Control (MAC) layer 616, and a Physical (PHY) layer 618. The protocol stack implemented in an access node 604 may include a corresponding PDCP layer 620, RLC layer 622, MAC layer 624, and PHY layer 626 for communication with the client device 106. In addition, a GPRS Tunneling Protocol for User-plane (GTP-U) layer 628, a User Datagram Protocol (UDP) layer 630, an Internet Protocol (IP) layer 632, a MAC layer 634, and an Ethernet layer 636 are included for communication with a P-GW 606. The protocol stack implemented in the P-GW 606 may include a corresponding (GTP-U) layer 638, a User Datagram Protocol (UDP) layer 640, an Internet Protocol (IP) layer 642, a MAC layer 644, and an Ethernet layer 646 for communication with the access node 604. The protocol stack implemented in the APP Server 608 may include an IP layer 648 for communication with an IP layer 650 of the P-GW 606. The IP layer 650 of the P-GW 606 may communicate with the IP layer 610 of the client device 602. The just-identified layers are known in the art. Detailed explanations of these layers are available to those of skill in the art and will not be described herein for purposes of conciseness.

FIG. 6 further illustrates new layers in the protocol stacks implemented in the client device 602 and P-GW 606. Namely, the User-Plane Security (UP-SEC) layer 656 in the client device 602 and UP-SEC layer 658 in the P-GW 606 are new. Alternative names for these layers are acceptable. The UP-SEC layer 656 may be responsible for encrypting and/or authenticating the IP packet (e.g., IP message) of the client device 602 using keys that were derived based on the $K_{P-GW}$ key 660 (e.g., using $K_{P-GWenc}$, $K_{P-GWint}$). Once encrypted and/or integrity protected, the access node 604 cannot decrypt the IP message, it can only forward the message to the P-GW 606. Only the P-GW 606 can decrypt and/or authenticate the message because the keys that were derived based on the $K_{P-GW}$ key 660 are shared only by the client device 602 and P-GW 606; they are not available to the access node 604. The same is true in the opposite direction. The UP-SEC layer 656 implemented in the client device 602 is higher than the PDCP layer 612 implemented in the client device 602. The UP-SEC layer 658 of the P-GW 606 is higher than the GTP-U layer 638 of the P-GW 606. Although there is no need for an IPSEC tunnel between the access node 604 and the P-GW 606, a network may optionally implement an IPSEC tunnel in addition to protecting the message with the $K_{P-GW}$ key 660 in the UP-SEC layers 656, 658. For example, the P-GW 606 may use IPSEC to verify that a received message is received from a given access node 604. However, IPSEC need not be relied on for user-plane security. Accordingly, the client device 602 and the P-GW 606 can provide encryption (confidentiality) and/or integrity protection to messages in user-plane traffic using the shared keys (e.g., $K_{P-GWenc}$, $K_{P-GWint}$) that were derived based on the shared $K_{P-GW}$ key 660.

In the aspects described herein, the access node 604 may be caused to, or may be configured to, encrypt and/or authenticate messages based on whether the new aspect of user-plane security (UP-SEC) protection between the client device 602 and the P-GW 606 is enabled. Overhead may be avoided by use of this option. More precisely, if the new aspect of UP-SEC protection between client device 602 and the P-GW 606 is not enabled, the access node 604 may perform the same behavior as in the present 4G practice. If the new aspect of UP-SEC protection between client device 602 and the P-GW 606 is enabled, messages in the IP layer may be encrypted/decrypted and/or authenticated/integrity verified based on a first shared key, the $K_{P-GW}$ key 660 (where the $K_{P-GW}$ key 660 may be used to derive the shared keys $K_{P-GWenc}$ and $K_{P-GWint}$). In addition, messages in the PDCP layer may optionally be encrypted/decrypted and/or authenticated/integrity verified based on a second shared key, the $K_{eNB}$ key 652 (where the $K_{eNB}$ key 652 may be used to derive the shared keys $K_{UPenc}$ and $K_{UPint}$). As described above, the derivation of the $K_{eNB}$ key 652 is based on the $K_{ASME}$ key, which is known to the MME. However, in the aspects described herein, the MME is not provided with the $K_{P-GW}$ key 660 (i.e., the MME does not know the $K_{P-GW}$ key 660). In fact, the $K_{eNB}$ key 652 and the $K_{P-GW}$ key 660 have no correlation—they are uncorrelated. The features of UP-SEC based on use of the $K_{P-GW}$ key 660, and the optional additional user-plane security between the client device and the access node based on use of $K_{eNB}$ key 652, may be enabled/disabled based on, for example, a configuration per network, or a configuration per bearer per the client device 602.

In an exemplary practical use of a next generation (e.g., 5G) cellular network, an unencrypted IP message may be the same as that presently found in a 4G cellular network. However, the methods of key generation and the addition of the UP-SEC layer 656 in the client device 602 and UP-SEC layer 658 in the P-GW 606 may be introduced in the aspects of the exemplary next generation cellular networks described herein. The UP-SEC layer 656 in the client device 602 and UP-SEC layer 658 in the P-GW 606 may be responsible for encrypting and/or authenticating the client device 602 IP messages using shared keys (e.g., $K_{P-GWenc}$, $K_{P-GWint}$) that were derived based on the $K_{P-GW}$ key 660. In the next generation cellular networks as exemplified herein, once an IP message is encrypted and/or integrity protected based on the first shared key (e.g., the $K_{P-GW}$ key 660), the access node 112 cannot decrypt and/or authenticate the IP message. In the next generation aspects exemplified herein, it is preferred that only the P-GW 606 can decrypt and/or authenticate a message encrypted and/or integrity protected using keys based on the first shared key (e.g., the $K_{P-GW}$ key 660). This may represent a security improvement over 4G cellular networks that may be possible in next generation cellular networks because, in next generation cellular networks, the client device 602 and P-GW 606 may share one or more keys (e.g., $K_{P-GWenc}$, $K_{P-GWint}$) based on the $K_{P-GW}$ key 660. Based on the $K_{P-GW}$ key 660, the client device 602 and P-GW 606 can provide confidentiality and/or integrity to the messages of the user-plane. As explained above, it is further noted that the access node 604 may optionally be used to add additional security to a message encrypted and/or integrity protected with shared keys based on the first shared key (the $K_{P-GW}$ key 660) by use of a second shared key (e.g., the $K_{eNB}$ key 652). That is, the access node 604 may encrypt and/or integrity protect the message encrypted and/or integrity protected with keys based on the first shared key (the $K_{P-GW}$ key 660) with keys based on the second shared key (the $K_{eNB}$ key 652). The access node 112 may then transmit the secured message to the P-GW 606.

Figure 7:
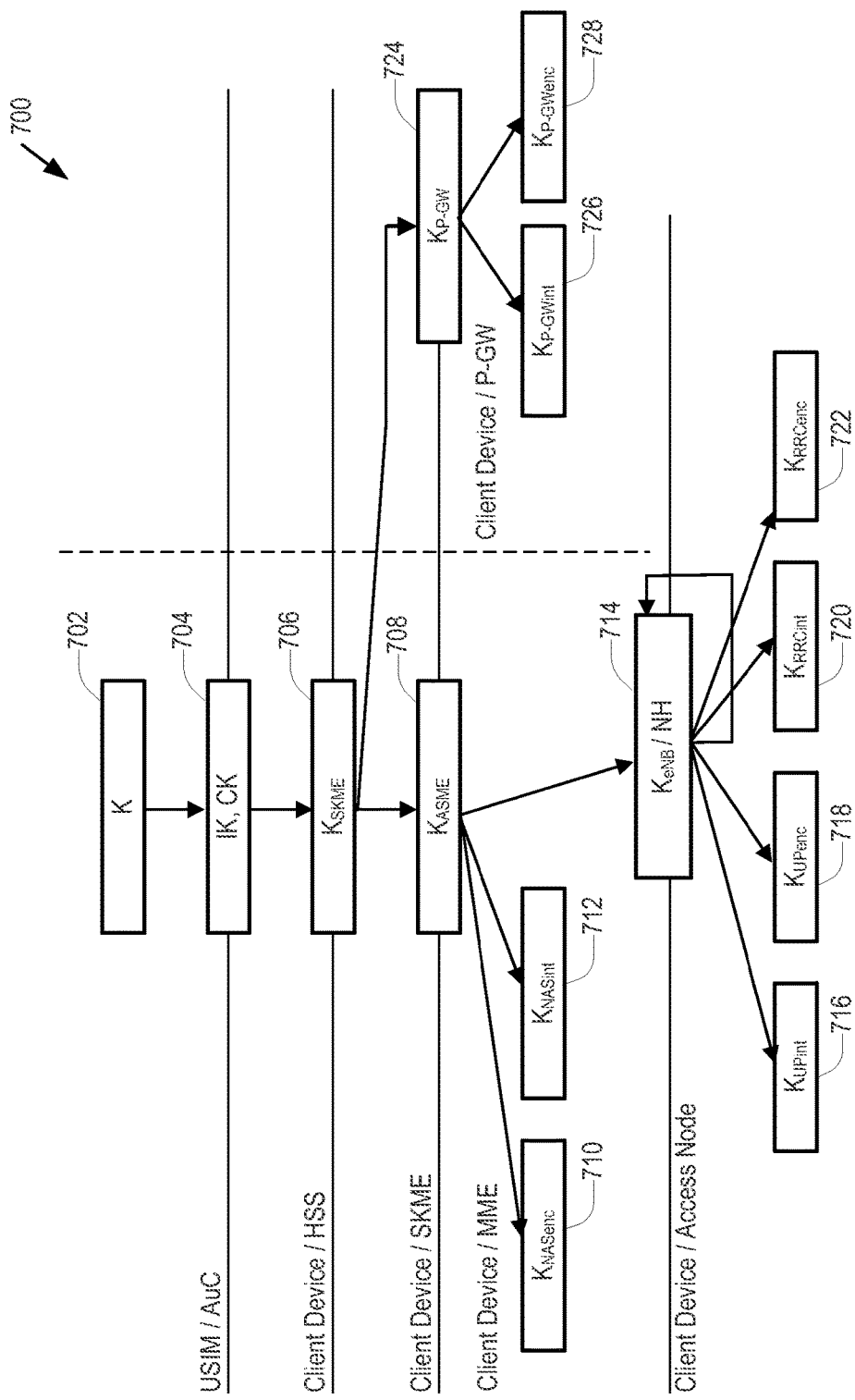
FIG. 7 is a key hierarchy implemented in the exemplary next generation cellular network of FIG. 5.

FIG. 7 is a key hierarchy 700 implemented in the exemplary next generation cellular network of FIG. 5. A root key, identified herein as a K key 702, may be stored on a Universal Subscriber Identity Module (USIM) of a client device and may also be stored at an Authentication Center (AuC) of a core network. In aspects described herein, the K key 702 is not transmitted over the air. During an authorization session between the client device and the core network, the USIM and the AuC may each independently derive an Integrity Key (IK) and a Cypher Key (CK), referred to herein collectively as the IK, CK key 704, based on the K key 702 that they each respectively have in their possession. The IK, CK key 704 may be referred to as a session key and more specifically as an authorization session key.

During an Authentication and Key Agreement (AKA) procedure, the IK, CK key 704 may be sent to the HSS from the AuC. In aspects described herein, the IK, CK key 704 is not transmitted over the air. In other words, the HSS may obtain the IK, CK key 704 from the AuC. The client device already has the IK, CK key 704 (by virtue of the IK and CK keys being derived by the USIM at the client device).

Instead of the client device and HSS each independently deriving a $K_{ASME}$ key (as in the present 4G cellular networks), the client device and the HSS may each independently derive a new key referred to herein as a $K_{SKME}$ key 706, where SKME may stand for Session Key Management Entity, based on the IK, CK key 704. The $K_{SKME}$ key 706 is not sent to an MME from the HSS. Instead, the $K_{SKME}$ key 706 may be sent to an SKME (e.g., H-SKME 528, FIG. 5) from the HSS. In other words, the SKME may obtain the $K_{SKME}$ key 706 from the HSS. In aspects described herein, the $K_{SKME}$ key 706 is not transmitted over the air. The client device already has the $K_{SKME}$ key 706 (by virtue of the $K_{SKME}$ key 706 being derived based on the IK, CK key 704 at the client device).

The client device and the SKME may each independently derive a $K_{ASME}$ key 708 based on the $K_{SKME}$ key 706. The $K_{ASME}$ key 708 may be sent to an MME from the SKME. In other words, the MME may obtain the $K_{ASME}$ key 708 from the SKME. In aspects described herein, the $K_{ASME}$ key 708 is not transmitted over the air. It is noted that the just-recited SKME is a local SKME regardless of whether the client device is attached to a home network or a visited network. It is also noted that the $K_{ASME}$ key 708 may be similar to the $K_{ASME}$ key in 4G; however, derivation of the $K_{ASME}$ key 708 in the aspects described herein based on the $K_{SKME}$ key 706—not the IK, CK key 704. The client device already has the $K_{ASME}$ key 708 (by virtue of deriving the $K_{ASME}$ key 708 based on the $K_{SKME}$ key 706 at the client device).

The introduction of the SKME in aspects described herein provides for an additional key hierarchy layer between the HSS and the MME in comparison to that of the 4G key hierarchy (as exemplified in FIG. 3).

The client device and the MME may each independently derive a non-access stratum encryption key, the $K_{NASenc}$ key 710 and a non-access stratum integrity key, the $K_{NASint}$ key 712, based on the $K_{ASME}$ key 708. The $K_{NASenc}$ key 710 and the $K_{NASint}$ key 712 are intended to protect control-plane messages between the client device and the MME. Such protection prevents other elements from decrypting or modifying the messages in the control-plane.

The client device and the MME may also each independently derive an access node key, referred to herein as a $K_{eNB}$ key 714, based on the $K_{ASME}$ key 708. The $K_{eNB}$ key 714 may be sent to the access node from the MME. In other words, the access node may obtain the $K_{eNB}$ key 714 from the MME. The client device already has the $K_{eNB}$ key 714 (by virtue of deriving the $K_{eNB}$ key 714 based on the $K_{ASME}$ key 708 at the client device). In aspects described herein, the $K_{eNB}$ key 714 is not sent over the air.

At this point the client device and access node each possess a key identified as the $K_{eNB}$ key 714. In other words, the client device and access node share the $K_{eNB}$ key 714.

Reference is made, within the block including the $K_{eNB}$ key 714, to the Next Hop (NH) counter. The function of the NH counter is described above and is not repeated for the sake of conciseness.

Using the $K_{eNB}$ key 714, the client device and the access node may independently derive four different keys. The four possible keys include a user-plane integrity key, which is denoted as the $K_{UPint}$ key 716, a user-plane encryption key, which is denoted as the $K_{UPenc}$ key 718, a control-plane integrity key, which is denoted as the $K_{RRCint}$ key 720, and a control-plane encryption key, which is denoted as the $K_{RRCenc}$ key 722. Keys with the subscript "enc" are used for encryption. Keys with the subscript "int" are used for integrity. The $K_{UPint}$ key 716 and $K_{UPenc}$ key 718 are used for integrity protection and encryption, respectively, of user-plane data for messages transferred over-the-air between the client device and the access node. They may be used to encrypt/integrity protect messages in the PDCP layer between the client device and access node. The $K_{RRCint}$ key 720 and $K_{RRCenc}$ key 722 are used for integrity protection and encryption, respectively, of radio resource control (RRC) data.

Additionally, another key may be derived based on the $K_{SKME}$ key 706. The additional key may be referred to as the $K_{P\text{-}GW}$ key 724, shown on the right side of FIG. 7. The $K_{P\text{-}GW}$ key 724 and the $K_{SKME}$ key 706 may be new features in the next generation cellular networks in comparison to the features of 4G cellular networks. The client device and the SKME may each independently derive the $K_{P\text{-}GW}$ key 724 based on the $K_{SKME}$ key 706. The SKME may provision the $K_{P\text{-}GW}$ key 724 to the P-GW. In aspects described herein, the $K_{P\text{-}GW}$ key 724 is not transmitted over the air. The $K_{P\text{-}GW}$ key 724 is a shared key, in that both the client device and the P-GW possess the same key. In other words, the key is shared because both entities possess their own independently derived or obtained copy of the key, not because one entity distributed its copy of the key to the other entity or negotiated the derivation or generation of the key with the other entity. Sharing of the $K_{P\text{-}GW}$ key 724 does not require any signaling, negotiation, or interaction between the client device and the P-GW. It is noted that the $K_{P\text{-}GW}$ key 724 is provisioned by a visited-SKME (V-SKME) if the client device is connected to a packet data network (e.g., the Internet) via a P-GW in a visited domain (e.g., a V-P-GW). If the client device is connected to the packet data network via a home P-GW (e.g., an H-P-GW), the $K_{P\text{-}GW}$ should be provisioned by the home-SKME (H-SKME). Whether to use the H-P-GW (i.e., the home domain/home network P-GW) or the V-P-GW (i.e., the visited domain/visited network P-GW) may be configured by a network operator based on, for example, the subscription information of the client device (e.g., from a subscription profile) and/or a service policy of the home domain and/or some other network access policy.

Accordingly, the $K_{P\text{-}GW}$ key 724 may be shared between the client device and the P-GW. The client device and the P-GW may independently derive a $K_{P\text{-}GWint}$ key 726 (integrity key) and a $K_{P\text{-}GWenc}$ key 728 (encryption key) based on the $K_{P\text{-}GW}$ key 724. The integrity key, the $K_{P\text{-}GWint}$ key 726, may be used to create a Message Authentication Code. The encryption key, the $K_{P\text{-}GWenc}$ key 728, may be used for encryption.

From a network perspective, the access node may be a layer-2 (L2) point of attachment, i.e., supporting the MAC/PHY layers, whereas the P-GW may be a layer-3 (L3) point of attachment, i.e., the IP layer. The two need not be collocated but the L2 point of attachment can change while keeping the L3 point of attachment the same.

The $K_{eNB}$ key 714, which may be referred to as a second shared key in some aspects herein, may be used to protect user-plane layer-2 over-the-air messages. The user-plane layer-2 over-the-air messages may reside in a Packet Data Convergence Protocol (PDCP) layer. The $K_{P\text{-}GW}$ key 724, which may be referred to as a first shared key in some aspects herein, may be used to protect user-plane layer-3 messages. The user-plane layer-3 messages may reside in an Internet Protocol layer (IP layer) (e.g., IP layer 610, 650 FIG. 6) or a user-plane security (UP-SEC layer) (e.g., 656, 658, FIG. 6).

In some aspects, the $K_{P\text{-}GW}$ key 724 may be, for example, a function of the $K_{SKME}$ key 706 and an identifier of a particular gateway (GW ID) (e.g., $K_{P\text{-}GW}$=F ($K_{SKME}$, GW ID)). The MME informs the client device of the GW ID during session establishment. The function, F, may be a key derivation function.

Figure 8:
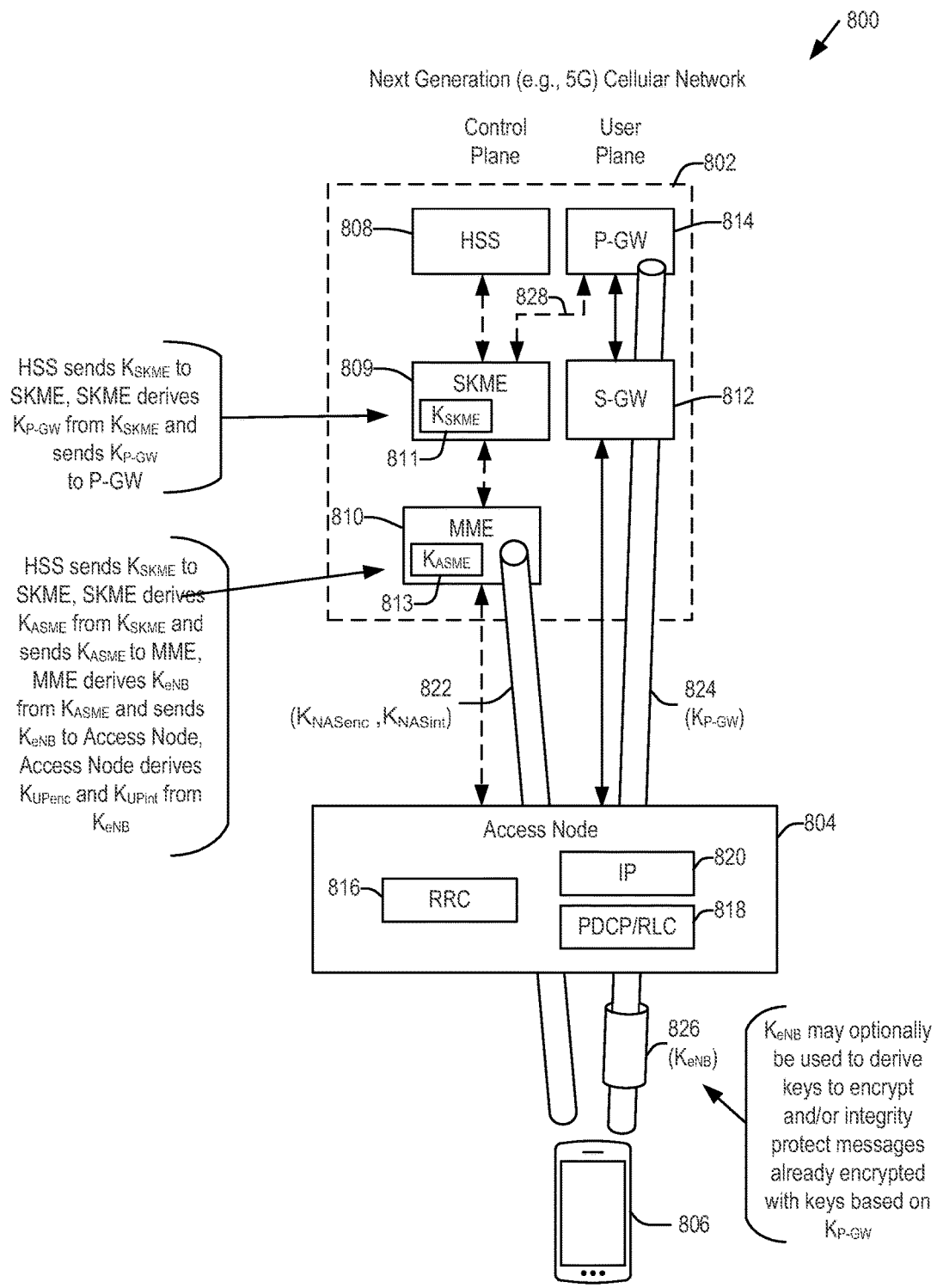
FIG. 8 illustrates elements of an exemplary next generation (e.g., 5G) cellular network, grouping the elements according to the control-plane and user-plane, in accordance with aspects of the disclosure.

FIG. 8 illustrates elements of an exemplary next generation (e.g., 5G) cellular network 800, grouping the elements according to the control-plane and user-plane, in accordance with aspects of the disclosure. In FIG. 8, graphic depictions of tunnels or pipelines 822, 824, 826 are used to represent secure signal paths. FIG. 8 illustrates elements of a core network 802. FIG. 8 also illustrates an access node 804, which may be in wireless communication with the client device 806. The core network 802 includes an HSS 808, a SKME 809, an MME 810, an S-GW 812, and a P-GW 814. The access node 804 includes an RRC 816 entity (an entity found in the control-plane), a PDCP/RLC entity 818, and an IP entity 820 (where the PDCP/RLC and IP entities are found in the user-plane). FIG. 8 relates to a client device in a home network attachment scenario.

FIG. 8 visually illustrates the use of certain derived encryption keys. According to the aspect of FIG. 8, the SKME 809 is a local trust anchor or local key anchor for a Session Key Management Entity key ($K_{SKME}$ key 811). The MME 810 is a local trust anchor or local key anchor for a $K_{ASME}$ key 813.

The pipeline 822 between the MME 810 and client device 806 depicts that control-plane messages between the MME 810 and the client device 806 are sent with the security of the $K_{NASenc}$ and $K_{NASint}$ encryption keys. As described above in connection with FIG. 7, the client device 806 and the MME 810 may each independently derive the non-access stratum encryption $K_{NASenc}$ key and a non-access stratum integrity $K_{NASint}$ key based on the $K_{ASME}$ key 813. Specifically, the HSS 808 sends the $K_{SKME}$ key 811 to the SKME 809, the SKME 809 derives the $K_{ASME}$ key 813 based on the $K_{SKME}$ key 811 and sends the $K_{ASME}$ key 813 to the MME 810, the MME 810 derives the $K_{NASenc}$ and $K_{NASint}$ encryption keys (see pipeline 822) based on the $K_{ASME}$ key 813.

The pipeline 824 between the client device 806 and the P-GW 814 depicts that user-plane messages between the client device 406 and P-GW 814 are sent with the security of the $K_{P\text{-}GW}$ encryption key. As described above in connection with FIG. 7, the client device 806 and the SKME 809 may each independently derive the $K_{P\text{-}GW}$ key based on the $K_{SKME}$ key 811. The SKME may provision the P-GW 814 with the $K_{P\text{-}GW}$ key. Specifically, the HSS 808 sends the $K_{SKME}$ key 811 to the SKME 809; the SKME 809 derives the $K_{P\text{-}GW}$ key based on the $K_{SKME}$ key 811 and sends the $K_{P\text{-}GW}$ key to the P-GW 814. The messages between the client device 806 and the P-GW 814 are sent with the security of a first shared key, the $K_{P\text{-}GW}$ key (see pipeline 824).

The pipeline 826 that surrounds the pipeline 824 between the client device 806 and PDCP/RLC entity 818 of the access node 804 depicts that a second shared key, the $K_{eNB}$ key, may optionally be used to encrypt and/or authenticate messages already encrypted and/or authenticated based on the $K_{P\text{-}GW}$ key. The optional second encryption and/or authentication may be available for the message as it is sent between the access node 804 and the client device 806, in either the uplink or the downlink directions.

As indicated above, the SKME 809 may be responsible for deriving the key referred to as the $K_{P\text{-}GW}$ key. The client device 806 could possibly derive every key based on the root key, K, shared between itself and the AuC, therefore it might also derive the $K_{P\text{-}GW}$; however, P-GW 814 is unable to derive the $K_{P-GW}$ key for the data connection of the client device 806. Therefore, SKME 809 may derive the $K_{P-GW}$ key based on the $K_{SKME}$ key 811 and send the $K_{P-GW}$ key to the P-GW 814 via, for example, a control-plane signal path 828. Consequently, the client device 806 and the P-GW 814 share a key, the $K_{P-GW}$ key. As will be understood, when two entities share a key, then they can secure a connection, by whatever means.

Unlike the $K_{ASME}$ key in a 4G network, the $K_{P-GW}$ key is not provisioned to the MME 810. The $K_{P-GW}$ key is not provisioned to the MME 810 because the client device 806 may relocate to a different MME during a handover. In such a case, the $K_{P-GW}$ key would need to be transferred from a first MME 810 to a second MME (not shown). However, in next generation cellular networks, the security architecture may be designed to consider the MME 810 as a less trusted entity.

It is expected that many more mobile devices will use next generation cellular networks than are presently using 4G cellular networks. According to one estimate, the number of mobile devices may increase by a factor of one hundred in ten years. Given such a large number of client devices, the number of MMEs may increase dramatically. Today, in a 4G network, the MME is considered a trusted entity. Today, a large nationwide telephone company may need only four MMEs to cover their entire network. Because this number is small, strong security can be established for each MME. For example, today's MMEs may be housed in secure facilities with limited access. However, if the number of MMEs increase to several hundred, it will most likely be difficult to maintain the same level of security. It is anticipated that the number of MMEs will increase once next generation (5G) cellular networks become widely used. Additionally, it is understood that work is being conducted on "re-locatable" MMEs. These types of MMEs may be located close to access nodes to support fast handover. Consequently, this may mean that the re-locatable MMEs might be located in public areas, which would increase their vulnerability to attack. For these and other reasons, it may be desirable to treat the MME 810 as a less trusted entity. This may be another reason for introducing the SKME 809, which may be utilized for key derivation and key management (e.g., maintenance, storage). It is noted that key derivation functions may include a hash message authentication code (HMAC) of length X (HMAC-X), where X is a key length.

Accordingly, $K_{P-GW}$ may be derived by the SKME 809 and provisioned to the P-GW 814; thusly, the client device 806 could have a direct security relationship with the P-GW 814 based on the shared key, $K_{P-GW}$. This could result in user-plane trust being anchored at the P-GW 814 (not at the access node 804 as in 4G). In other words, to protect the user-plane data, the client device 806 would not need to, or be required to, trust any entity/element between itself and the P-GW 814. The client device 806 would not need to trust the access node 804 or any other device or router sitting on the path between it and the P-GW 814, as it must due today in 4G.

Nonetheless, in some aspects, in addition to the encryption and/or authentication of user-plane messages based on the first shared key (the $K_{P-GW}$ key shared by the client device 806 and the P-GW 814), the client device 806 may also utilize additional encryption and/or authentication using other keys shared by itself and other elements or entities of a next generation (e.g., 5G) cellular network. In one or more of these ways, the aspects described herein could provide better user-plane security in 5G as compared with 4G. The improved user-plane security may be realized at least by sharing the first shared key, the $K_{P-GW}$ key, such that a next generation cellular network can provide confidentiality and integrity protection to messages being passed to and from the client device 806 and the P-GW 814.

Another difference between 4G and next generation cellular networks may be that in the 4G network, the $K_{UPenc}$ key is derived based on the $K_{eNB}$ key. The $K_{UPenc}$ key is used to encrypt the over-the-air traffic between the client device and the access node. This means that the over-the-air traffic is not integrity protected. This lack of integrity protection may have been due to a lack of bandwidth during the design time of the 4G specifications. The next generation (e.g., 5G) cellular network may be designed to overcome these and other deficiencies of the 4G cellular network, and generally, to provide a better security than 4G. This may entail providing integrity protection for user-plane messages (which is not provided in 4G). Consequently, a useful feature, such as the feature of providing integrity protection for the user-plane traffic, may be used in next generation cellular networks. The integrity protection may be optional, in the same way, for example, that encryption is optional in some countries. In some aspects, the client device 806 and the P-GW 814 may make an agreement as to whether they should encrypt the messages being passed therebetween, provide integrity protection for the messages being passed therebetween, or both.

Integrity Protection

For confidentiality, a message may be encrypted. If a recipient has a key used to encrypt the message, the recipient can decrypt the message. If the recipient does not have the key, the message cannot be decrypted and the message confidentiality is maintained. However, in some scenarios an attacker in the middle might only change some bits in an encrypted message. The attacker in the middle may not know anything about the content of the message, but may be able to capture the encrypted message, change one or more bits, and send the message on to its intended recipient. Now the recipient decrypts the message, but does not know that some of the bits have been changed; the recipient trusts the message. In order to secure the message, in addition to a cipher (used to encrypt the message), the message may be protected so that the recipient can determine if the message has been modified during transit.

To accomplish such protection, a message authentication code may be calculated/generated/derived/obtained and added to the end of the message before the message is sent to the recipient. A message authentication code may be used to provide integrity and authenticity assurances on the message. Integrity assurances detect accidental and intentional message changes (e.g., integrity of a message), while authenticity assurances affirm the message's origin (e.g., identity verification of the message creator). Calculation/generation/derivation/obtaining of the message authentication code may involve encrypting the message with an integrity protection key, such as $K_{P-GWint}$. As described herein, $K_{P-GWint}$ may be derived independently by the client device and the P-GW. $K_{P-GWint}$ may be derived based on the $K_{P-GW}$ key. $K_{P-GWint}$ may be derived locally by the client device, based on the $K_{P-GW}$ key derived at the client device. $K_{P-GWint}$ may be derived locally by the P-GW based on the $K_{P-GW}$ key obtained by the P-GW from the SKME. Accordingly, both the client device and the P-GW may share the $K_{P-GWint}$ key. A recipient (e.g., the client device or the P-GW) can verify the message authentication code because the recipient has the integrity protection key used by the sender (e.g., both the client device and P-GW have $K_{P-GWint}$). Accordingly, the recipient can calculate/generate/ derive/obtain the message authentication code from the received message, and compare it to the message authentication code received with the message. Integrity and authenticity may be verified it the recipients message authentication code matches the sender's message authentication code. It is noted that message authentication may be performed using an integrity algorithm. Examples of integrity algorithms include cipher-based message authentication code (CMAC), cipher block chaining message authentication code (CBC-MAC), keyed-hash message authentication code (HMAC), Galois Message Authentication Code (GMAC), and evolved packet system integrity algorithm 1, 2, or 3 (EIA1/EIA2/EA3) in 3GPP.

If integrity of the message can be verified at an access node, then the access node does not need to send messages lacking integrity to a P-GW. If integrity of the message can be verified at a P-GW, then the P-GW does not need to send messages lacking integrity to a packet data network. This may reduce the amount of resources that may otherwise be used in transmitting corrupted messages. Accordingly, in some aspects of the next generation cellular networks disclosed herein, a benefit of protecting both confidentiality and integrity in the user-plane may be realized over 4G cellular networks, which only protect confidentiality in the user-plane.

Control-Plane/User-Plane Call Flow

Figure 9:
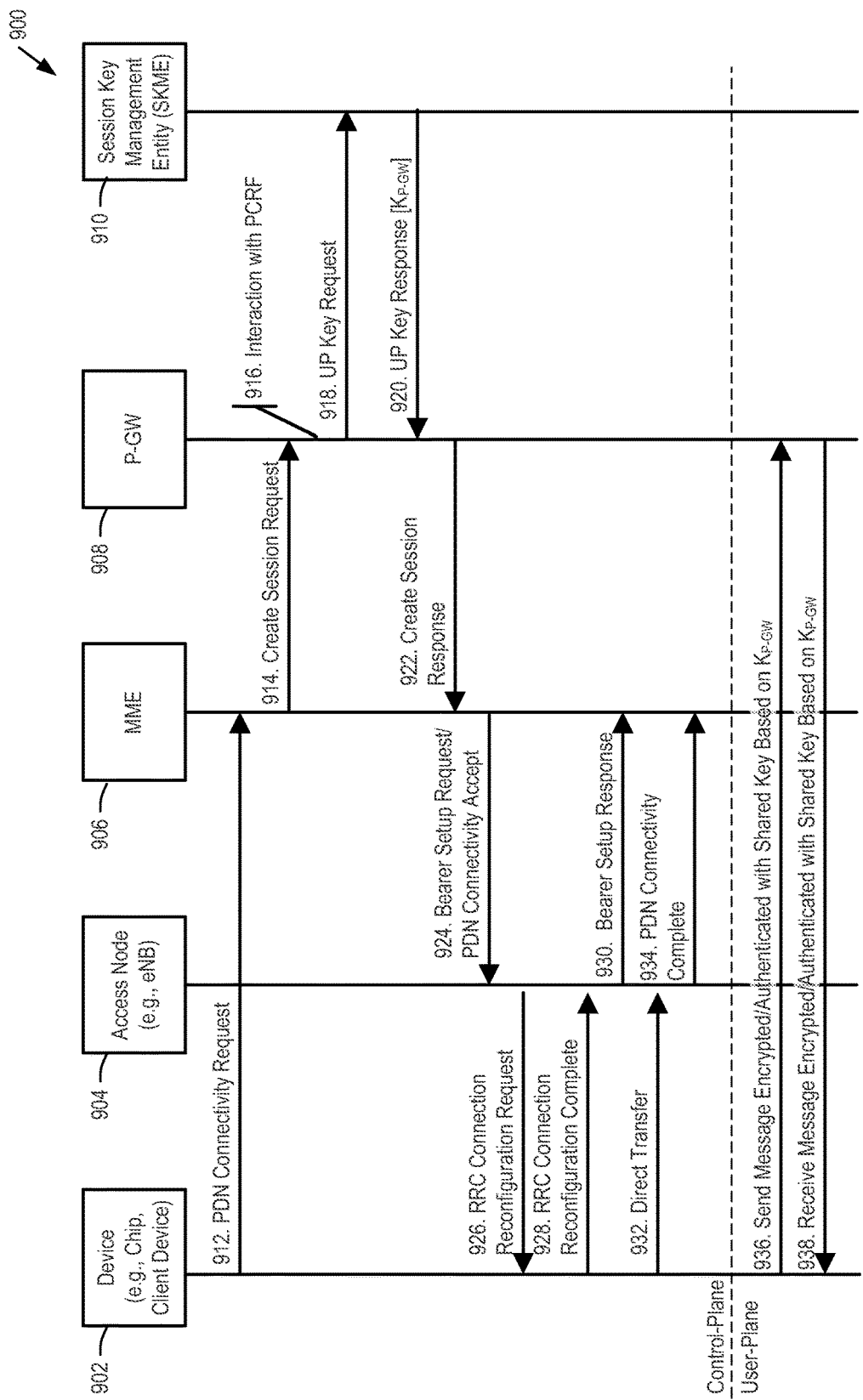
FIG. 9 illustrates an example of a call flow associated with initial provisioning of a shared key, referred to herein as a $K_{P\text{-}GW}$ key, in the control-plane during a packet data network (PDN) connection setup, and subsequent communication of messages encrypted/authenticated with the $K_{P\text{-}GW}$ key in the user-plane, in accordance with aspects of the disclosure.

FIG. 9 illustrates an example of a call flow 900 associated with initial provisioning of a shared key, referred to herein as a $K_{P\text{-}GW}$ key, in the control-plane during a packet data network (PDN) connection setup, and subsequent communication of messages encrypted/authenticated based on the $K_{P\text{-}GW}$ key in the user-plane, in accordance with aspects of the disclosure. FIG. 9 is based on 3GPP TS 23.401, FIG. 5.10.2-1. However, new calls, identified as UP Key Request 918 and UP Key Response 920, have been added over that shown in 3GPP TS 23.401, FIG. 5.10.2-1.

FIG. 9 depicts a device 902 (e.g., chip component, client device), an access node 904 (e.g., eNodeB, eNB), an MME 906, a P-GW 908, and a Session Key Management Entity (SKME) (910). The device may send 912 a PDN Connectivity Request to an MME. The MME may send 914 a Create Session Request to the P-GW. The P-GW may interact 916 with a Policy Control and Charging Rules Function (PCRF). For example, the P-GW may assign an IP address and prepare a bearer. A detailed explanation of the steps involved in the interaction with the PCRF is omitted for conciseness. The P-GW may send 918 a User-Plane (UP) Key Request to the SKME (for example if the P-GW does not have a $K_{P\text{-}GW}$ for the device 902). The UP Key Request may be used to obtain, for example, a key such as the $K_{P\text{-}GW}$ key 724 of FIG. 7. The SKME may then send 920 a UP Key Response to the P-GW. The UP Key Response may include the shared key, $K_{P\text{-}GW}$. In this way, the P-GW may obtain the shared $K_{P\text{-}GW}$ key from the SKME.

The P-GW may next send 922 a Create Session Response to the MME. The MME may send 924 a Bearer Setup Request/PDN Connectivity Accept to the access node. The access node may then send 926 an RRC Connection Reconfiguration Request to the device. The device may send 928 an RRC Connection Reconfiguration Complete to the access node. The access node may send 930 a Bearer Set Up Response to the MME. The device may send 932 a Direct Transfer to the access node. The access node may send 934 a PDN Connectivity Complete to the MME. Those of skill in the art will understand the calls represented by reference numbers 912-916 and 922-934. A detailed explanation of those calls is omitted for conciseness.

New calls, identified as UP Key Request 918 and UP Key Response 920 have been added over that shown in 3GPP TS 23.401, FIG. 5.10.2-1. The new calls, UP Key Request 918 and UP Key Response 920, are made to and from the SKME in accordance with aspects of the disclosure set forth herein.

If the P-GW does not have a shared $K_{P\text{-}GW}$ key for a given device, it may request the shared key from the SKME. The request may be made by use of the UP Key Request 918. The SKME may then send the $K_{P\text{-}GW}$ key to the P-GW. The $K_{P\text{-}GW}$ key may be provisioned to the P-GW using the UP Key Response 920.

After the device has derived its copy of the $K_{P\text{-}GW}$ key, the device may send 936 a first message to a network, via the P-GW, in the user-plane. The first message may be encrypted and/or authenticated based on the shared $K_{P\text{-}GW}$ key. Additionally, the device may receive 938 a second message from the network via the P-GW, wherein the second message may be encrypted and/or authenticated based on the shared $K_{P\text{-}GW}$ key. Because the device already has its copy of the shared $K_{P\text{-}GW}$ key, the device may decrypt and/or authenticate the received second message.

In some aspects, a method for protecting a user-plane message might include deriving, at a client device, a first shared key ($K_{P\text{-}GW}$) for ciphering and/or authenticating messages, wherein the first shared key is shared by the client device and a P-GW (i.e., a gateway to a packet data network). A first message may be encrypted or authenticated with the first shared key to produce a first encrypted and/or authenticated message. The first encrypted and/or authenticated message may be transmitted, over-the-air from the client device to an access node. In still a further aspect, the encrypting and/or authenticating of the first message with the first shared key might additionally include deriving, at the client device, a second shared key for ciphering and/or authenticating messages, wherein the client device and the access node share the second shared key. The second shared key is different from the first shared key. They are uncorrelated. The method may still further include encrypting and/or authenticating the first encrypted and/or authenticated first message with the second shared key to produce a second encrypted and/or authenticated message. The second encrypted and/or authenticated message may be transmitted, over-the-air from the client device to an access node.

Visited Networks

Figures 10A, 10B:
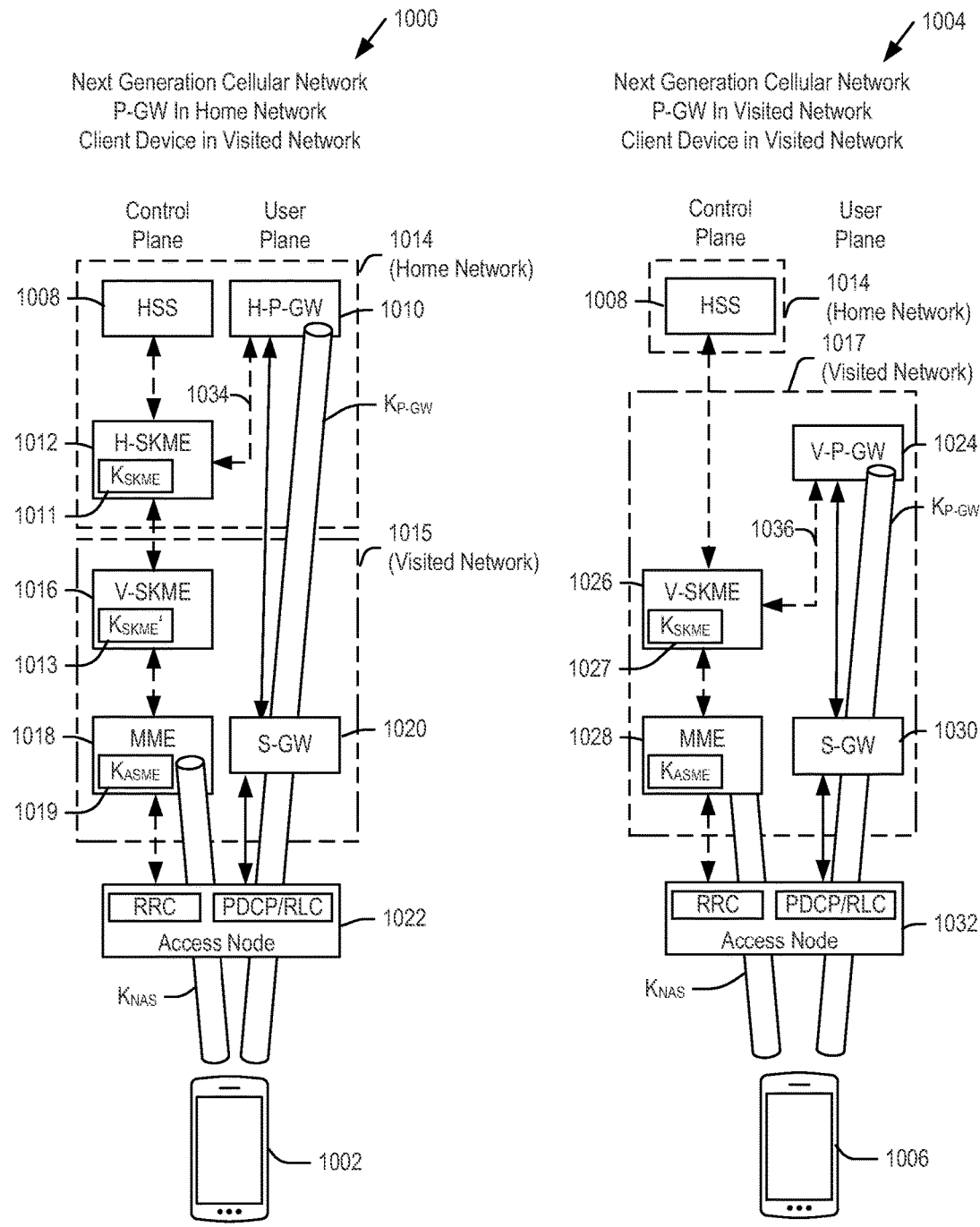
FIG. 10A illustrates elements of an exemplary next generation cellular network, grouping the elements according to the control-plane and user-plane, where the P-GW is in a home network and is identified as H-P-GW.
FIG. 10B illustrates elements of an exemplary next generation cellular network, grouping the elements according to the control-plane and user-plane, where the P-GW is in a visited network and is identified as V-P-GW.

FIG. 10A illustrates elements of an exemplary next generation cellular network 1000, grouping the elements according to the control-plane and user-plane, where the P-GW is in a home network and is identified as H-P-GW 1010. In FIG. 10A, the client device 1002 is attached to an MME 1018 in a visited network 1015, but the data connection in the user-plane is made between the client device 1002 and the H-P-GW 1010 of the home network. A broken line between the H-SKME 1012 and the H-P-GW 1010 in the home network represents a control-plane interface 1034. The control-plane interface 1034 may be used to transport a user-plane (UP) Key Request (e.g., 918, FIG. 9) and a UP Key Response (including a $K_{P\text{-}GW}$) (e.g., 920, FIG. 9) between the H-P-GW 1010 and an H-SKME 1012 or between a V-P-GW and a V-SKME).

FIG. 10A illustrates an HSS 1008, the H-P-GW 1010, and a Home SKME (H-SKME) 1012 in a home network 1014. FIG. 10A also illustrates a Visited SKME (V-SKME) 1016, an MME 1018, and an S-GW 1020 all in the visited network 1015. The client device 1002 may have wireless communications to the visited network 1015 through an access node 1022.

In FIG. 10A, the client device 1002 may be attached to an MME 1018 of a visited network 1015 and to an access node 1022 associated with the visited network 1015. However, the client device 1002 may have had its IP address assigned from the H-P-GW 1010. Therefore, a data connection may be made between the client device 1002 in the visited network 1015 and the H-P-GW 1010 in its home network 1014. When the H-P-GW 1010 has messages to send to the client device 1002, the H-P-GW 1010 may send the messages to the S-GW 1020 in the visited network 1015, and the S-GW 1020 in the visited network 1015 may send the messages to the client device 1002.

According to one aspect, when the P-GW (H-P-GW 1010) is in the home network 1014, while the client device 1002 is in the visited network 1015, the $K_{P\text{-}GW}$ key may be derived based on a $K_{SKME}$ key 1011 obtained from the home network 1014. In other words, the HSS 1008 of the home network 1014 would derive the $K_{SKME}$ key 1011 and provision the $K_{SKME}$ key 1011 to the H-SKME 1012 of the home network 1014. The H-SKME 1012 would then derive the $K_{P\text{-}GW}$ key based on the $K_{SKME}$ key 1011. The H-SKME 1012 may then provision the H-P-GW 1010 with the $K_{P\text{-}GW}$ key using the control-plane interface 1034. In this way, user-plane messages could be encrypted and/or authenticated for exchange between the client device 1002 in the visited network 1015 and the H-P-GW 1010 in the home network 1014. In the meantime, the HSS 1008 of the home network 1014 would derive the $K_{SKME}'$ key 1013 and provision the $K_{SKME}'$ key 1013 to the V-SKME 1016 of the visited network 1015. The $K_{SKME}'$ key 1013 can be provisioned to the V-SKME 1016 from the HSS 1008 either via the H-SKME 1012, as shown in FIG. 10A, or directly to the V-SKME 1016 (via a direct communication between the HSS 1008 and V-SKME 1016 not shown in FIG. 10B). The $K_{SKME}'$ key 1013 is different from (e.g., uncorrelated, not correlated with) the $K_{SKME}$ key 1011. In this way, each Session Key Management Entity key (e.g., $K_{SKME}$ key 1011 and $K_{SKME}'$ key 1013) is bound to its own network, or in other words bound to its own domain. The $K_{SKME}$ key 1011 is bound to the home network 1014 and $K_{SKME}'$ key 1013 is bound to the visited network 1015. Although bound to different networks, they are both used in connection with the client device 1002. For example, in the scenario of FIG. 10A, the V-SKME 1016 derives a $K_{SKME}$ key 1019 based on the $K_{SKME}'$ key 1013 and provisions the $K_{SKME}$ key 1019 to the MME 1018 in the visited network 1015. The use of uncorrelated Session Key Management Entity keys (e.g., $K_{SKME}$ key 1011 and $K_{SKME}'$ key 1013) between the home network 1014 and the visited network 1015 ensures that the visited network 1015 will not be able to derive the $K_{P\text{-}GW}$ used by the home network 1014 (i.e., not able to derive the $K_{P\text{-}GW}$ key derived by the H-SKME 1012 and provisioned to the H-P-GW 1010 via the control-plane interface 1034).

FIG. 10B illustrates elements of an exemplary next generation cellular network 1004, grouping the elements according to the control-plane and user-plane, where the P-GW is in a visited network 1017 and is identified as V-P-GW 1024. In FIG. 10B, the client device 1006 is attached to an MME 1028 in the visited network 1017. The data connection in the user-plane is made between the client device 1006 and the V-P-GW 1024 of the visited network 1017. A broken line between the V-SKME 1026 and the V-P-GW 1024 in the visited network 1017 represents a control-plane interface 1036. The control-plane interface 1036 may be used to transport a user-plane (UP) Key Request (e.g., 918, FIG. 9) and a UP Key Response (including a $K_{P\text{-}GW}$) (e.g., 920, FIG. 9) between the V-P-GW 1024 and an V-SKME 1026.

FIG. 10B illustrates the same HSS 1008 of the home network 1014 of FIG. 10A. FIG. 10B also illustrates the visited P-GW (V-P-GW 1024), a visited SKME (V-SKME 1026), an MME 1028, and an S-GW 1030 all in the visited network 1017. The client device 1006 may have wireless communications to the visited network 1017 through an access node 1032.

As shown in FIG. 10B, when a client device 1006 is in a visited network 1017, a local SKME (e.g., V-SKME 1026) may be required to enable a direct security relationship between the client device 1006 and local P-GW (e.g., a V-P-GW 1024). The V-SKME 1026 may derive a $K_{P\text{-}GW}$ and provision the $K_{P\text{-}GW}$ to the V-P-GW 1024. Provisioning may be via the control-plane interface 1036. By following this procedure, the V-SKME 1026 in the visited network 1017 need not configure the H-P-GW 1010 in the home network 1014. This may be beneficial because the V-SKME 1026 of the visited network 1017 is in a different domain (the domain of the visited network 1017) from that of the H-P-GW 1010. An SKME from a visited domain (V-SKME 1026), more probably than not, will have no privilege to configure a P-GW of another domain (H-P-GW 1010). This may be another beneficial reason for creation of the home SKME (H-SKME 1012) and a visited SKME (V-SKME 1016, 1026); each is in a domain with a corresponding P-GW and can provision the corresponding P-GW within the same domain.

According to one aspect, when the V-P-GW 1024 is in the visited network 1017, while the client device 1006 is also in the visited network 1017, the $K_{P\text{-}GW}$ key may be derived based on a $K_{SKME}$ key 1027 obtained from the visited network 1017. In other words, the HSS 1008 of the home network 1014 would derive the $K_{SKME}$ key 1027 and provision it to the V-SKME 1026 of the visited network 1017 (e.g., in the scenario of FIG. 10B, the HSS 1008 may directly communicate with the V-SKME 1026). The V-SKME 1026 would then derive the $K_{P\text{-}GW}$ key based on the $K_{SKME}$ key 1027. The V-SKME 1026 would then provision the V-P-GW 1024 with the $K_{P\text{-}GW}$ via the control-plane interface 1036. In this way, user-plane messages could be encrypted and/or authenticated for exchange between the client device 1006 in the visited network 1017 and the V-P-GW 1024 in the visited network 1017.

In summary, when an H-P-GW 1010 is used to anchor the user-plane traffic of a client device 1002, the H-SKME 1012 is used to provision a $K_{P\text{-}GW}$ key to the H-P-GW 1010 (via the control-plane interface 1034). When a V-P-GW 1024 is used to anchor the user-plane traffic of a client device 1006, the V-SKME 1026 is used to provision a $K_{P\text{-}GW}$ key to the V-P-GW 1024 (via the control-plane interface 1036). The $K_{P\text{-}GW}$ keys of the home domain and the visited domain are different keys, which are uncorrelated.

Key transfer, for example transfer of the $K_{P\text{-}GW}$, may occur during a Create Session Request. For example, in FIG. 10B, the MME 1028 may send a Create Session Request to set up a bearer during attachment of the client device 1006 to the visited network 1017. The Create Session Request may go to the V-P-GW 1024 (e.g., the P-GW of the visited network 1017). If the V-P-GW 1024 does not have a $K_{P\text{-}GW}$ key for the client device 1006, it may send a request to obtain the $K_{P\text{-}GW}$ from a local SKME (e.g., an SKME in the visited network 1017, the V-SKME 1026). In this sense, there is consistency between whether the client device 1006 is using the home network for a data connection (where an H-P-GW 1010 obtains the $K_{P\text{-}GW}$ key from an H-SKME 1012) or a visited network 1017 for a data connection (where a V-P-GW 1024 obtains the $K_{P\text{-}GW}$ key from a V-SKME 1026).

For example, in FIG. 10B, the client device 1006 in a visited network 1017 may be allowed to make a data connection through the V-P-GW 1024 of the visited network 1017. The V-P-GW 1024 of the visited network 1017 may obtain the $K_{P\text{-}GW}$ key from a V-SKME 1026 of the visited network 1017. By way of further example, if a user, having Corporation Y as its provider, is traveling to Europe, the user may be connected to Corporation X's network (in Europe). The user may have an option to send a message through Corporation X's P-GW (e.g., V-P-GW 1024). This may be possible when the client device 1006, if roaming in a roaming partner's network (i.e., a visited network 1017), can use the V-P-GW 1024 of the visited network 1017. If the client device 1006 is configured to use the V-P-GW 1024 of the visited network 1017 when traveling, then the local SKME (e.g., V-SKME 1026) may configure the V-P-GW 1024 of its network and thereby enable the exchange of messages, with security based on the $K_{P\text{-}GW}$ key, between the client device 1006 and the V-P-GW 1024. It is noted that in the illustration of FIG. 10B, the H-SKME 1012 is not included because it is not available to the user (e.g., because the user is traveling in a foreign country).

Therefore, in FIG. 10B, if the client device 1006 is being handed off from one access node 1032 to another (not shown), the MME 1028 in the visited network 1017 may set up bearers during each transfer (and during client device 1006 attachment), then messages may go from the client device 1006 to the V-P-GW 1024. However, if the V-P-GW 1024 does not have a $K_{P\text{-}GW}$ associated with the client device 1006, it may request the $K_{P\text{-}GW}$ through the local SKME, that is, the V-SKME 1026.

By implementing the aspects described herein, user-plane security may not be dependent on extra security mechanisms (e.g., over-the-air interface security (e.g., $K_{UPenc}$) and secure tunnel between the client device and the P-GW (e.g., IPSEC)). A compromised access node will not break user-plane security. The access node maintains confidentiality and integrity protection of the over-the-air user-plane traffic. The introduction of an SKME between the HSS and MME, as a local trust anchor or local key anchor enables flexible further key derivation for new network functions in the future. According to some aspects, the SKME may only be responsible for key derivation, maintenance, and provisioning of keys to network elements (e.g., MME, access node, P-GW).

Additional Aspects

Figure 11:
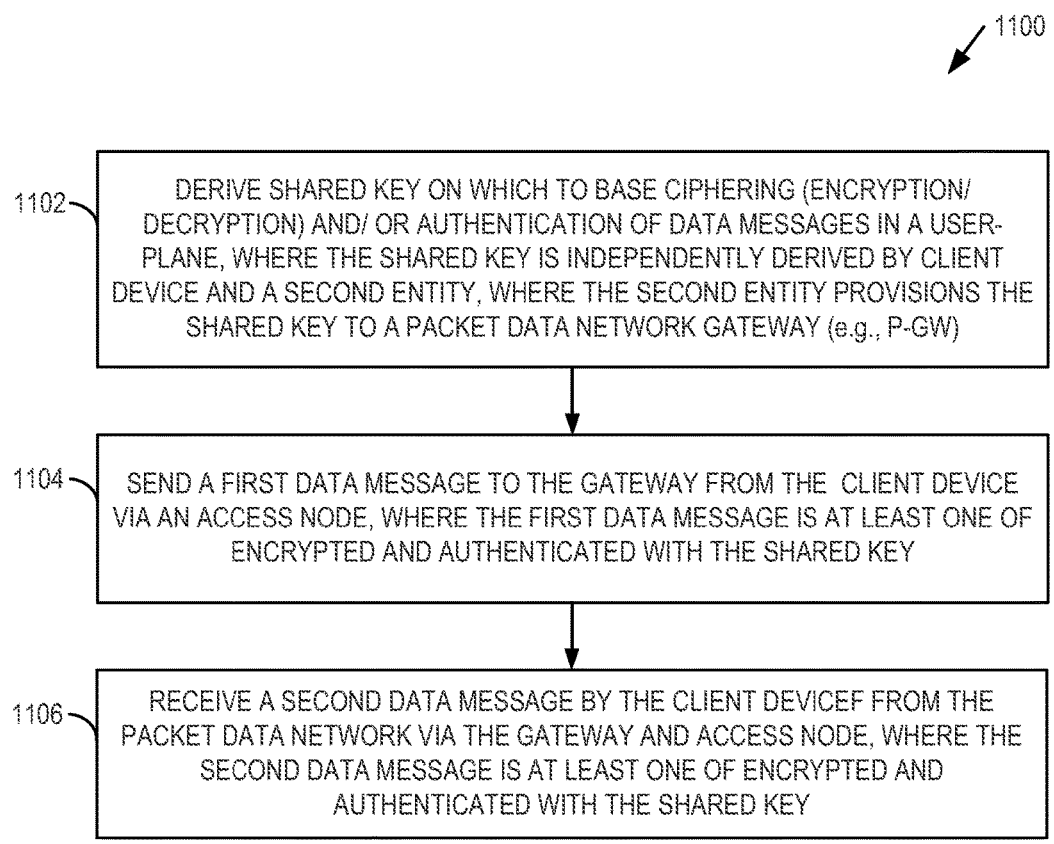
FIG. 11 illustrates an exemplary method, operational at a client device, to protect the security and/or integrity of a user-plane message (e.g., user-plane data traffic) in a next generation cellular network in accordance with aspects described herein.

FIG. 11 illustrates an exemplary method 1100, operational at a client device, to protect the security and/or integrity of a user-plane message (e.g., user-plane data traffic) in a next generation cellular network in accordance with aspects described herein.

A shared key (e.g., $K_{P\text{-}GW}$) on which to base ciphering (encryption/decryption) and/or authentication of messages in the user-plane may be independently derived by the client device and a second entity, where the second entity provisions the shared key to a gateway between a cellular network and a packet data network (e.g., P-GW), 1102.

A message may be sent to the gateway from the client device via an access node associated with the cellular network, where the message is at least one of encrypted and authenticated based on the shared key (e.g., $K_{P\text{-}GW}$), and the shared key is shared by the client device and the gateway, 1104.

The client device may receive a message from the packet data network via the gateway and the access node, where the message is at least one of encrypted and authenticated by the gateway with the shared key, 1106.

Figure 12:
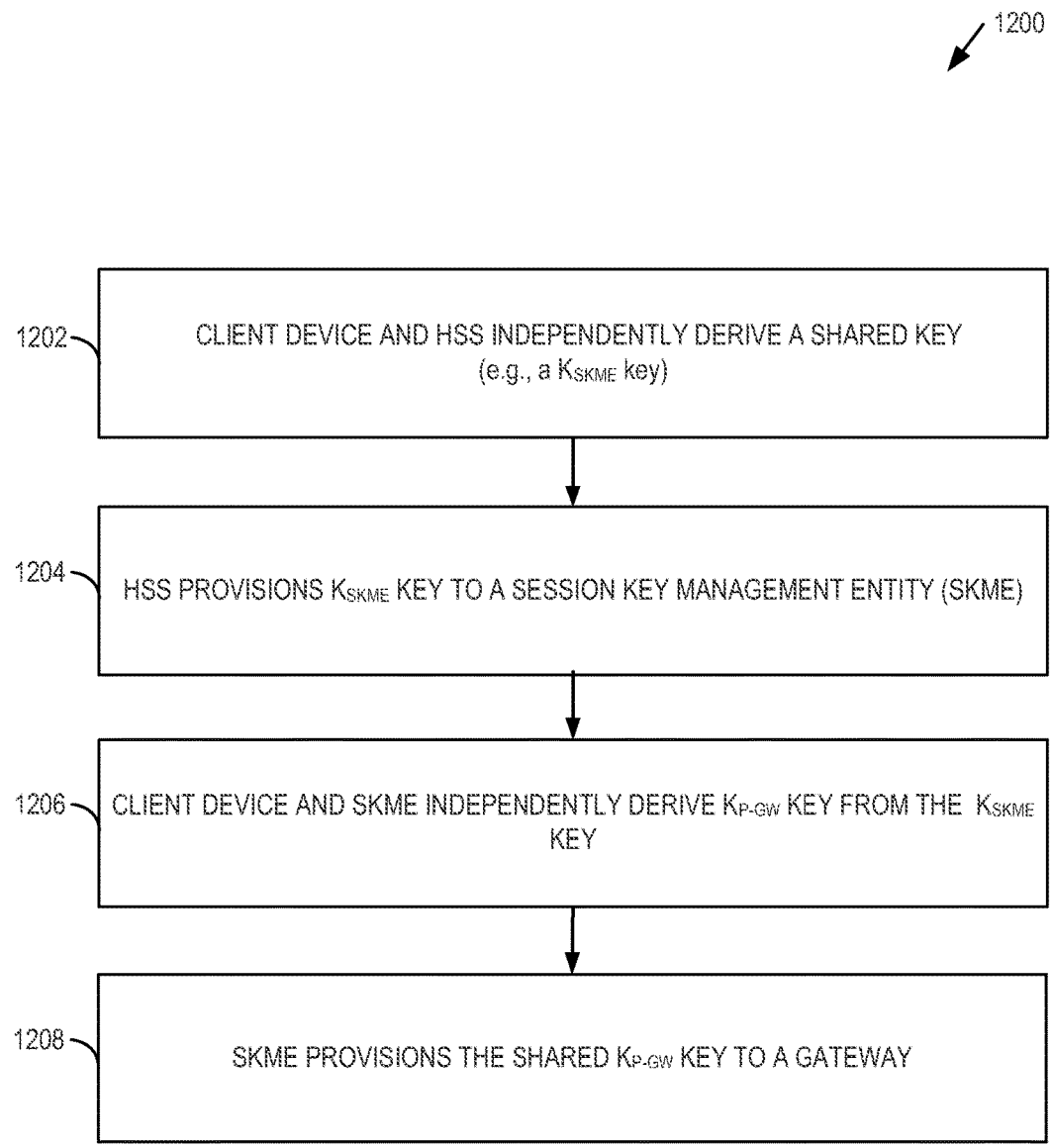
FIG. 12 illustrates an exemplary method, operational at a client device, to protect the security and/or integrity of a user-plane message (e.g., user-plane data traffic) in a next generation cellular network in accordance with aspects described herein.

FIG. 12 illustrates an exemplary method 1200, operational at a client device, to protect the security and/or integrity of a user-plane message (e.g., user-plane data traffic) in a next generation cellular network in accordance with aspects described herein.

A client device and an HSS may independently derive a $K_{SKME}$ key, 1202.

The HSS may provision the $K_{SKME}$ key to an SKME, 1204.

The client device and the SKME may independently derive a $K_{P\text{-}GW}$ key based on the $K_{SKME}$ key, 1206. The derivation of the shared $K_{P\text{-}GW}$ key may be a function of the $K_{SKME}$ and an identifier of the gateway (GW ID). For example, $K_{P\text{-}GW}=F(K_{SKME}, GW\ ID)$.

The shared key, $K_{P\text{-}GW}$, may be provisioned by the SKME to a gateway (e.g., the gateway identified by the GW ID) between the cellular network and the packet data network, 1208.

Figure 13:
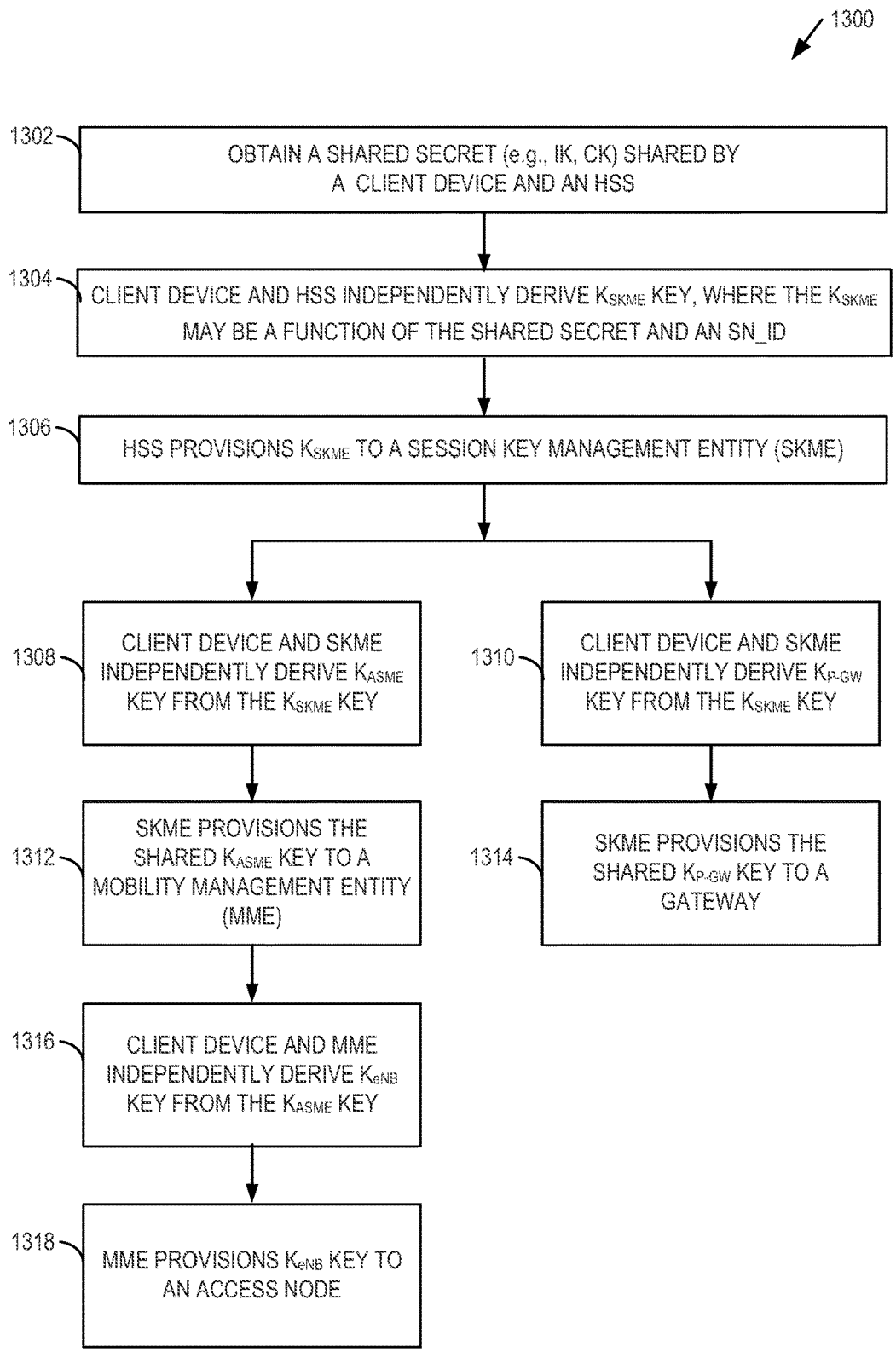
FIG. 13 illustrates an exemplary method, operational at a client device, to protect the security and/or integrity of a user-plane message (e.g., user-plane data traffic) in a next generation cellular network in accordance with aspects described herein.

FIG. 13 illustrates an exemplary method 1300, operational at a client device, to protect the security and/or integrity of a user-plane message (e.g., user-plane data traffic) in a next generation cellular network in accordance with aspects described herein.

A USIM of a client device (or a secure process within the client device) derives an integrity key (IK) and a ciphering key (CK) based on an authentication session key, K in its possession. An authentication center (AuC) has an identical instance of the authentication session key, K, in its possession. The AuC independently derives the integrity key (IK) and the ciphering key (CK) based on the identical authentication session key, K in its possession. Both authentication keys, K, are identical, therefore the IK, CK keys are identical. The AuC provisions the IK, CK keys to an HSS. The client device and HSS now possess a shared secret (e.g., IK, CK), 1302.

The client device and the HSS independently derive a $K_{SKME}$ key based on the shared secret (e.g., IK, CK), 1304. The $K_{SKME}$ may be a function, F, of the shared secret (SS) between the client device and the HSS and of a serving network identifier (SN_ID). For example, $K_{SKME}=F(SS, SN\_ID)$. The function, F, may be a key derivation function, such as HMAC-x, where x may be the key length, e.g., HMAC-256, HMAC-384.

The HSS may provision the $K_{SKME}$ key to a Session Key Management Entity (SKME), 1306.

The client device and the SKME may independently derive a $K_{ASME}$ key based on the $K_{SKME}$ key, 1308. In parallel, the client device and the SKME may independently derive a $K_{P\text{-}GW}$ key based on the $K_{SKME}$ key, 1310.

The SKME may provision the $K_{ASME}$ key to a mobility management entity (MME), 1312. In parallel, the SKME may provision the $K_{P\text{-}GW}$ key to a gateway (e.g., P-GW), 1314. Accordingly, the client device and the gateway (e.g., P-GW) share a $K_{P\text{-}GW}$ key.

The client device and the MME may independently derive a $K_{eNB}$ key based on the $K_{SKME}$ key, 1316. The MME may provision the $K_{eNB}$ key to an access node, 1318. Accordingly, the client device and the access node share a $K_{eNB}$ key.

Figure 14:
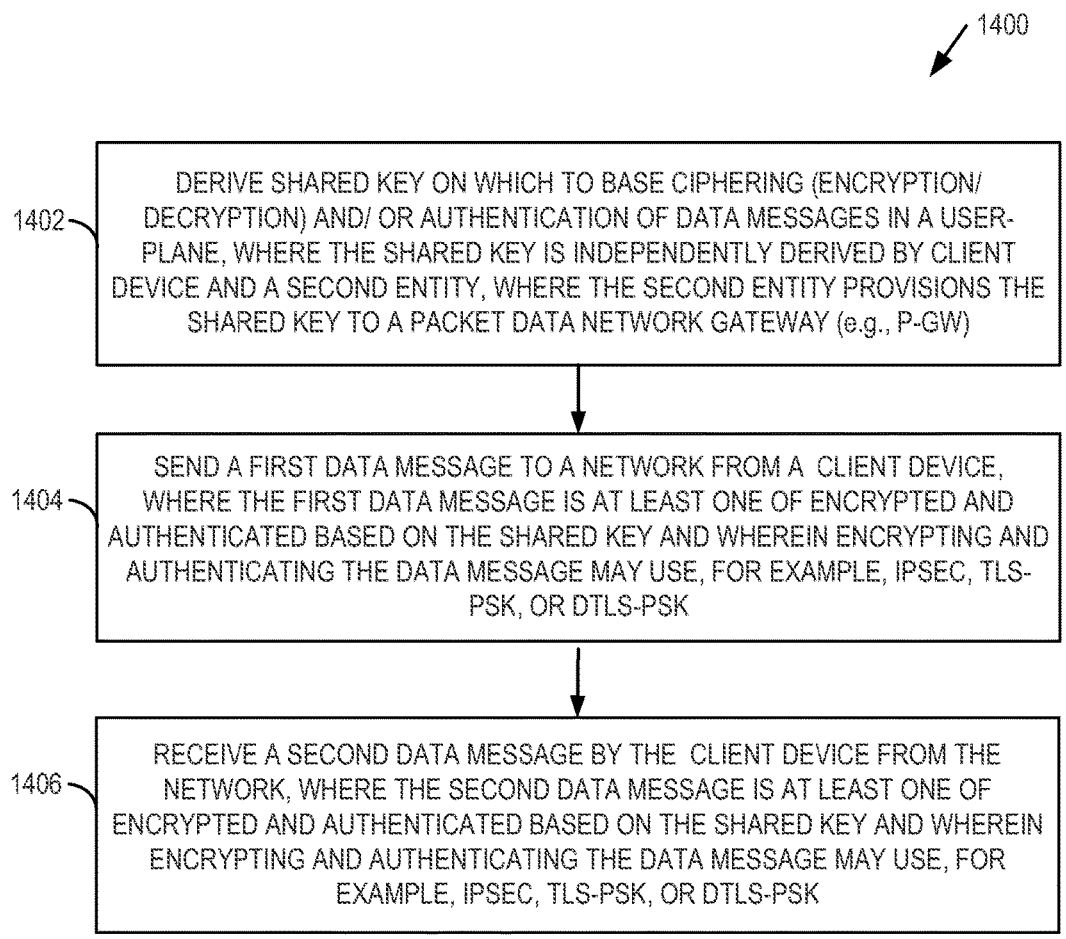
FIG. 14 illustrates an exemplary method, operational at a client device, to protect the security and/or integrity of a user-plane message (e.g., user-plane data traffic) in a next generation cellular network in accordance with aspects described herein.

FIG. 14 illustrates an exemplary method 1400, operational at a client device, to protect the security and/or integrity of a user-plane message (e.g., user-plane data traffic) in a next generation cellular network in accordance with aspects described herein.

A shared key (e.g., $K_{P-GW}$) on which to base ciphering (encryption/decryption) and/or authentication of messages in the user-plane may be independently derived by the client device and a second entity, where the second entity provisions the shared key to a gateway between a cellular network and a packet data network (e.g., P-GW), 1402.

A message may be sent to a network from the client device, where the message is at least one of encrypted and authenticated based on the shared key (e.g., $K_{P-GW}$), and wherein the encrypting and authenticating of the message may use, for example, IPSEC, transport layer security pre-shared key (TLS-PSK), or datagram TLS-PSK (DTLS-PSK), and the shared key is shared by the client device and the gateway (P-GW), 1404.

The client device may receive a message from the network, where the message is at least one of encrypted and authenticated based on the shared key and the encryption or authentication of the message used IPSEC, DTLS-PSK, or TLS-PSK, 1406. In addition, when encryption and authentication are enabled, encryption and authentication may be performed using the shared key (e.g., $K_{P-GW}$) shared with P-GW. Furthermore, if both encryption and authentication are enabled, an Authenticated Encryption with Additional Data (AEAD) cipher may be used with the shared key with the gateway (e.g., $K_{P-GW}$). Exemplary AEAD ciphers include Advanced Encryption Standard (AES) in Galois/Counter Mode (GCM) (i.e., AES-GCM) and Advanced Encryption Standard (AES) in the Counter with Cipher Block Chaining (CBC)—Message Authentication Code (CBC-MAC) Mode (CCM) (i.e., AES-CCM). It will be understood that the recitation of the AEAD cipher and examples thereof are exemplary and not limiting; other ciphers may be used. Furthermore, IPSEC is an option for encrypting and authentication of data packets. IPSEC includes a key agreement protocol that establishes a shared key between two communication parties during the key setup phase.

Figure 15:
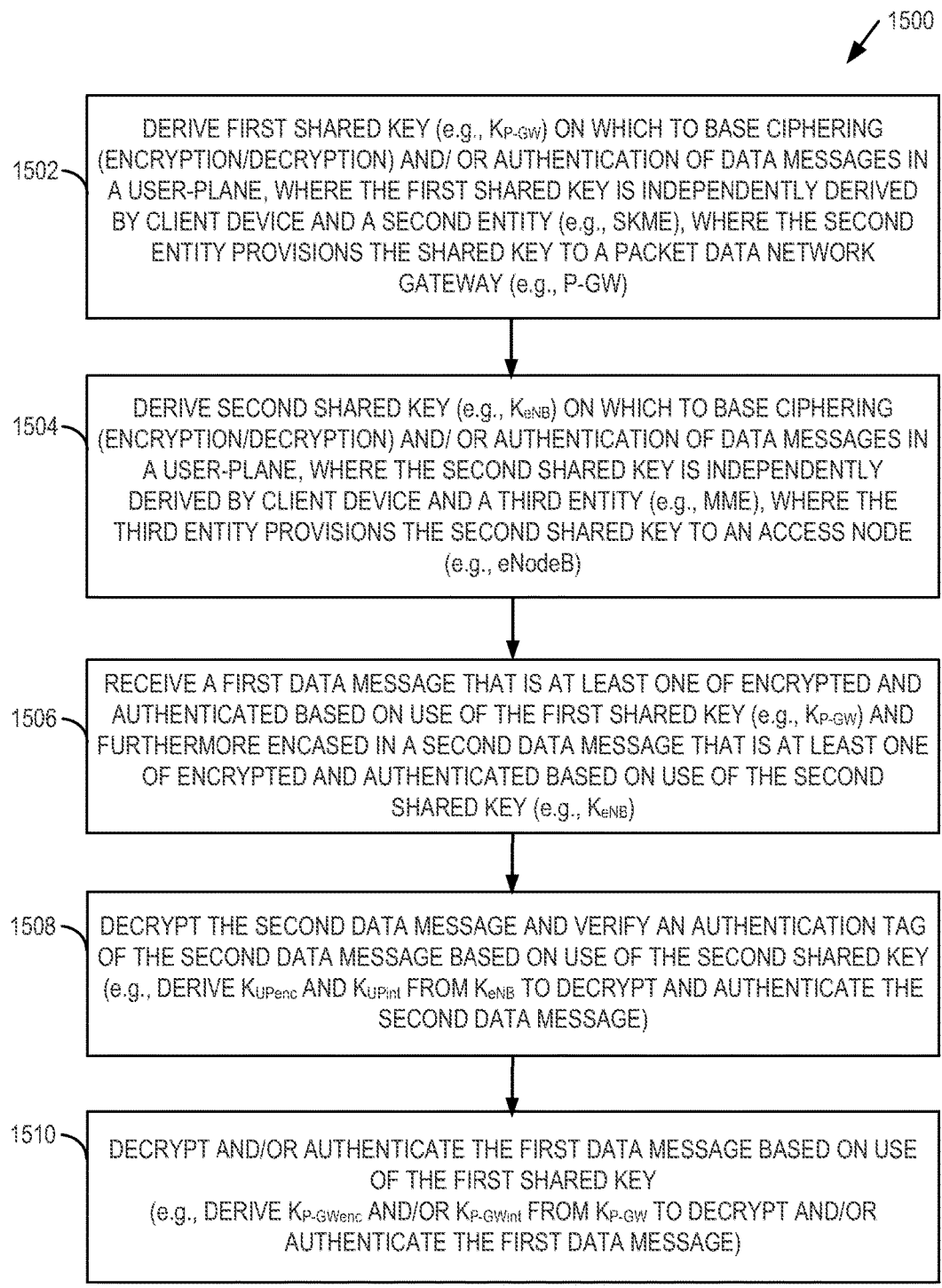
FIG. 15 illustrates an exemplary method, operational at a client device, to protect the security and/or integrity of a user-plane message (e.g., user-plane data traffic) in a next generation cellular network in accordance with aspects described herein.

FIG. 15 illustrates an exemplary method 1500, operational at a client device, to protect the security and/or integrity of a user-plane message (e.g., user-plane data traffic) in a next generation cellular network in accordance with aspects described herein.

A first shared key (e.g., $K_{P-GW}$) on which to base ciphering (encryption/decryption) and/or authentication of messages in the user-plane (e.g., user-plane data traffic) may be independently derived by the client device and a second entity (e.g., SKME), where the second entity provisions the first shared key to a gateway between a cellular network and a packet data network (e.g., a packet data network gateway (P-GW)), 1502.

A second shared key (e.g., $K_{eNB}$) on which to base ciphering (encryption/decryption) and/or authentication of messages in the user-plane (e.g., user-plane data traffic) may be independently derived by the client device and a third entity (e.g., MME), where the third entity provisions the second shared key to a an access node (e.g., eNodeB), 1504.

A first message may be received from the gateway (e.g. P-GW) by the client device via the access node (e.g., eNodeB), where the first message is at least one of encrypted and authenticated based on the first shared key (e.g., $K_{P-GW}$) and the first message is furthermore encapsulated in a second message that is at least one of encrypted and authenticated based on the second shared key (e.g., $K_{eNB}$), 1506.

The second message may be decrypted and an authentication tag of the second message may be verified based on use of the second shared key (e.g., $K_{UPenc}$ and/or $K_{UPint}$ may be derived based on $K_{eNB}$), 1508.

The first message, which is no longer encapsulated within the second message (as the second message was decrypted) may thus be decrypted and/or authenticated based on use of the first shared key (e.g., $K_{P-GWenc}$ and/or $K_{P-GWint}$ may be derived based on $K_{P-GW}$), 1510.

Figure 16:
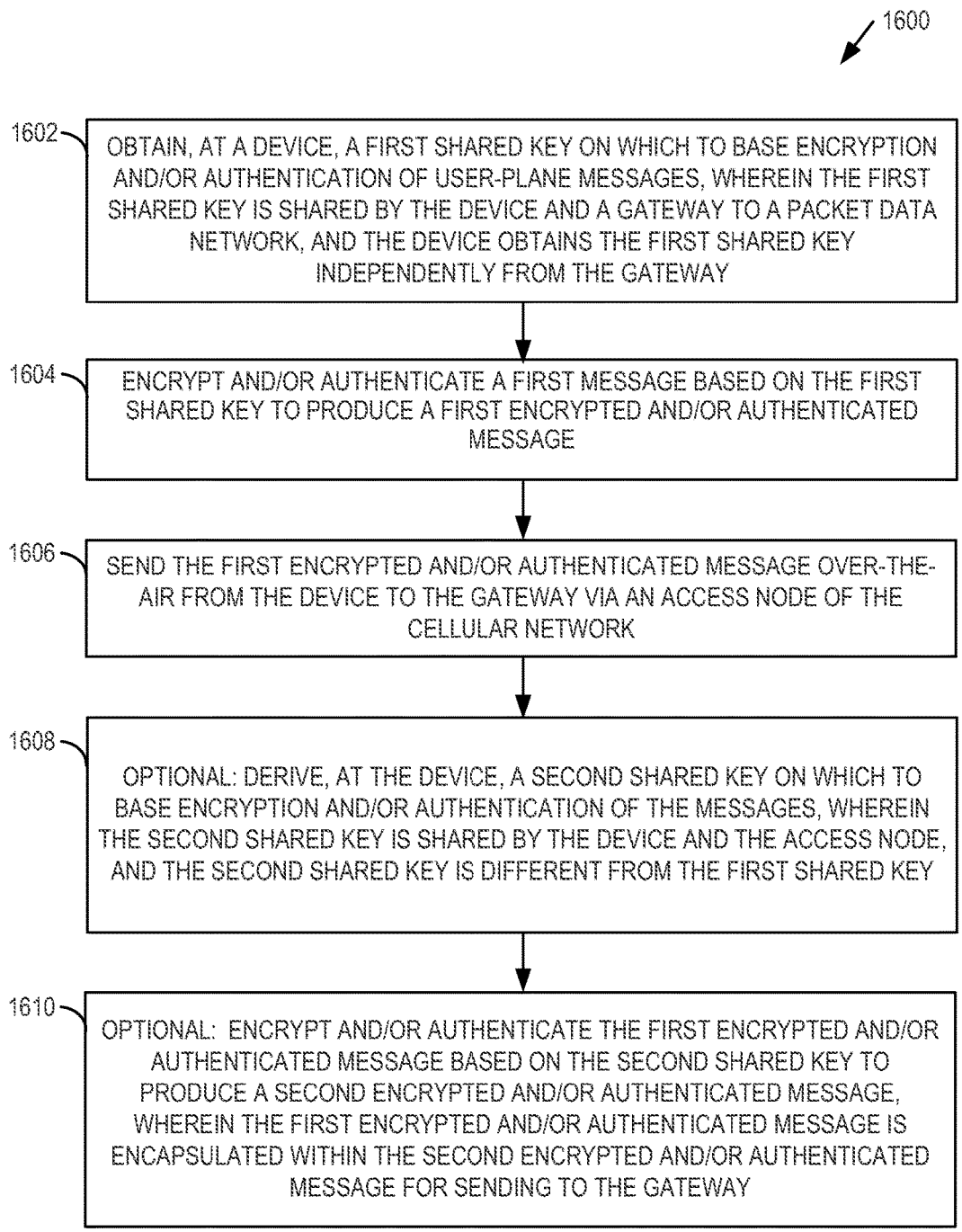
FIG. 16 illustrates an exemplary method, operational at a device (e.g., a chip component, a client device), to protect the security and/or integrity of a user-plane message (e.g., user-plane data traffic) in a next generation cellular network in accordance with aspects described herein.

FIG. 16 illustrates an exemplary method 1600, operational at a device (e.g., a chip component, a client device), to protect a user-plane message (e.g., user-plane data traffic) in a next generation cellular network in accordance with aspects described herein.

The method may include obtaining, at the device, a first shared key on which to base encryption and/or authentication of user-plane messages, wherein the first shared key is shared by the device and a gateway to a packet data network, and the device obtains the first shared key independently from the gateway, 1602.

The method may further include encrypting and/or authenticating a first message based on the first shared key to produce a first encrypted and/or authenticated message, 1604.

The method may still further include sending the first encrypted and/or authenticated message over-the-air from the device to the gateway via an access node of the cellular network, 1606.

Optionally, the method may further include deriving, at the device, a second shared key on which to base encryption and/or authentication of the messages, wherein the second shared key is shared by the device and the access node, and the second shared key is different from the first shared key, 1608. The device may obtain the second shared key independently from the access node. The first shared key (e.g., $K_{P-GW}$) and the second shared key (e.g., $K_{eNB}$) are uncorrelated.

Optionally, the method may still further include encrypting and/or authenticating the first encrypted and/or authenticated message based on the second shared key to produce a second encrypted and/or authenticated message, wherein the first encrypted and/or authenticated message is encapsulated within the second encrypted and/or authenticated message for sending to the gateway, 1610.

Figure 17:
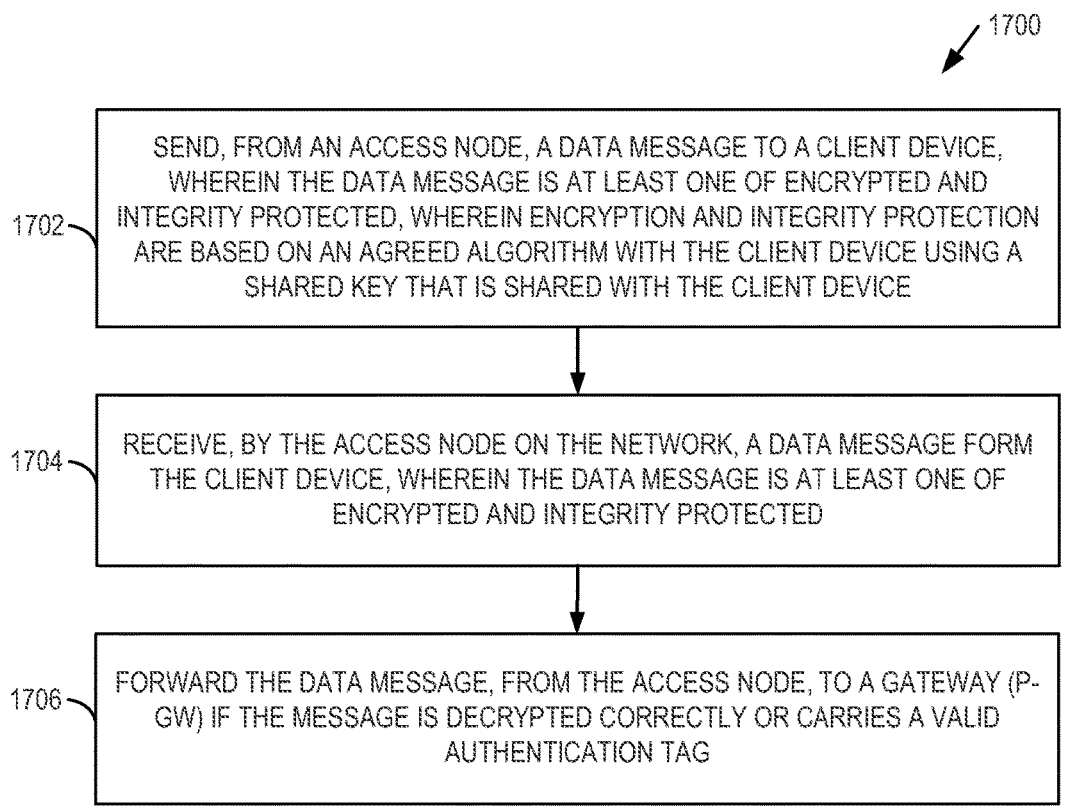
FIG. 17 illustrates an exemplary method, operational, for example, at an access node, to protect the security and/or integrity of a user-plane message (e.g., user-plane data traffic) in a next generation cellular network in accordance with aspects described herein.

FIG. 17 illustrates an exemplary method 1700, operational, for example, at an access node, to protect the security and/or integrity of a user-plane message (e.g., user-plane data traffic) in a next generation cellular network in accordance with aspects described herein.

A message may be sent to a client device from an access node, wherein the message is at least one of encrypted and integrity protected, wherein encryption and authentication are based on an agreed algorithm with the client device using a shared key that is shared with the client device, 1702. Encryption and authentication may additionally or alternatively be based on a configuration per a network, or per a network operator. Encryption and authentication may additionally or alternatively be based on a configuration per bearer per the client device. Encryption and authentication may additionally or alternatively be based on a part of a bearer configuration, for example, per bearer security configuration.

A message may be received at the access node from the client device, wherein the message is at least one of encrypted and integrity protected, 1704.

The message may be forwarded, from the node on the network, to a gateway if the message is decrypted correctly or carries a valid authentication tag, 1706.

Figure 18:
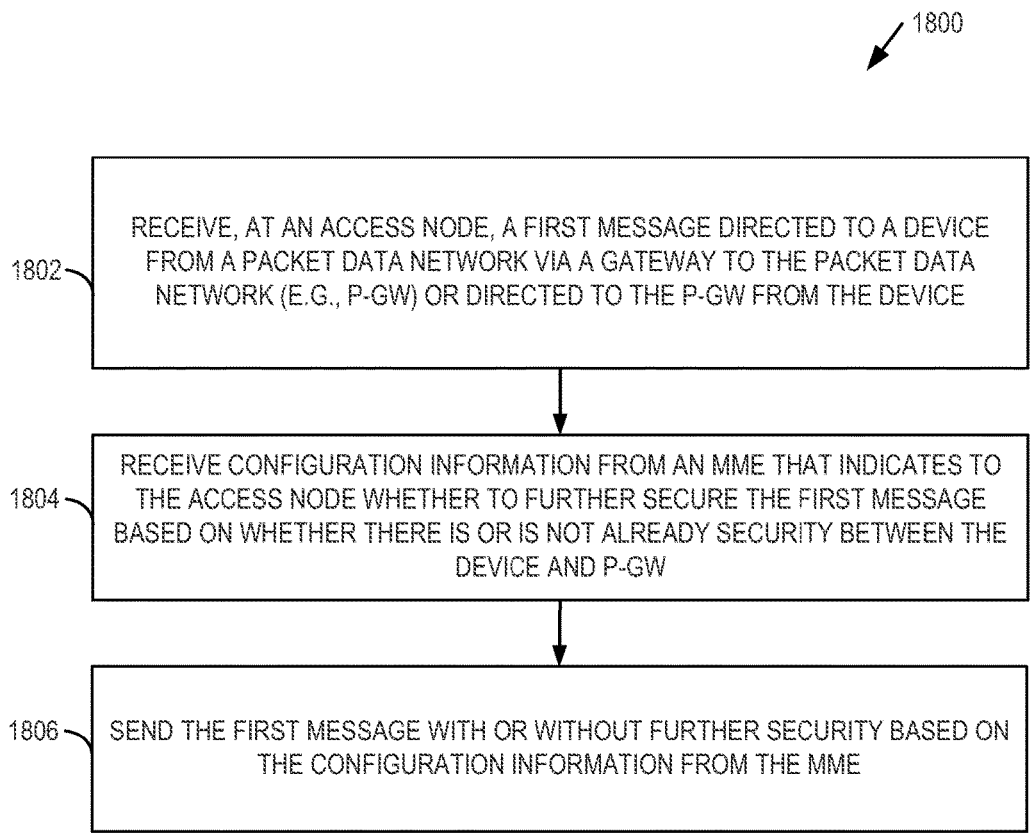
FIG. 18 illustrates an exemplary method, operational at an access node (e.g., an eNodeB), to protect a user-plane message (e.g., user-plane data traffic) in a cellular network in accordance with aspects described herein.

FIG. 18 illustrates an exemplary method 1800, operational at an access node (e.g., an eNodeB), to protect a user-plane message (e.g., user-plane data traffic) in a cellular network in accordance with aspects described herein.

The method may include receiving, at the access node, a first message directed to a device from a packet data network via a gateway to the packet data network (e.g., P-GW), or directed to the P-GW from the device, 1802. The first message may already be secured during transmission between the device and the P-GW with a first shared key shared by the device and the P-GW. The method may further include receiving configuration information from an MME that indicates to the access node whether to further secure the first message based on whether there is or is not already security between the device and P-GW, 1804.

For example, if the first message is not secured with the first shared key shared by the device and the gateway, the MME may indicate, through configuration information, that the first message should be secured with a second shared key shared by the device and the access node to produce a first encrypted message. However, if the first message is already secured with the first shared key shared by the device and the P-GW, the MME may indicate, through configuration information, that the first message may be sent from the access node to the device over-the-air without additional security. Although further security may not be required, it may optionally be implemented. Similarly, in the opposite direction, the MME may indicate to the access node whether to further secure the first message based on whether there is or is not already security between the device and P-GW. The first message may then be sent from the access node with or without the further security based on the configuration information from the MME, 1806.

Figure 19:
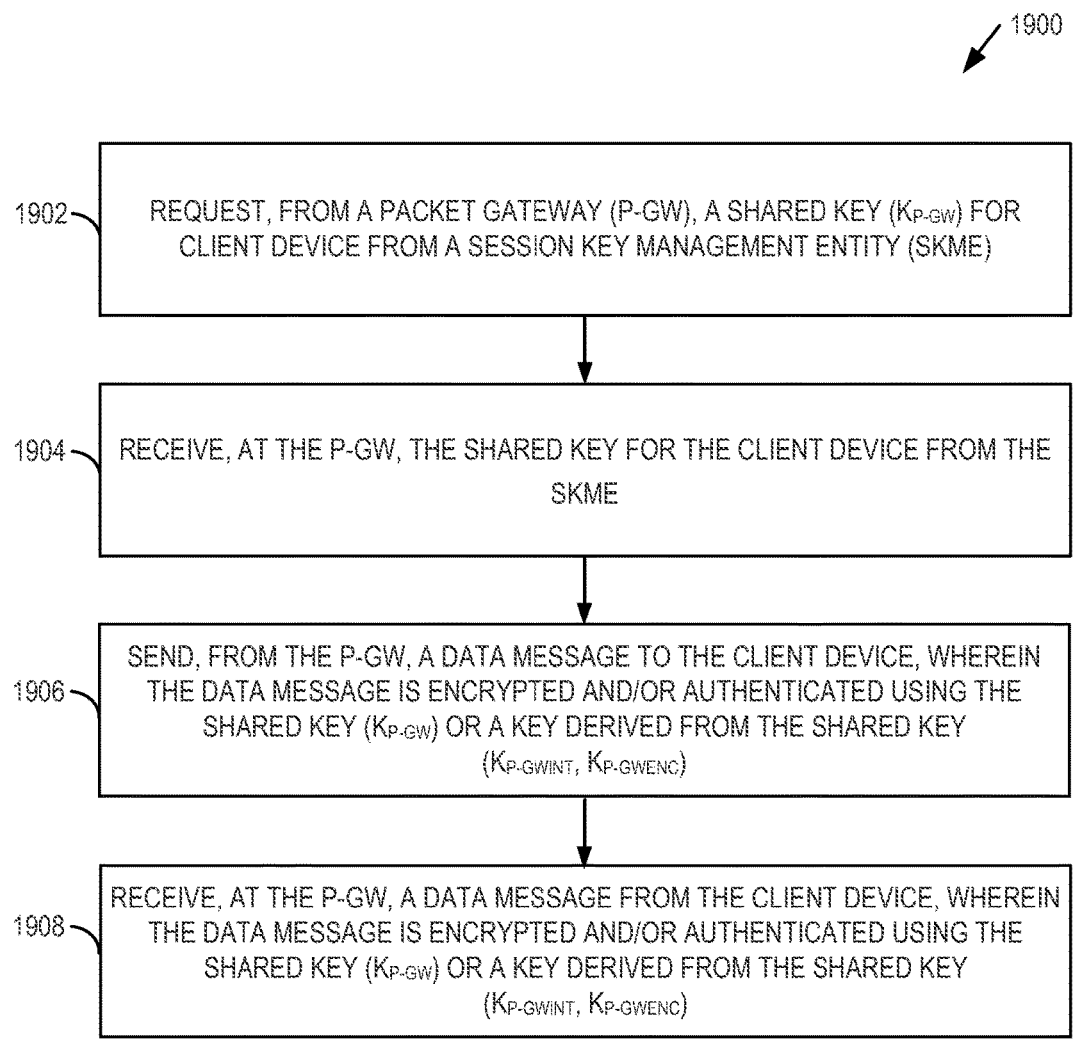
FIG. 19 illustrates an exemplary method, operational at a P-GW, to protect the security and/or integrity of a user-plane message in a next generation cellular network in accordance with aspects described herein.

FIG. 19 illustrates an exemplary method 1900, operational at a P-GW, to protect the security and/or integrity of a user-plane message in a next generation cellular network in accordance with aspects described herein.

A request may be made to a Session Key Management Entity (SKME) from a packet data network gateway (e.g., P-GW) for a shared key (e.g., $K_{P-GW}$), where the key is shared with a client device, 1902.

The shared key (e.g., $K_{P-GW}$) may be received at the P-GW from the SKME, 1904.

The P-GW may send a message to the client device, wherein the message is encrypted and/or authenticated based on the shared key (e.g., $K_{P-GW}$), 1906. In other words, the message may be encrypted and/or authenticated using a key (e.g., $K_{P-GWenc}$, $K_{P-GWint}$) that was derived based on the shared key.

The P-GW may receive a message from the client device, wherein the message is encrypted and/or authenticated based on the shared key (e.g., $K_{P-GW}$), 1908. In other words, the message may be encrypted and/or authenticated using a key (e.g., $K_{P-GWenc}$, $K_{P-GWint}$) that was derived based on the shared key.

Figure 20:
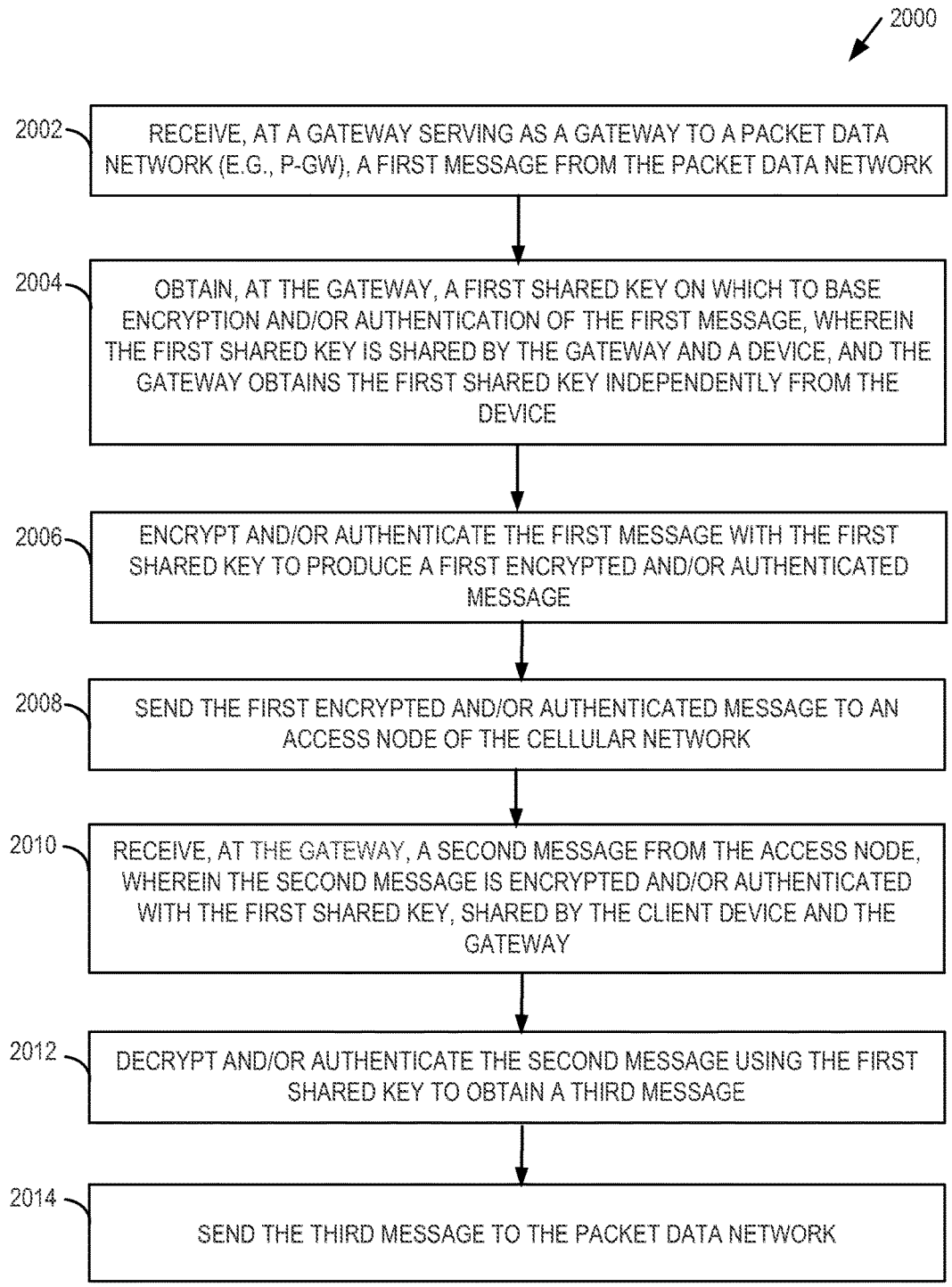
FIG. 20 illustrates an exemplary method, operational at a gateway to a packet data network (e.g., a P-GW), to protect a user-plane message (e.g., user-plane data traffic) in a cellular network in accordance with aspects described herein.

FIG. 20 illustrates an exemplary method 2000, operational at a gateway to a packet data network (e.g., a P-GW), to protect a user-plane message (e.g., user-plane data traffic) in a cellular network in accordance with aspects described herein.

The method may begin by receiving, at the P-GW, a first message from the packet data network, 2002.

The method may include obtaining, at the gateway, a first shared key on which to base encryption and/or authentication of the first message, wherein the first shared key is shared by the gateway and a device and the gateway obtains the first shared key independently from the device, 2004.

The method may further include encrypting and/or authenticating the first message based on the first shared key to produce a first encrypted and/or authenticated message, 2006.

The method may further include sending the first encrypted and/or authenticated message to the device via an access node of the cellular network, 2008.

In the opposite direction (e.g., in an uplink direction), the gateway may receive a second message from the access node, wherein the second message is encrypted and/or authenticated with the first shared key, shared only by the client device and the gateway, 2010.

The second message may be decrypted and/or authenticated using the first shared key to obtain a third message, 2012.

The third message may be transmitted to the packet data network, 2014.

Figure 21:
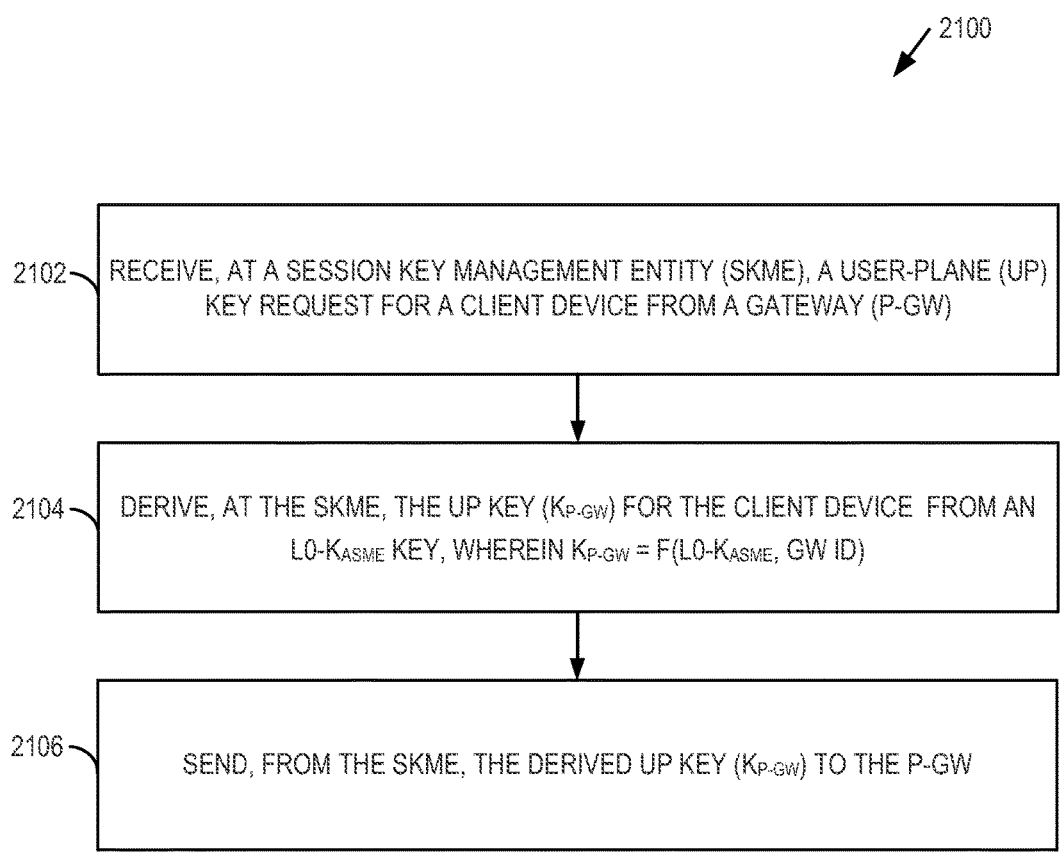
FIG. 21 illustrates an exemplary method, operational at a network entity referred to herein as a Session Key Management Entity (SKME), to protect the security and/or integrity of a user-plane message (e.g., user-plane data traffic) in a next generation cellular network in accordance with aspects described herein.

FIG. 21 illustrates an exemplary method 2100, operational at a network entity referred to herein as a Session Key Management Entity (SKME), to protect the security and/or integrity of a user-plane message (e.g., user-plane data traffic) in a next generation cellular network in accordance with aspects described herein.

A user-plane (UP) key request for a client device from a gateway (P-GW) may be received at a Session Key Management Entity (SKME), 2102. The UP key request may include a client device identifier.

A Temporary Mobile Subscriber Identity (TMSI) may be allocated by the MME and used to identify a client device at the MME 114 for privacy. In addition, TMSI is a part of Globally Unique Temporary client device Identity (GUTI).

For example, from 3GPP TS 23.003: The format and size of the GUTI is:

<GUTI>=<GUMMEI><M-TMSI>, where <GUMMEI>=<MCC><MNC><MME Identifier> and <MME Identifier>=<MME Group ID><MME Code>

MCC and MNC shall have the same field size as in earlier 3GPP systems.

M-TMSI shall be of 32 bits length.

MME Group ID shall be of 16 bits length.

MME Code shall be of 8 bits length.

GUTI is used at the serving network, hence if a P-GW in the serving network is used for a packet data network connection, then the GUTI can be used to identify the client device. Typically, an International Mobile Subscriber Identity (IMSI) and bearer IDs (including Tunnel Endpoint Identifiers (TEIDs)) may be used to identify a client device at a P-GW.

The SKME may derive the UP key (e.g., $K_{P-GW}$) for the client device based on $K_{SKME}$, wherein $K_{P-GW}=F(K_{SKME}, GW\ ID)$, 2104.

The SKME may send the derived UP key (e.g., $K_{P-GW}$) to the P-GW, 2106.

Figure 22:
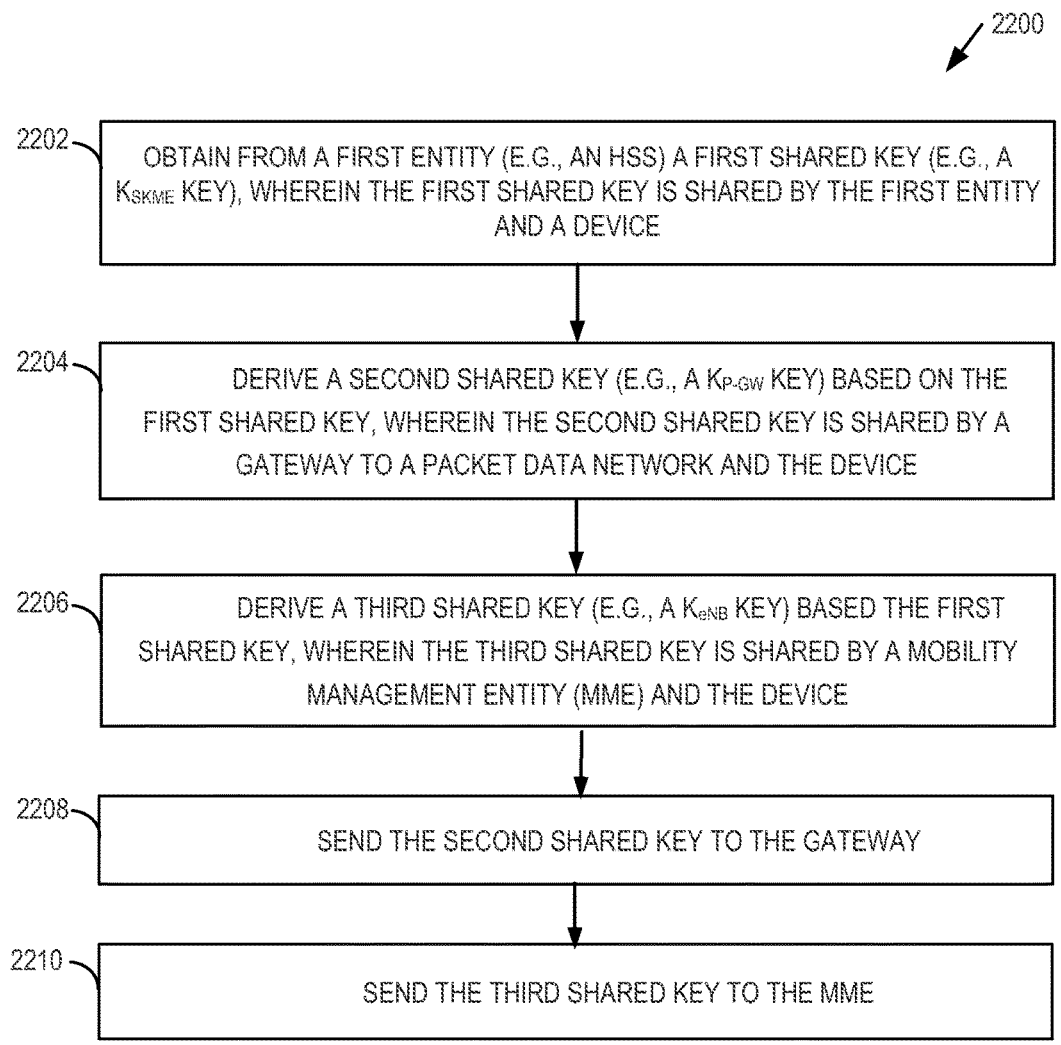
FIG. 22 illustrates an exemplary method, operational at an SKME, to derive keys that protect a user-plane message (e.g., user-plane data traffic) in a cellular network in accordance with aspects described herein.

FIG. 22 illustrates an exemplary method 2200, operational at an SKME, to derive keys that protect a user-plane message (e.g., user-plane data traffic) in a cellular network in accordance with aspects described herein.

The method may begin by obtaining, from a first entity (e.g., an HSS) a first shared key (e.g., a $K_{SKME}$ key); the first shared key may be shared by the first entity and a device, 2202. The SKME may derive a second shared key (e.g., a $K_{P-GW}$ key) based on the first shared key; the second shared key may be shared by a gateway to a packet data network and the device, 2204. The SKME may further derive a third shared key (e.g., a $K_{eNB}$ key) based the first shared key; the third shared key may be shared by a mobility management entity (MME) and the device, 2206. Next, the SKME may send the second shared key to the gateway, 2208. Finally, the SKME may send the third shared key to the MME, 2210.

Exemplary Device and Method Operational Thereon

Figure 23:
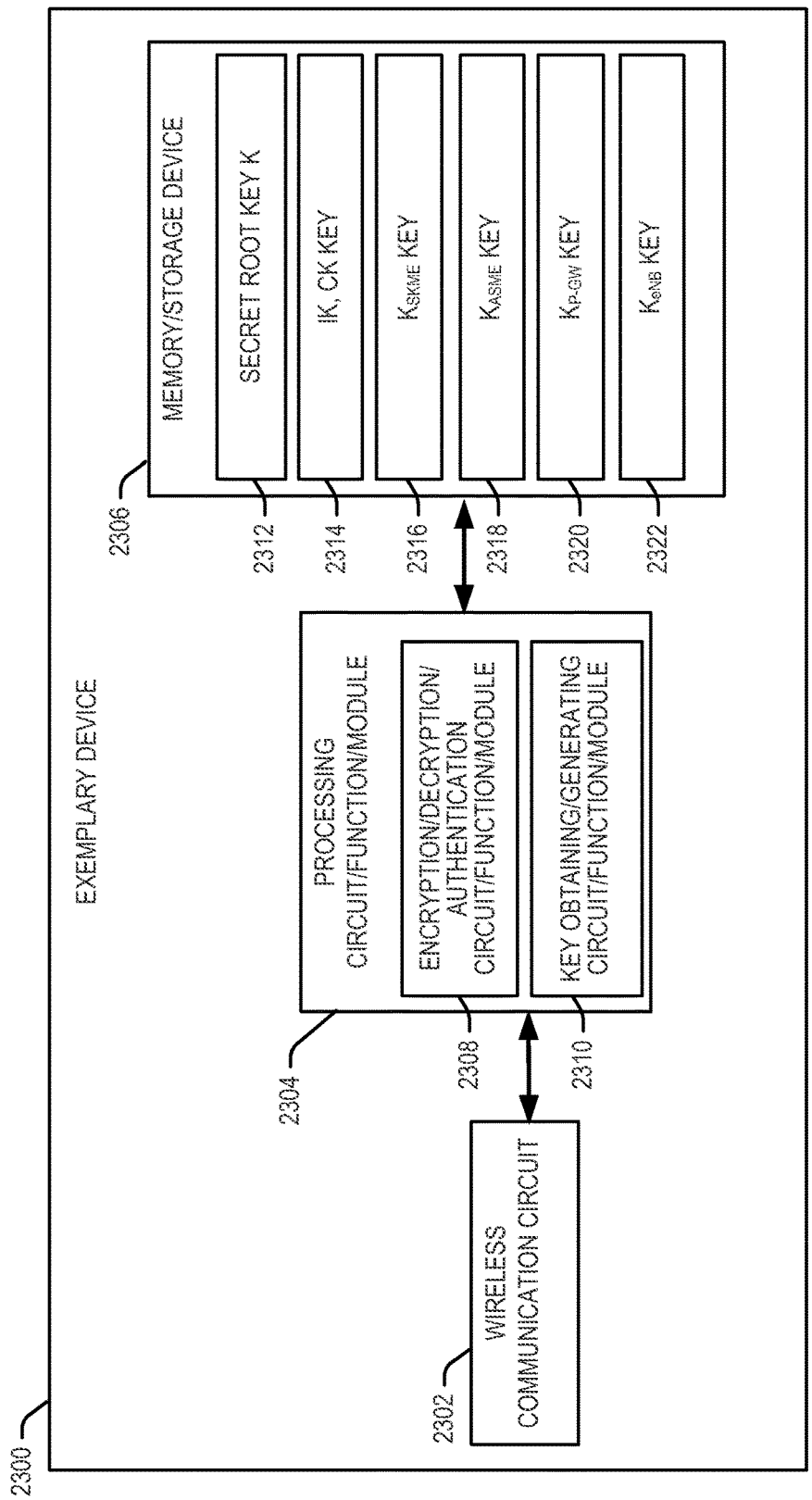
FIG. 23 illustrates a block diagram of an exemplary hardware implementation of a device configured to perform the methods described herein.

FIG. 23 illustrates a block diagram of an exemplary hardware implementation of a device 2300 configured to perform the methods described herein. For example, the device 2300 could embody a chip component, a client device, a user equipment, a terminal, or some other type of device.

The device 2300 may include a processing circuit, function, or module 2304 coupled to a wireless communication circuit 2302, and a memory/storage device 2306. The wireless communication circuit 2302 may serve to wirelessly couple the device 2300 to a serving network. The processing circuit/function/module 2304 may include an encryption/decryption/authentication circuit, function, or module 2308 configured to perform encryption/decryption/authentication of user-plane data traffic using a shared key, which is shared by the device and a P-GW. The processing circuit/function/module 2304 may further include a key obtaining/generating/deriving circuit/function/module 2310 configured to obtain, generate, and/or locally derive certain keys used to protect user-plane data traffic during transit between the device 2300 and a P-GW. To facilitate the protection of user-plane data traffic, the memory/storage device 2306 may store a secret root key, the K key 2312 (or such a key may be stored in a USIM (not shown) of the device 2300), an IK, CK key 2314, a $K_{SKME}$ key 2316, a $K_{ASME}$ key 2318, a $K_{P\text{-}GW}$ key 2320, and a $K_{eNB}$ key 2322, in addition to other keys (not shown) for encryption/decryption and authentication may be locally stored in the memory/storage device 2306 of the device 2300.

In general, a processing circuit/function/module 2304 may be one or more processors (e.g., first processor, etc.) that are adapted to process data for the device 2300. For example, the processing circuit/function/module 2304 may be a specialized processor, such as an application specific integrated circuit (ASIC) that serves as a means for carrying out any one of the processes or methods described herein. The processing circuit/function/module 2304 serves as one example of a means for verifying authentication information, generating authentication information, maintaining an access list, determining that a command is in the access list, establishing a secure channel, allowing execution, identifying a device, or establishing a secure channel. The processing circuit/function/module 2304 may also serve as one example of a means for receiving and/or transmitting.

Examples of processing circuit/function/module 2304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing circuit/function/module 2304 may also responsible for managing one or more communication buses, and executing instruction stored on computer-readable storage medium that may be embodied in the memory/storage device 2306. The instructions (which may be in the form of software), when executed by the processing circuit/function/module 2304, may cause the circuit/function/module 2304 to perform the various functions, steps, and/or methods described herein. The computer readable storage medium that may be embodied in the memory/storage device 2306 may be used for storing data that is manipulated by the processing circuit/function/module 2304 when executing software instructions.

The memory/storage device 2306 may be non-volatile memory, such as but not limited to FLASH memory, magnetic or optical hard disk drives, etc. In some aspects, the memory may be volatile memory, such as DRAM (e.g., DDR SDRAM), SRAM, etc., that may be continuously powered so as to store the information indefinitely. The memory/storage device 2306 serves as one example of a means for storing keys.

Software or instructions shall be construed broadly to mean software, instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium embodied in the memory/storage device 2306. The computer-readable storage medium may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium may reside in the processing circuit/function/module 2304, external thereto, or distributed across multiple entities including the processing circuit/function/module 2304. The computer-readable storage medium may be embodied in a computer program product. In addition, the device 2300 could interface with a computer-readable medium that could include, by way of example, a carrier wave, a transmission line, and any other suitable medium for transmitting software and/or instructions that may be accessed and read by a computer.

Figure 24:
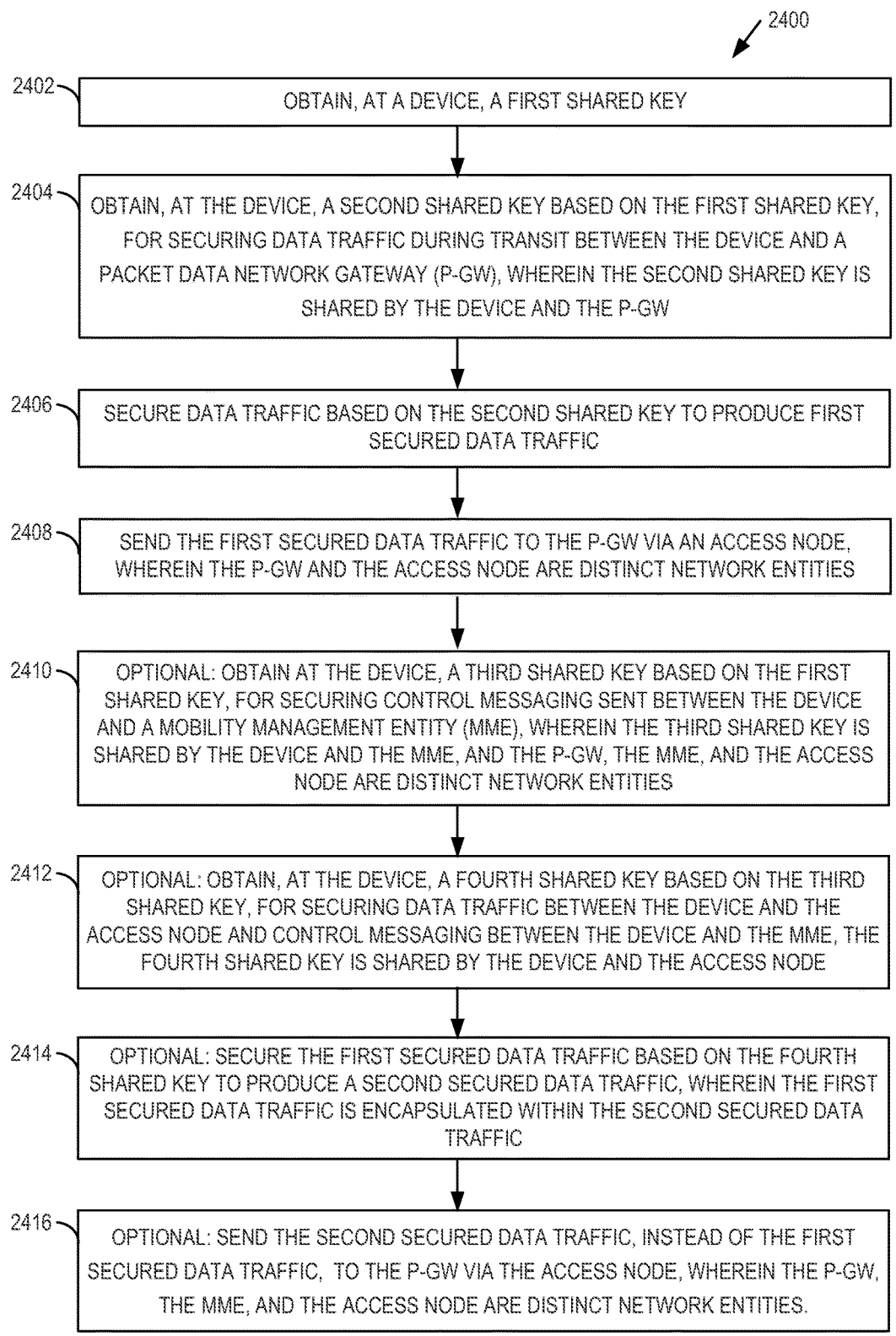
FIG. 24 illustrates an exemplary method, operational at a device (e.g., a chip component, a client device), to protect a user-plane message (e.g., user-plane data traffic) in a cellular network in accordance with aspects described herein.

FIG. 24 illustrates an exemplary method 2400, operational at a device (e.g., a chip component, a client device), to protect a user-plane message (e.g., user-plane data traffic) in a cellular network in accordance with aspects described herein.

The method may include obtaining, at the device, a first shared key, 2402. A second shared key based on the first shared key, may also be obtained at the device, 2404. The second shared key may be for securing data traffic during transit between the device and a packet data network gateway (P-GW). The second shared key may be shared by the device and the P-GW. The method may include securing data traffic based on the second shared key to produce first secured data traffic, 2406. After the data is secured, the method may include sending the first secured data traffic to the P-GW via an access node, 2408. The P-GW and the access node may be distinct network entities.

In aspects described herein, the first shared key may be unknown to the P-GW. The first shared key and the second shared key may be derived locally at the device and are not transmitted to the device. In other words, they are not transmitted over the air to the device. The second shared key may secure at least some layers of user-plane communications while a different key secures control-plane communications.

Optionally, the method may include obtaining, at the device, a third shared key based on the first shared key, for securing control messaging (e.g., control-plane control messaging) sent between the device and a mobility management entity (MME), 2410. The third shared key may be shared by the device and the MME. The P-GW, the MME, and the access node may be distinct network entities.

Optionally, the method may include obtaining, at the device, a fourth shared key based on the third shared key, for securing data traffic between the device and the access node and control messaging between the device and the MME, 2412. The fourth shared key may be shared by the device and the access node. The method may optionally further include securing the first secured data traffic based on the fourth shared key to produce a second secured data traffic, 2414. In some aspects, the first secured data traffic is encapsulated within the second secured data traffic. The method may still further include sending the second secured data traffic, instead of the first secured data traffic, to the P-GW via the access node, 2416. The P-GW, the MME, and the access node may be distinct network entities.

According to additional aspects described herein, the second shared key protects the second secured data traffic in an Internet Protocol (IP) layer of a user-plane while the fourth shared key protects the second secured data traffic in a Packet Data Convergence Protocol (PDCP) layer of a user-plane. In other words, the fourth shared key protects certain transmissions of traffic over certain layers of a user-plane while the second shared key is used to protect other transmissions of traffic over other layers of the user-plane.

According to aspects described herein, the first shared key may be shared between the device and a network entity. The network entity may obtain the first shared key from a home subscription server (HSS). The device may obtain the second shared key independently from the P-GW. Obtaining the second shared key may include deriving the second shared key at the device as a function of the first shared key and a packet data network gateway identifier (GW ID).

According to aspects described herein, data traffic is distinct from control messaging. Data traffic may be transmitted over a user-plane and control messaging may be transmitted over a control plane. The user-plane and the control plane are distinct transmission paths.

According to some aspects described herein, securing the data traffic comprises encrypting the data traffic based on the second shared key. According to other aspects described herein, securing the data traffic may comprise including an authentication signature based on the second shared key.

With respect to receiving data traffic, according to some aspects, the device may receive third secured data traffic from the P-GW via the access node. The third secured data traffic may be secured based on the second shared key. The device may then pursue decrypting and/or authenticating of the third secured data traffic based on the second shared key to produce unsecured data traffic.

Exemplary Packet Data Network Gateway (P-GW) and Method Operational Thereon

Figure 25:
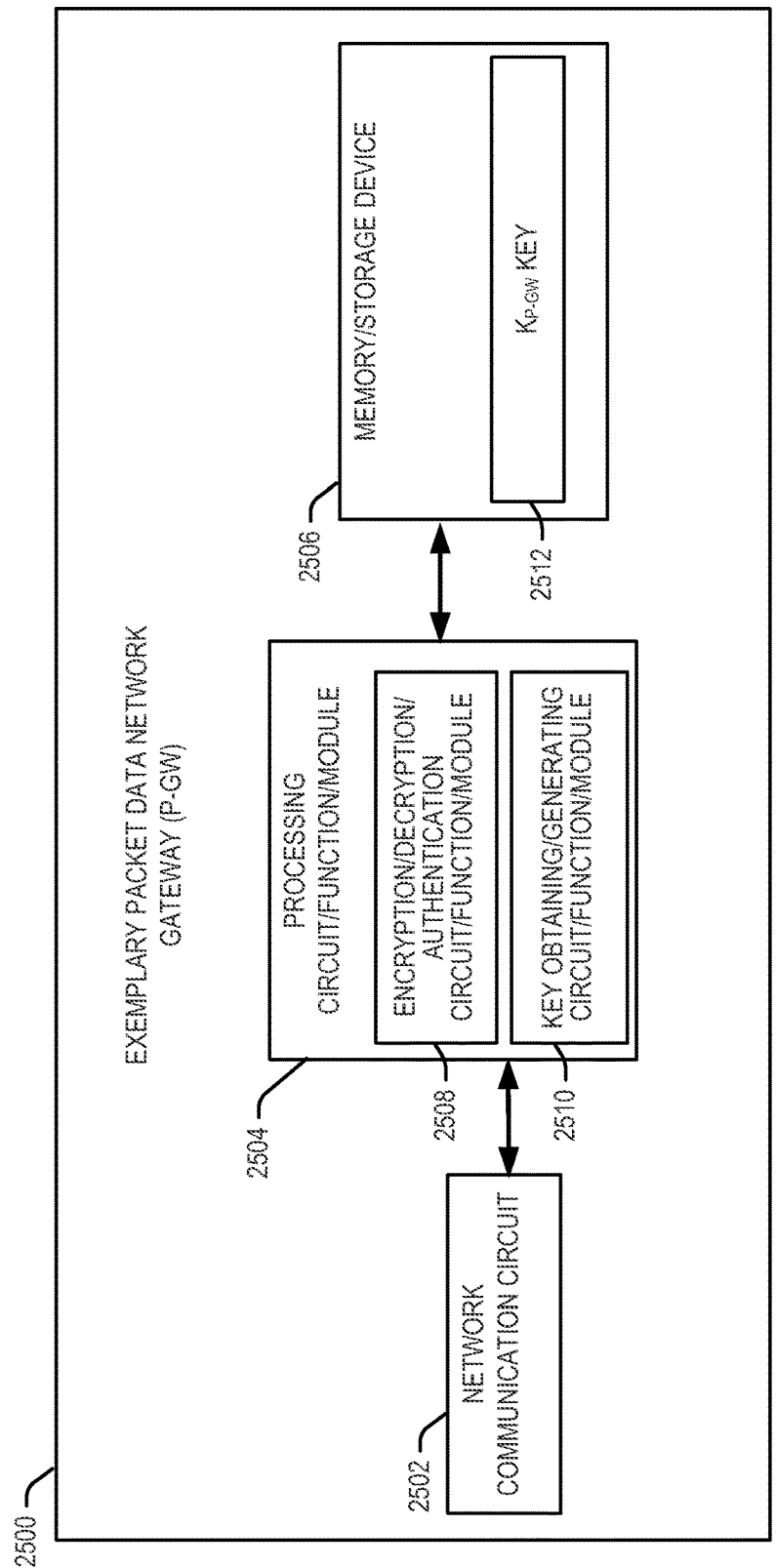
FIG. 25 illustrates a block diagram of an exemplary hardware implementation of a Packet Data Network Gateway (P-GW) configured to perform the methods described herein.

FIG. 25 illustrates a block diagram of an exemplary hardware implementation of a Packet Data Network Gateway (P-GW) 2500 configured to perform the methods described herein.

The P-GW 2500 may include a processing circuit, function, or module 2504 coupled to a network communication circuit 2502, and a memory/storage device 2506. The network communication circuit 2502 may serve to communicatively couple the P-GW 2500 to a packet data network and/or a core network of the cellular system. The processing circuit/function/module 2504 may include an encryption/decryption/authentication circuit, function, or module 2508 configured to perform encryption/decryption/authentication of user-plane data traffic using a shared key, which is shared by the P-GW 2500 and a device. The processing circuit/function/module 2504 may further include a key obtaining/function/module 2510 configured to obtain and/or locally derive certain keys used to protect user-plane data traffic during transit between the P-GW 2500 and a device. In the exemplary aspects described herein, the key obtaining/generating circuit/function/module 2510 may typically obtain a shared key (e.g., $K_{P\text{-}GW}$) from a SKME, where the shared key is derived at the SKME and provisioned to the key obtaining/generating circuit/function/module 2510 by the SKME. To facilitate the protection of user-plane data traffic, the memory/storage device 2506 may locally store the obtained $K_{P\text{-}GW}$ key 2512 in the memory/storage device 2506 of the P-GW 2500.

Figure 26:
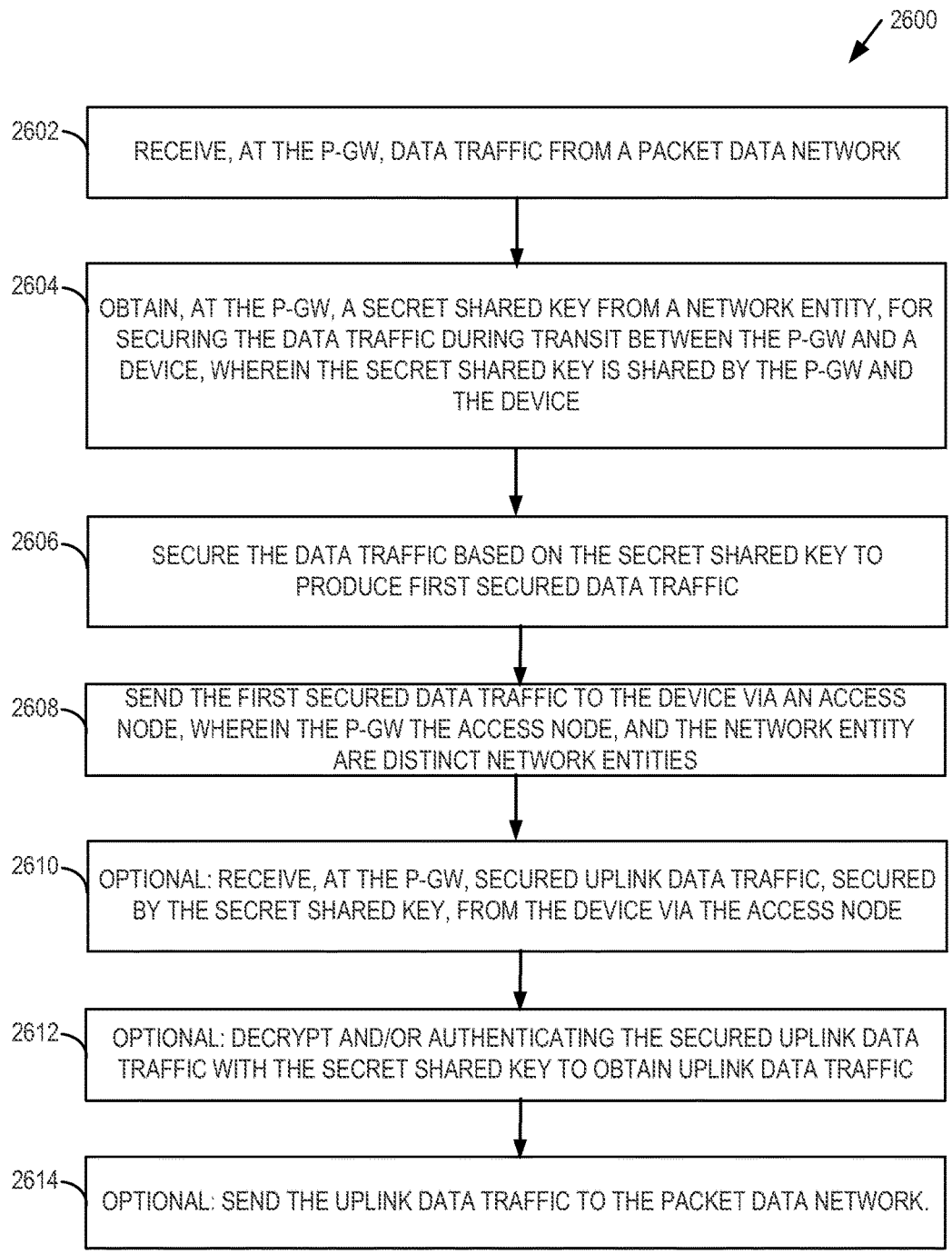
FIG. 26 illustrates an exemplary method, operational at a P-GW, to protect a user-plane message (e.g., user-plane data traffic) in a cellular network in accordance with aspects described herein.

FIG. 26 illustrates an exemplary method 2600, operational at a P-GW, to protect a user-plane message (e.g., user-plane data traffic) in a cellular network in accordance with aspects described herein.

The method 2600 may include receiving, at the P-GW, data traffic from a packet data network, 2602. The method may further include obtaining, at the P-GW, a secret shared key from a network entity, for securing the data traffic during transit between the P-GW and a device, wherein the secret shared key is shared by the P-GW and the device, 2604. The method may include securing the data traffic based on the secret shared key to produce first secured data traffic, 2606. The method may still further include sending the first secured data traffic to the device via an access node, wherein the P-GW the access node, and the network entity are distinct network entities, 2608.

According to aspects described herein, the secret shared key may be unknown to the access node. The secret shared key may be provisioned to the P-GW over a control-plane interface from a network entity. The network entity may be an SKME.

According to aspects described herein, the secret shared key may secure at least some layers of user-plane communications while a different shared key secures control-plane communications. For example, the secret shared key may protect the data traffic in an Internet Protocol (IP) layer of a user-plane. The P-GW may obtain the secret shared key independently from the device. The secret shared key may be a function of a P-GW identifier (GW ID).

According to some aspects, obtaining the secret shared key may further comprise obtaining the secret shared key from a network entity located between a home subscriber server (HSS) and a mobility management entity (MME). Again, the network entity may be an SKME.

According to some aspects, the secret shared key may be obtained from a network entity in a same domain as the P-GW.

Optionally, the method may also include receiving, at the P-GW, secured uplink data traffic, secured by the secret shared key, from the device via the access node, 2610. The method may optionally further include decrypting and/or authenticating the secured uplink data traffic with the secret shared key to obtain uplink data traffic, 2612. The method may still further optionally include sending the uplink data traffic to the packet data network, 2614.

Exemplary Network Entity (e.g., SKME) and Method Operational Thereon

Figure 27:
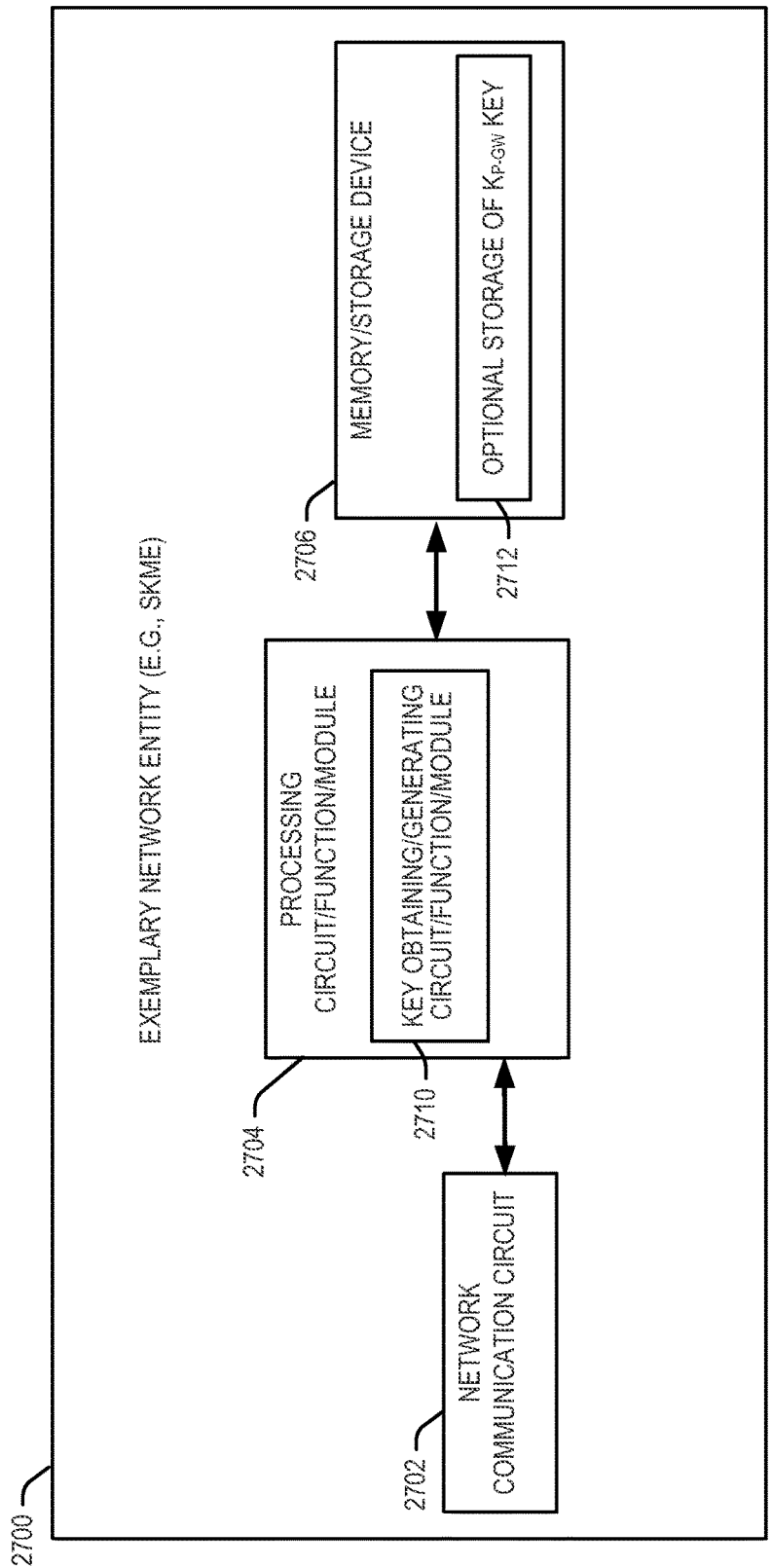
FIG. 27 illustrates a block diagram of an exemplary hardware implementation of a network entity referred to herein as a Session Key Management Entity (SKME) configured to perform the methods described herein.

FIG. 27 illustrates a block diagram of an exemplary hardware implementation of a network entity 2700 referred to herein as a Session Key Management Entity (SKME) configured to perform the methods described herein.

The network entity 2700 may include a processing circuit, function, or module 2704 coupled to a network communication circuit 2702, and a memory/storage device 2706. The network communication circuit 2702 may serve to communicatively couple the network entity 2700 to other network entities or nodes of a cellular system. The processing circuit/function/module 2704 may include a key obtaining/generating circuit/function/module 2710 configured to obtain and/or locally derive certain keys used to protect user-plane data traffic during transit between a P-GW and a device. In the exemplary aspects described herein, the key obtaining/generating circuit/function/module 2710 may typically derive a shared key (e.g., $K_{P-GW}$), where the shared key is derived at the SKME and provisioned to a P-GW. In some aspects, there is no need for the SKME to store the $K_{P-GW}$. In other aspects, the SKME may optionally store the $K_{P-GW}$. Consequently, the memory/storage device 2706 may optionally locally store the $K_{P-GW}$ key 2712 of the network entity 2700.

Figure 28:
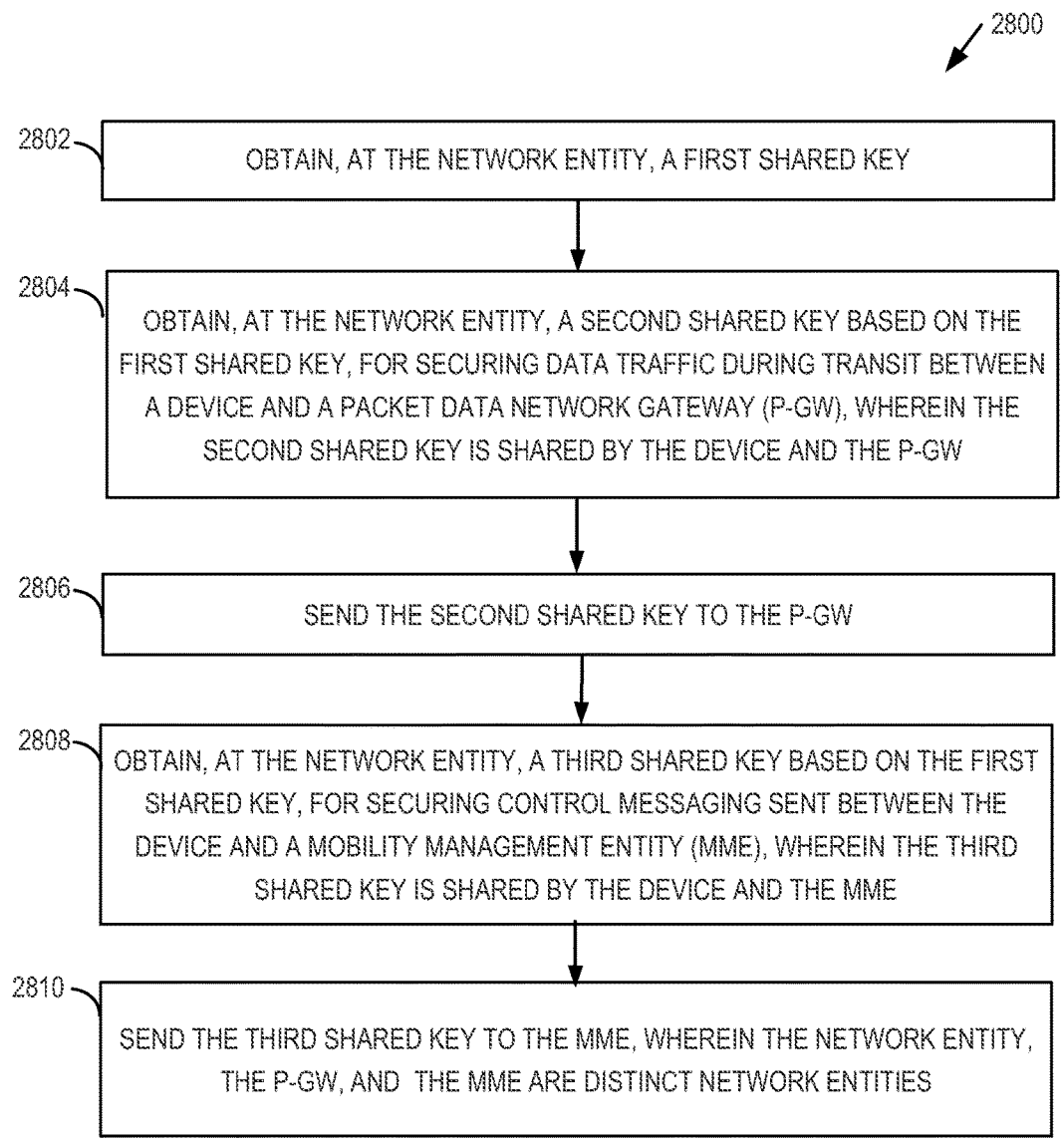
FIG. 28 illustrates an exemplary method, operational at the SKME, in connection with protection of a user-plane message (e.g., user-plane data traffic) in a cellular network in accordance with aspects described herein.

FIG. 28 illustrates an exemplary method 2800, operational at the SKME, in connection with protection of a user-plane message (e.g., user-plane data traffic) in a cellular network in accordance with aspects described herein.

The method 2800 may begin with obtaining, at the network entity, a first shared key, 2802. The network entity may obtain a second shared key based on the first shared key, 2804. The second shared key may be for securing data traffic during transit between a device and a packet data network gateway (P-GW), wherein the second shared key is shared by the device and the P-GW. The method may continue by sending the second shared key to the P-GW, 2606.

The method may continue by obtaining, at the network entity, a third shared key based on the first shared key, 2808. The third shard key may be for securing control messaging sent between the device and a mobility management entity (MME), wherein the third shared key is shared by the device and the MME. The method may further include sending the third shared key to the MME, 2810. The network entity, the P-GW, and the MME may be distinct network entities.

According to some aspects, obtaining the second shared key may further include deriving the second shared key as a function of the first shared key and a packet data network gateway identifier (GW ID).

According to some aspects, the data traffic is distinct from control messaging. For example, data traffic may be transmitted over a user-plane and control messaging may be transmitted over a control plane, wherein the user-plane and the control plane are distinct transmission paths.

According to some aspects, the network entity is located between a home subscriber server (HSS) and the MME, and the network entity is distinct from the HSS and the MME.

One or more of the components, steps, features, and/or functions illustrated in the figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary methods and/or processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations could be implemented in various devices, systems, and methods.

In addition, it is noted that at least some implementations have been described as a method that is depicted as a flowchart, a flow diagram, a structure diagram, or a block diagram. Although a flowchart may describe the operations as a sequential method, many of the operations can be performed in parallel or concurrently. In addition, the order of the operations may be re-arranged. A method is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various processes described herein may be partially or fully implemented by programming (e.g., instructions and/or data) that may be stored in a machine-readable, computer-readable, and/or processor-readable storage medium, and executed by one or more processors, machines, and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. In addition, "determining" may include receiving (e.g., receiving information), accessing (e.g., accessing data in a memory), and the like. In addition, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method, operational at a device, comprising:
obtaining, at the device, a first shared key;
obtaining, at the device, a second shared key based on the first shared key, wherein the second shared key:
serves to secure data traffic during transit between the device and a second device configured to execute functions of a data network gateway via an access node, is shared by the device and the second device, is not shared with the access node, and
is not shared with a third device configured to execute functions related to setting up, maintaining, and releasing physical channels;
securing data traffic based on the second shared key to produce first secured data traffic; and
sending the first secured data traffic to the second device via the access node, wherein the second device and the access node are distinct network entities; and
wherein the second shared key secures at least some layers of user-plane communications while a different key secures control-plane communications.

2. The method of claim 1, wherein the first shared key is unknown to the second device.

3. The method of claim 1, wherein the first shared key and the second shared key are derived locally at the device and are not transmitted to the device.

4. The method of claim 1, further comprising:
obtaining, at the device, a third shared key based on the first shared key, for securing control messaging sent between the device and the third device, wherein the third shared key is shared by the device and the third device, and wherein the second device, the third device, and the access node are distinct network entities.

5. The method of claim 4, further comprising:
obtaining, at the device, a fourth shared key based on the third shared key, for securing data traffic between the device and the access node, wherein the fourth shared key is shared by the device and the access node;
securing the first secured data traffic based on the fourth shared key to produce a second secured data traffic, wherein the first secured data traffic is encapsulated within the second secured data traffic; and
sending the second secured data traffic, instead of the first secured data traffic, to the second device via the access node, wherein the second device, the third device, and the access node are distinct network entities.

6. The method of claim 5, wherein the second shared key protects the second secured data traffic in an Internet Protocol (IP) layer of a user-plane.

7. The method of claim 5, wherein the fourth shared key protects the second secured data traffic in a Packet Data Convergence Protocol (PDCP) layer of a user-plane.

8. The method of claim 5, wherein the fourth shared key protects certain transmissions of traffic over certain layers of a user-plane while the second shared key is used to protect other transmissions of traffic over other layers of the user-plane.

9. The method of claim 1, wherein the first shared key is shared between the device and a network entity.

10. The method of claim 9, wherein the network entity obtains the first shared key from a fourth device configured to execute a function of storing a unique identity of the device.

11. The method of claim 1, wherein the device obtains the second shared key independently from the second device.

12. The method of claim 1, wherein obtaining the second shared key further comprises:
deriving the second shared key at the device as a function of the first shared key and a packet data network gateway identifier (GW ID).

13. The method of claim 1, wherein data traffic is distinct from control messaging.

14. The method of claim 1, wherein data traffic is transmitted over a user-plane and control messaging is transmitted over a control plane, wherein the user-plane and the control plane are distinct transmission paths.

15. The method of claim 1, wherein securing the data traffic comprises encrypting the data traffic based on the second shared key.

16. The method of claim 1, wherein securing the data traffic comprises including an authentication signature based on the second shared key.

17. The method of claim 1, further comprising:
receiving third secured data traffic from the second device via the access node, wherein the third secured data traffic was secured based on the second shared key; and
decrypting and/or authenticating the third secured data traffic based on the second shared key to produce unsecured data traffic.

18. A device, comprising:
a wireless communication circuit configured to communicate with an access node of a cellular network:
a processing circuit coupled to the wireless communication circuit, the processing circuit configured to:
obtain a first shared key;
obtain a second shared key based on the first shared key, wherein the second shared key:
serves to secure data traffic during transit between the device and a second device configured to execute functions of a data network gateway via the access node,
is shared by the device and the second device,
is not shared with the access node, and
is not shared with a third device configured to execute functions related to setting up, maintaining, and releasing physical channels;
secure data traffic based on the second shared key to produce first secured data traffic; and
send the first secured data traffic to the second device via the access node, wherein the second device and the access node are distinct network entities; and
wherein the second shared key secures at least some layers of user-plane communications while a different key secures control-plane communications.

19. The device of claim 18, wherein the processing circuit is further configured to:
obtain a third shared key based on the first shared key, for securing control messaging sent between the device and the third device, wherein the third shared key is shared by the device and the third device, and wherein the second device, the third device, and the access node are distinct network entities.

20. The device of claim 19, wherein the processing circuit is further configured to:
obtain a fourth shared key based on the third shared key, for securing data traffic between the device and the access node, wherein the fourth shared key is shared by the device and the access node;
secure the first secured data traffic based on the fourth shared key to produce a second secured data traffic, wherein the first secured data traffic is encapsulated within the second secured data traffic; and
send the second secured data traffic, instead of the first secured data traffic, to the second device via the access node, wherein the second device, the third device, and the access node are distinct network entities.

21. A device, comprising:
means for obtaining a first shared key;
means for obtaining a second shared key based on the first shared key, wherein the second shared key:
serves to secure data traffic during transit between the device and a second device configured to execute functions of a data network gateway via an access node,
is shared by the device and the second device,
is not shared with the access node, and
is not shared with a third device configured to execute functions related to setting up, maintaining, and releasing physical channels;
means for securing data traffic based on the second shared key to produce first secured data traffic; and
means for sending the first secured data traffic to the second device via the access node, wherein the second device and the access node are distinct network entities; and
wherein the second shared key secures at least some layers of user-plane communications while a different key secures control-plane communications.

22. The device of claim 21, further comprising:
means for obtaining a third shared key based on the first shared key, for securing control messaging sent between the device and the third device, wherein the third shared key is shared by the device and the third device, and wherein the second device, the third device, and the access node are distinct network entities.

23. The device of claim 22, further comprising:
means for obtaining a fourth shared key based on the third shared key, for securing data traffic between the device and the access node, wherein the fourth shared key is shared by the device and the access node;
means for securing the first secured data traffic based on the fourth shared key to produce a second secured data traffic, wherein the first secured data traffic is encapsulated within the second secured data traffic; and
means for sending the second secured data traffic, instead of the first secured data traffic, to the second device via the access node, wherein the second device, the third device, and the access node are distinct network entities.

24. A non-transitory machine-readable storage medium having one or more instructions stored thereon, which when executed by at least one processor causes the at least one processor to:
obtain a first shared key;
obtain a second shared key based on the first shared key, wherein the second shared key: serves to secure data traffic during transit between a device and a second device configured to execute functions of a data network gateway via an access node,
is shared by the device and the second device,
is not shared with the access node, and
is not shared with a third device configured to execute functions related to setting up, maintaining, and releasing physical channels;
secure data traffic based on the second shared key to produce first secured data traffic; and
send the first secured data traffic to the second device via the access node, wherein the second device and the access node are distinct network entities; and
wherein the second shared key secures at least some layers of user-plane communications while a different key secures control-plane communications.

25. The non-transitory machine-readable storage medium of claim 24 having one or more further instructions stored thereon, which when executed by the at least one processor causes the at least one processor to:
obtain a third shared key based on the first shared key, for securing control messaging sent between the device and the third device, wherein the third shared key is shared by the device and the third device, and wherein the second device, the third device, and the access node are distinct network entities.

26. The non-transitory machine-readable storage medium of claim 25 having one or more further instructions stored thereon, which when executed by the at least one processor causes the at least one processor to:
- obtain a fourth shared key based on the third shared key, for securing data traffic between the device and the access node, wherein the fourth shared key is shared by the device and the access node;
- secure the first secured data traffic based on the fourth shared key to produce a second secured data traffic, wherein the first secured data traffic is encapsulated within the second secured data traffic; and
- send the second secured data traffic, instead of the first secured data traffic, to the second device via the access node, wherein the second device, the third device, and the access node are distinct network entities.

\* \* \* \* \*